United States Patent
Ando et al.

(10) Patent No.: US 7,419,707 B2
(45) Date of Patent: Sep. 2, 2008

(54) COATING COMPOSITION FOR THE FORMATION OF LOW REFRACTIVE INDEX LAYER, ANTIREFLECTION FILM, POLARIZING PLATE AND LIQUID CRYSTAL DISPLAY DEVICE

(75) Inventors: Takumi Ando, Minami-Ashigara (JP); Yuuichi Fukushige, Minami-Ashigara (JP)

(73) Assignee: FujiFilm Corporation, Minato-Ku, Tokyo (JP)

( * ) Notice: Subject to any disclaimer, the term of this patent is extended or adjusted under 35 U.S.C. 154(b) by 135 days.

(21) Appl. No.: 11/357,203

(22) Filed: Feb. 21, 2006

(65) Prior Publication Data

US 2006/0188664 A1 Aug. 24, 2006

(30) Foreign Application Priority Data

Feb. 21, 2005 (JP) ............................ 2005-043913

(51) Int. Cl.
 *C09K 19/00* (2006.01)
 *C09K 19/52* (2006.01)
(52) U.S. Cl. ..................... 428/1.1; 430/20; 252/299.01; 349/137
(58) Field of Classification Search .................. 428/1.1; 252/299.01; 430/20; 349/137
 See application file for complete search history.

(56) References Cited

U.S. PATENT DOCUMENTS 6,908,647 B2 * 6/2005 Obayashi et al. ........... 428/1.32

FOREIGN PATENT DOCUMENTS

| JP | 2002-196117 | 7/2002 |
|---|---|---|
| JP | 2002-317152 | 10/2002 |
| JP | 2003-75603 | 3/2003 |
| JP | 2004-272198 | 9/2004 |

* cited by examiner

*Primary Examiner*—Geraldina Visconti
(74) *Attorney, Agent, or Firm*—Buchanan Ingersoll & Rooney PC

(57) ABSTRACT

A coating composition for the formation of a low refractive index layer, comprising: a fluorine-containing olefin-based polymer that has a polysiloxane segment represented by formula 1 in its main chain, has a fluorine content of 30 mass % or more, and contains a plurality of ethylenically unsaturated groups; and a hollow silica fine particle having an average particle diameter of 5 to 200 nm and a refractive index of 1.17 to 1.40: Formula 1:

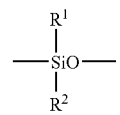

[wherein $R^1$ and $R^2$, which may be the same or different, each represents a hydrogen atom, an alkyl group, an alkyl halide group or an aryl group].

17 Claims, 5 Drawing Sheets

COATING COMPOSITION FOR THE FORMATION OF LOW REFRACTIVE INDEX LAYER, ANTIREFLECTION FILM, POLARIZING PLATE AND LIQUID CRYSTAL DISPLAY DEVICE

BACKGROUND OF THE INVENTION

1. Field of the Invention

The present invention relates to a coating composition capable of forming a low refractive index layer excellent in the scratch resistance and antifouling property, and a display device used for the image display of a computer, a word processor, a television and the like. More specifically, the present invention relates to an antireflection film, a polarizing plate and a liquid crystal display device, which are effective for enhancing the display quality.

2. Description of the Related Art

In a display device such as cathode ray tube display device (CRT), plasma display panel (PDP), electroluminescence display (ELD) and liquid crystal display device (LCD), an antireflection film is generally disposed on the outermost surface of a display for preventing reduction in contrast or projection of an image due to reflection of outside light and enhancing the visibility of an image by utilizing the principle of light diffusion and optical interference.

The conventional antireflection film includes an antiglare antireflection film of diffusing the surface reflected light to suppress the specular reflection of outside light and prevent projection of an external environment. Also, in the antireflection film of JP-A-2002-196117, one low refractive index layer is provided on an antiglare hard coat layer having a surface fine irregularity structure, whereby in addition to diffusion of outside light on the surface, the reflectance is reduced by utilizing the principle of light interference. In JP-A-2003-75603, an antireflection film not having a surface fine irregularity structure but utilizing only the light interference has been proposed, where a medium refractive index layer, a high refractive index layer and a low refractive index layer are sequentially provided on a substrate film to form a laminate structure.

In the case of reducing the reflectance by utilizing the interference principle as above, it is very effective to decrease the refractive index of the low refractive index layer on the outermost surface. Conventionally, a technique of increasing a fluorine content of the material used or decreasing the density in the layer, for example, by introducing voids has been made to reduce the refractive index of the layer. However, in any attempt, there is caused a problem that the film strength and adhesion to the lower layer are impaired and the scratch resistance is deteriorated. In order to solve this problem, JP-A-2002-317152 has proposed an antireflection film where a low refractive index layer containing a hollow silica fine particle is provided by coating on a hard coat layer and not only the antireflection property is enhanced by the effect of the hollow silica of reducing the refractive index but also the film strength is elevated by virtue of the strength of the hollow silica. In JP-A-2004-272198, a low refractive index layer having an ionizing radiation curing-type nanoporous structure has been proposed.

In these cases, a certain effect of improvement is obtained with respect to the projection of outside light and the scratch resistance, but the antifouling property is insufficient and an antifouling layer must be further provided on the low refractive index layer.

In recent years, various displays are used in a wide-ranging environment and demands for a higher level are increasing, but it can be hardly said that the antireflection property, scratch resistance and antifouling property are all satisfied in a high level to meet the requirements.

SUMMARY OF THE INVENTION

An object of the present invention is to provide a coating composition capable of forming a low refractive index layer excellent in the scratch resistance and antifouling property, despite low reflectivity. Another object of the present invention is to provide an antireflection film capable of preventing the projection of outside light and improved in scratch resistance and antifouling property, by using the coating composition for the formation of a low refractive index layer.

A still another object of the present invention is to provide a polarizing plate which is, by virtue of the above-described antireflection film, assured of high visibility and almost free of change in the color phase or the like due to variation of the viewing angle, and a liquid crystal display device using the same.

These objects of the present invention can be attained by the coating composition for the formation of a low refractive index layer of 1 to 6 below, the antireflection film of 7 to 12 below, the polarizing plate of 13 and 14 below, and the liquid crystal display device of 15 below.

1. A coating composition for the formation of a low refractive index layer, comprising:

a fluorine-containing olefin-based polymer that has a polysiloxane segment represented by formula 1 in its main chain, has a fluorine content of 30 mass % or more, and contains a plurality of ethylenically unsaturated groups; and a hollow silica fine particle having an average particle diameter of 5 to 200 nm and a refractive index of 1.17 to 1.40:

Formula 1:

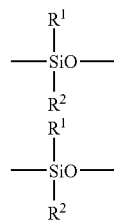

[wherein $R^1$ and $R^2$ above, which may be the same or different, each represents a hydrogen atom, an alkyl group, an alkyl halide group or an aryl group].

2. The coating composition for the formation of a low refractive index layer as described in 1 above, wherein the fluorine-containing olefin-based polymer has a structural unit containing a polysiloxane segment represented by formula 1 originated in (c) an azo group-containing polysiloxane compound.

3. The coating composition for the formation of a low refractive index layer as described in 1 or 2 above, which further comprises a non-hollow silica fine particle.

4. The coating composition for the formation of a low refractive index layer as described in any one of 1 to 3 above, which further comprises a polyfunctional (meth)acrylate compound having two or more (meth)acryloyl groups within one molecule.

5. The coating composition for the formation of a low refractive index layer as described in any one of 1 to 4 above, which further comprises a polysiloxane compound having a reactive organic functional group represented by the following formula 7:

Formula 7:

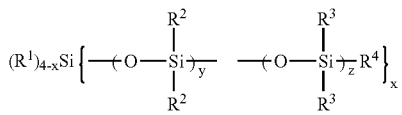

[wherein $R^1$ to $R^4$ each represents a substituent having a carbon number of 1 to 20; when each substituent is present in a plural number, these groups may be the same or different; at least one group of $R^1$, $R^3$ and $R^4$ represents a reactive organic functional group; x represents an integer satisfying $1 \leq x \leq 4$; y represents an integer satisfying $10 \leq y \leq 500$; z represents an integer satisfying $0 \leq z \leq 500$; and the compound may be a random copolymer or a block copolymer].

6. The coating composition for the formation of a low refractive index layer as described in any one of 1 to 5 above, wherein the hollow silica fine particle and/or a non-hollow silica fine particle is surface-treated with a hydrolysate of an organosilane represented by the following formula (1) and/or a partial condensate thereof:

Formula (1)

(wherein $R^{10}$ represents a substituted or unsubstituted alkyl group or a substituted or unsubstituted aryl group, X represents a hydroxyl group or a hydrolyzable group, and m represents an integer of 1 to 3).

7. An antireflection film comprising: a transparent support; at least one hard coat layer; and a low refractive index layer located as an outermost layer, wherein the low refractive index layer is a layer formed by curing the coating composition for the formation of a low refractive index layer described in any one of 1 to 6 by ionizing radiation.

8. The antireflection film as described in 7 above, wherein at least one of the hard coat layer and the low refractive index layer comprises: (a) at least one of: a hydrolysate of an organosilane having a hydroxyl group or hydrolyzable group directly bonded to silicon; and a partial condensate thereof; and (b) at least one metal chelate compound comprising: (i) a center metal including a metal selected from Zr, Ti and Al; and (ii) ligands including an alcohol represented by formula $R^3OH$ (wherein $R^3$ represents an alkyl group having a carbon number of 1 to 10) and a compound represented by formula $R^4COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10).

9. The antireflection film as described in 7 or 8 above, wherein the antireflection film has a surface roughness Ra (centerline average roughness) of 0.10 μm or less and a transmitted image clarity of 60% or more.

10. The antireflection film as described in any one of 7 to 9 above, wherein the hard coat layer has an internal haze of 10% or more.

11. The antireflection film as described in any one of 7 to 10 above, wherein an intensity of scattered light at an outgoing angle of 30° in a scattered light profile of the hard coat layer as measured by a goniophotometer is from 0.01 to 0.2% based on an intensity of light at an outgoing angle of 0°.

12. The antireflection film as described in any one of 7 to 11 above, wherein at least one high refractive index layer having a refractive index higher than that of the transparent support is provided on the hard coat layer.

13. A polarizing plate comprising: a polarizing film; and two protectice films on both sides of the polarizing film, wherein the antireflection film described in any one of 7 to 12 is used for one protective film.

14. The polarizing plate as described in 13 above, wherein the other one, which is not the antireflection film, of the two protective films is an optical compensation film having an optically anisotropic layer, the optically anisotropic layer comprising a compound having a discotic structural unit in which a disc plane of the discotic structural unit is inclined with respect to a surface of the protective film, and an angle made by the disc plane of the discotic structural unit and the surface of the protective film is changing in a depth direction of the optically anisotropic layer.

15. A liquid crystal display device using the antireflection film described in any one of 7 to 12 or the polarizing plate described in either 13 or 14, as the outermost surface layer of the display.

Figure 1:
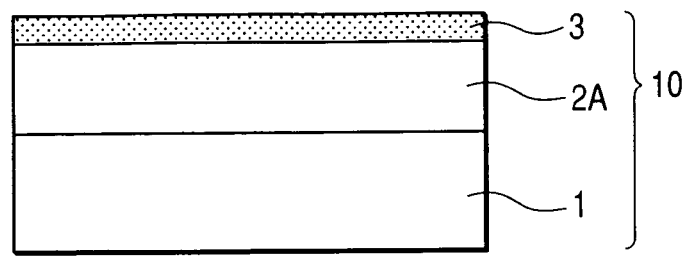
FIG. 1 is a schematic cross-sectional view showing a construction example of the antireflection film of the present invention.
Figure 2:
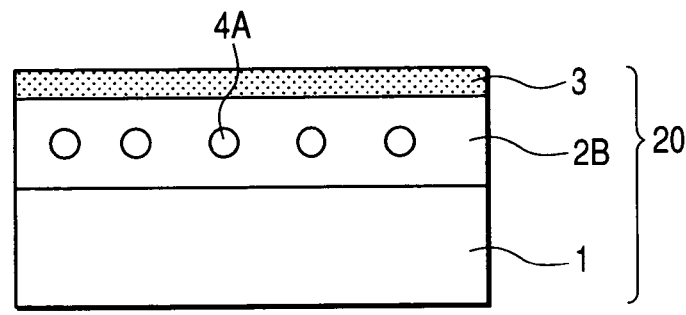
FIG. 2 is a schematic cross-sectional view showing a construction example of the antireflection film of the present invention.
Figure 3:
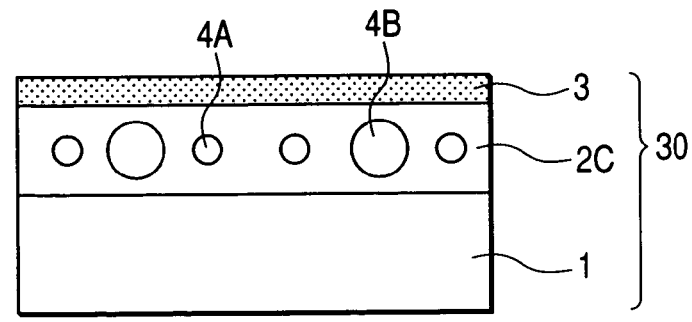
FIG. 3 is a schematic cross-sectional view showing a construction example of the antireflection film of the present invention.
Figure 4:
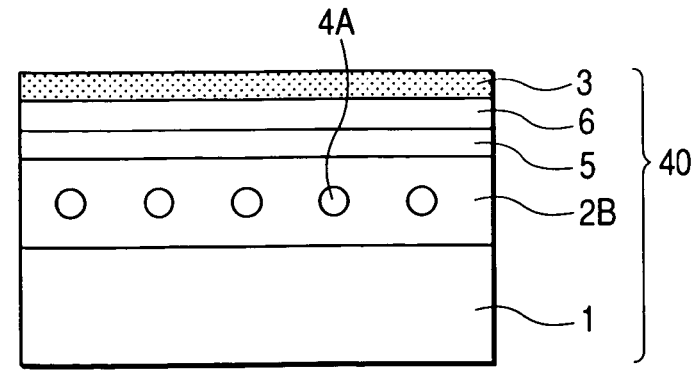
FIG. 4 is a schematic cross-sectional view showing a construction example of the antireflection film of the present invention.

1 denotes a transparent support; 2A denotes a hard coat layer; 2B denotes a hard coat layer; 2C denotes a hard coat layer; 3 denotes a low refractive index layer; 4A denotes a light-transparent particle; 4B denotes a light-transparent particle; 5 denotes a medium refractive index layer; 6 denotes a high refractive index layer; 10 denotes an antireflection film; 20 denotes an antireflection film; 30 denotes an antireflection film; 40 denotes an antireflection film; 10 denotes a coater; 11 denotes a backup roller; W denotes a web; 13 denotes a slot die; 14 denotes a coating solution; 14a denotes a bead; 14b denotes a coating film; 15 denotes a pocket; 16 denotes a slot; 16a denotes an opening of slot; 17 denotes an end lip; 18 denotes a land; 18a denotes an upstream lip land; 18b denotes a downstream lip land; $I_{up}$ denotes a land length of upstream lip land 18a; $I_{LO}$ denotes a land length of downstream lip land 18b; LO denotes an overbite length (difference between the distance from the downstream lip land 18b to the web W and the distance from the upstream lip land 18*a* to the web W); $G_L$ denotes Gap between the end lip 17 and the web W (gap between the downstream lip land 18*b* and the web W); 30 denotes a conventional slot die; 31*a* denotes an upstream lip land; 31*b* denotes a downstream lip land; 32 denotes a pocket; 33 denotes a slot; 40 denotes a low-pressure chamber; 40*a* denotes a back plate; 40*b* denotes a side plate; 40*c* denotes a screw; $G_B$ denotes Gap between the back plate 40*a* and the web W; $G_s$ denotes Gap between the side plate 40*b* and the web W.

DETAILED DESCRIPTION OF THE INVENTION

The embodiment of the antireflection film of the present invention is described below by referring to the drawings. Incidentally, as for the coating composition for the formation of a low refractive index layer of the present invention, its detailed description is given in the "Low Refractive Index Layer" in the process of describing the antireflection film.

FIGS. 1 to 4 are cross-sectional views schematically showing constitution examples of the antireflection film of the present invention. As shown in FIG. 1, the antireflection film 10 of the present invention is obtained by stacking a transparent support 1 and a hard coat layer 2A and further stacking a low refractive index layer 3 containing a hollow silica fine particle as the outermost layer. The embodiment of each layer and the layer structure of the film can be appropriately varied and, for example, as shown in the antireflection film 20 of FIG. 2, a light-transparent particle 4A capable of imparting internal scattering property may be incorporated into the inside of the hard coat layer 2B. Also, as shown in the antireflection film 30 of FIG. 3, the internal scattering property may be further adjusted or for imparting antiglare property, another kind of a light-transparent particle 4B may be incorporated into the inside of the hard coat layer 2C. Furthermore, as shown in the antireflection film 40 of FIG. 4, for the purpose of enhancing the antireflectivity, a medium refractive index layer 5 and a high refractive index layer 6 may be provided on the hard coat layer 2B, while disposing the low refractive index layer 3 as the outermost layer.

The layers constituting the antireflection film of the present invention each is described in detail below. In the present invention, the term "from (numerical value A) to (numerical value B)" as used in the present invention for expressing a physical value means that "(numerical value A) or more and (numerical value B) or less".

(Transparent Support)

The transparent support for use in the antireflection film of the present invention is not particularly limited and, for example, a transparent resin film, a transparent resin plate, a transparent resin sheet or a transparent glass may be used. Examples of the transparent resin film which can be used include a cellulose acylate film (e.g., cellulose triacetate film (refractive index: 1.48), cellulose diacetate film, cellulose acetate butyrate film, cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyether ketone film and a (meth)acrylnitrile film.

Among these, a cellulose acylate film generally used as a protective film of a polarizing plate is preferred, because the transparency is high, the optical birefringence is small and the production is easy, and a cellulose triacetate film is more preferred. The thickness of the transparent support is usually on the order of 25 to 1,000 μm.

The cellulose acylate film for use in the present invention is preferably a cellulose acetate having an acetylation degree of 59.0 to 61.5%.

The acetylation degree means an amount of acetic acid bonded per unit mass of cellulose. The acetylation degree is determined according to the measurement and calculation of acetylation degree in ASTM:D-817-91 (Test Method of Cellulose Acetate, etc.).

The viscosity average degree of polymerization (DP) of the cellulose acylate is preferably 250 or more, more preferably 290 or more.

Also, in the cellulose acylate for use in the present invention, the value of Mw/Mn (Mw: mass average molecular weight, Mn: number average molecular weight) as determined by gel permeation chromatography is preferably close to 1.0, in other words, the molecular weight distribution is preferably narrow. The specific Mw/Mn value is preferably from 1.0 to 1.7, more preferably from 1.3 to 1.65, and most preferably from 1.4 to 1.6.

In general, the hydroxyl groups at the 2-, 3- and 6-positions of the cellulose acylate are not equally distributed at every ⅓ of the substitution degree of the entirety, but the substitution degree of the hydroxyl group at the 6-position tends to become small. In the present invention, the substitution degree of the hydroxyl group at the 6-position of the cellulose acylate is preferably larger than that at the 2- or 3-position.

The hydroxyl group at the 6-position is preferably substituted by an acyl group in a proportion of 32% or more, more preferably 33% or more, still more preferably 34% or more, based on the entire substitution degree. Furthermore, the substitution degree of the acyl group at the 6-position of the cellulose acylate is preferably 0.88 or more The hydroxyl group at the 6-position may be substituted by an acyl group having a carbon number of 3 or more other than the acetyl group, such as propionyl group, butyroyl group, valeroyl group, benzoyl group and acryloyl group. The substitution degree at each position can be measured and determined by NMR.

In the present invention, a cellulose acetate obtained by a method described in paragraphs [0043] and [0044] ([Synthetic Example 1] of [Examples]), paragraphs [0048] and [0049] ([Synthetic Example 2]) and paragraphs [0051] and [0052] ([Synthetic Example 3]) of JP-A-11-5851 may be used as the cellulose acylate.

(Production of Cellulose Acylate Film)

The cellulose acylate film for use in the present invention can be produced by a solvent cast method. In the solvent cast method, the film is produced with use of a solution (dope) prepared by dissolving a cellulose acylate in an organic solvent.

The organic solvent preferably contains a solvent selected from an ether having from 3 to 12 carbon atoms, a ketone having from 3 to 12 carbon atoms, an ester having from 3 to 12 carbon atoms, and a halogenated hydrocarbon having from 1 to 6 carbon atoms. A mixture of two or more kinds of organic solvents may also be used.

The ether, ketone and ester may have a cyclic structure. A compound having two or more functional groups of ether, ketone or ester (that is, —O—, —CO— or —COO—) may also be used as the organic solvent. The organic solvent may have other functional group such as alcoholic hydroxyl group. In the case of an organic solvent having two or more kinds of functional groups, the preferred carbon atom number thereof may be sufficient if it is within the range of the preferred carbon atom number specified above for the compound having any one functional group.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The carbon atom number of the halogenated hydrocarbon is preferably 1 or 2, and most preferably 1. The halogen of the halogenated hydrocarbon is preferably chlorine. The hydrogen atom of the halogenated hydrocarbon is preferably replaced by a halogen in a proportion of 25 to 75 mol %, more preferably from 30 to 70 mol %, still more preferably from 35 to 65 mol %, and most preferably from 40 to 60 mol %. A representative halogenated hydrocarbon is methylene chloride.

The cellulose acylate solution (dope) may be prepared by a general method. The general method means to perform the processing at a temperature of 0° C. or more (ordinary temperature or high temperature). The preparation of the solution may be performed by using a method and an apparatus for the preparation of a dope in the usual solvent cast method. Incidentally, in the case of the general method, a halogenated hydrocarbon (in particular, methylene chloride) is preferably used as the organic solvent. A non-chlorine based solvent may be also used, and examples thereof include those described in *JIII Journal of Technical Disclosure*, No. 2001-1745.

The amount of the cellulose acylate is adjusted to give a content of 10 to 40 mass % in the solution obtained. The amount of the cellulose acylate is more preferably from 10 to 30 mass %. In the organic solvent (main solvent), arbitrary additives described later may be added.

The solution may be prepared by stirring the cellulose acylate and the organic solvent at ordinary temperature (from 0 to 40° C.). A solution of high concentration may be stirred under pressure and heating conditions. More specifically, the cellulose acylate and the organic solvent are charged and sealed in a pressurized vessel and stirred under pressure while heating at a temperature in the range from the boiling point of the solvent at ordinary temperature to a temperature of not allowing for boiling of the solvent. The heating temperature is usually 40° C. or more, preferably from 60 to 200° C., more preferably from 80 to 110° C.

Respective components may be coarsely mixed in advance and then charged into the vessel or may be successively charged into the vessel.

The vessel must be constructed such that stirring can be performed. The vessel may be pressurized by injecting an inert gas such as nitrogen gas. Also, elevation in the vapor pressure of the solvent due to heating may be utilized. Alternatively, after tightly closing the vessel, respective components may be added under pressure.

In the case of heating the system, the heating is preferred performed from the outside of the vessel. For example, a jacket-type heating device may be used. Also, the vessel as a whole may be heated by providing a pre-heater outside the vessel and circulating a liquid through piping.

The stirring is preferably performed by using a stirring blade provided in the vessel. The stirring blade preferably has a length sufficiently large to reach the vicinity of the vessel wall, and a scraping blade for renewing a liquid film on the vessel wall is preferably provided at the tip of the stirring blade.

In the vessel, instruments such as pressure gauge and thermometer may be disposed. Respective components are dissolved in the solvent inside the vessel. The prepared dope is cooled and then taken out from the vessel or is taken out from the container and then cooled by using a heat exchanger or the like.

The solution may also be prepared by a cooling dissolution method. In the cooling dissolution method, the cellulose acylate can be dissolved even in an organic solvent hardly capable of dissolving the cellulose acrylate by an ordinary dissolution method. Incidentally, also in the case of a solvent capable of dissolving the cellulose acetate by an ordinary dissolution method, the cooling dissolution method provides an effect that a uniform solution can be rapidly obtained.

In the cooling dissolution method, the cellulose acylate is gradually added in the organic solvent with stirring at room temperature.

The amount of the cellulose acylate is preferably adjusted to give a content of 10 to 40 mass % in the mixture. The amount of the cellulose acylate is more preferably from 10 to 30 mass %. Furthermore, in the mixture, arbitrary additives described later may be added.

The mixture prepared is then cooled to a temperature of −100 to −10° C. (preferably from −80 to −10° C., more preferably −50 to −20° C., and most preferably from −50 to −30° C.). The cooling may be performed, for example, in a dry ice/methanol bath (−75° C.) or in a cooled diethylene glycol solution (from −30 to −20° C.). When cooled in such a way, the mixture of cellulose acetate and the organic solvent is solidified.

The cooling rate is preferably 4° C./min or more, more preferably 8° C./min or more, and most preferably 12° C./min or more. The cooling rate is preferably higher, but the theoretical upper limit thereof is 10,000° C./sec, the technical upper limit is 1,000° C./sec, and the practical upper limit is of 100° C./sec. Incidentally, the cooling rate is a value obtained by dividing a difference between a temperature at the initiation of cooling and a final cooling temperature by the time from the initiation of cooling until the arrival at the final cooling temperature.

Furthermore, when the resulting mixture is heated at 0 to 200° C. (preferably from 0 to 150° C., more preferably from 0 to 120° C., and most preferably from 0 to 50° C.), the cellulose acetate is dissolved in the organic solvent. The temperature may be elevated by allowing the mixture to stand at room temperature or by heating in a warm bath.

The heating rate is preferably 4° C./min or more, more preferably 8° C./min or more, and most preferably 12° C./min or more. The heating rate is preferably higher, but the theoretical upper limit thereof is 10,000° C./sec, the technical upper limit is 1,000° C./sec, and the practical upper limit is 100° C./sec. Incidentally, the heating rate is a value obtained by dividing a difference between a temperature at the initiation of heating and a final heating temperature by the time from the initiation of heating until the arrival at the final heating temperature.

In this way, a uniform solution is obtained. In the case where the dissolution is insufficient, the cooling and heating operation may be repeated. Whether or not the dissolution is sufficient can be judged merely by observing the appearance of the solution with an eye.

In the cooling dissolution method, a closed vessel is preferably used so as to avoid the intrusion of free water due to dew condensation at the cooling. Also, in the cooling and heating operation, when the pressure is applied at the cooling and reduced at the heating, the dissolution time can be shortened. For applying and reducing the pressure, a pressure-resistant vessel is preferably used.

In a 20 mass % solution after dissolving cellulose acetate (acetylation degree: 60.9%, viscosity average polymerization degree: 299) in methyl acetate by the cooling dissolution method, a pseudo phase transition point between the sol state and the gel state is present in the vicinity of 33° C. according to the differential scanning calorimetry (DSC), and a uniform gel state is established below this temperature. Accordingly, this solution needs to be kept at a temperature of the pseudo phase transition point or more, preferably at a temperature of about 10° C. higher than the gel phase transition temperature. However, the pseudo phase transition temperature varies depending on the acetylation degree or viscosity average polymerization degree of cellulose acetate, the concentration of solution, or the organic solvent used.

A cellulose acylate film is produced from the prepared cellulose acylate solution (dope) by the solvent cast method.

The dope is cast on a drum or a band, and the solvent is evaporated to form a film. The concentration of the dope before casting is preferably adjusted to have a solid content of 18 to 35%.

The surface of the drum or band is preferably finished to a mirror state. The casting and drying methods in the solvent cast method are described in U.S. Pat. Nos. 2,336,310, 2,367, 603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614 and JP-B-62-115035.

The dope is preferably cast on a drum or band at a surface temperature of 10° C. or less.

After the casting, the dope is preferably dried by blowing air for 2 seconds or more. The obtained film is separated from the drum or band and may be further dried with a high-temperature air by successively varying the temperature from 100 to 160° C. to evaporate the residual solvent. This method is described in JP-B-5-17844. According to this method, the time from casting to separation can be shortened. For practicing this method, it is necessary that the dope is gelled at the surface temperature of the drum or band at the casting.

Using a plurality of cellulose acylate solutions (dopes) prepared, a film can also be prepared by casting two or more layers by the solvent cast method. In this case, the dopes are cast on a drum or a band, and the solvent is evaporated to form a film. The concentration of the dope before casting is preferably adjusted to have a solid content of 10 to 40 mass %. The surface of the drum or band is preferably finished to a mirror state.

In the case of casting a plurality of cellulose acylate solutions into two or more layers, a film may be produced by casting respective cellulose acylate-containing solutions from a plurality of casting nozzles capable of casting a plurality of cellulose acylate solutions and provided at intervals in the support travelling direction, thereby stacking the layers, and a method described, for example, in JP-A-61-158414, JP-A-1-122419 and JP-A-11-198285 can be applied. Also, a film may be produced by casting the cellulose acylate solution from two casting nozzles, and this can be performed by a method described, for example, in JP-B-60-27562, JP-A-61-94724, JP-A-61-104813, JP-A-61-158413 and JP-A-6-134933. Furthermore, a cellulose acylate film casting method described in JP-A-56-162617 may also be employed, where a flow of a high-viscosity cellulose acylate solution is enveloped by a low-viscosity cellulose acylate solution and the high-viscosity and low-viscosity cellulose acylate solutions are simultaneously extruded.

Alternatively, a film may be produced by using two casting nozzles such that a film formed on a support by a first casting nozzle is separated while second casting is performed on the side in contact with the support surface, and this method is described, for example, in JP-B-44-20235. The cellulose acylate solutions used for casting may be the same or different, and this is not particularly limited. In order to impart a function to the plurality of cellulose acylate layers, cellulose acylate solutions according to their functions may be extruded from respective casting nozzles.

Furthermore, in the present invention, the cellulose acylate solution may be cast simultaneously with a solution for the formation of other functional layer (for example, an adhesive layer, a dye layer, an antistatic layer, an anti-halation layer, a UV absorbing layer or a polarizing layer), thereby forming the functional layer at the same time with the film formation.

In the case of a single layer solution, a high-concentration high-viscosity cellulose acylate solution must be extruded for obtaining a necessary thickness, but the stability of the cellulose acylate solution is poor and this often causes a problem that a solid is generated to bring about particle failure or defective planarity. In order to solve this problem, a plurality of cellulose acylate solutions are cast from casting nozzles, whereby high-viscosity solutions can be simultaneously extruded on a support, as a result, not only a film with good planarity and excellent surface state can be produced but also by virtue of use of a thick cellulose acylate solution, reduction in the drying load and elevation of the film production speed can be achieved.

For the purpose of improving the mechanical physical properties or increasing the drying speed after casting in the production of a film, a plasticizer may be added to the cellulose acylate film. As for the plasticizer, a phosphoric acid ester or a carboxylic acid ester is used. Examples of the phosphoric acid ester include triphenyl phosphate (TPP), diphenylbiphenyl phosphate and tricresyl phosphate (TCP). The carboxylic acid ester is typically a phthalic acid ester or a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl O-acetylcitrate (OACTE) and tributyl O-acetylcitrate (OACTB). Other examples of the carboxylic acid ester include butyl oleate, methylacetyl ricinoleate, dibutyl sebacate and various trimellitic esters. A phthalic acid ester-based plasticizer (DMP, DEP, DBP, DOP, DPP and DEHP) is preferred, and DEP and DPP are more preferred.

The amount added of the plasticizer is preferably from 0.1 to 25 mass %, more preferably from 1 to 20 mass %, and most preferably from 3 to 15 mass %, based on the amount of the cellulose acylate.

A deterioration inhibitor (e.g., antioxidant, peroxide decomposing agent, radical inhibitor, metal inactivating agent, acid scavenger, amine) may be added to the cellulose acylate film. The deterioration inhibitor is described in JP-A-3-199201, JP-A-5-197073, JP-A-5-194789, JP-A-5-271471 and JP-A-6-107854. Considering the effect of the deterioration inhibitor and bleed-out to the film surface, the amount added of the deterioration inhibitor is preferably from 0.01 to 1 mass %, more preferably from 0.01 to 0.2 mass %, based on the solution (dope) prepared. Particularly preferred examples of the deterioration inhibitor include butylated hydroxytoluene (BHT) and tribenzylamine (TBA).

If desired, a retardation increasing agent may be used in the cellulose acylate film for adjusting the retardation of the film. The retardation of the film is preferably from 0 to 300 nm in the thickness direction and from 0 to 1,000 nm in the in-plane direction.

As for the retardation increasing agent, an aromatic compound having at least two aromatic rings is preferred. The aromatic compound is used in an amount of 0.01 to 20 parts by mass per 100 parts by mass of the cellulose acylate. The aromatic compound is preferably used in an amount of 0.05 to 15 parts by mass, more preferably from 0.1 to 10 parts by mass, per 100 parts by mass of the cellulose acylate. Two or more kinds of aromatic compounds may be used in combination.

The details thereon are described, for example, in JP-A-2000-111914, JP-A-2000-275434, JP-A-2002-236215 and International Publication No. 00/065384, pamphlet.

(Stretching Treatment of Cellulose Acylate Film)

The produced cellulose film is further subjected to a stretching treatment, whereby drying unevenness and thickness unevenness or surface irregularity generated due to drying shrinkage can be improved. The stretching treatment is also used for adjusting the retardation.

The method for the stretching treatment in the width direction is not particularly limited, but examples thereof include a stretching method by a tenter.

Furthermore, lengthwise stretching is preferably performed in the longitudinal direction of a roll. The lengthwise stretching becomes possible by adjusting a draw ratio of respective pass rollers (rotation ratio between a pass roller and a pass roller) among pass rollers for transporting a rolled film.

(Surface Treatment of Cellulose Acylate Film)

The cellulose acylate film is preferably subjected to a surface treatment. Specific examples thereof include a corona discharge treatment, a glow discharge treatment, a flame treatment, an acid treatment, an alkaline treatment and an ultraviolet ray irradiation treatment. Also, it is preferably utilized to provide an undercoat layer as described in JP-A-7-333433.

From the standpoint of keeping the planarity of the film, the temperature of the cellulose acylate film is preferably set to Tg or less, specifically 150° C. or less, in such a treatment.

Particularly, in the case where the cellulose acylate film is bonded to a polarizing film as in the case of using the antireflection film of the present invention for a protective film of a polarizing plate, in view of adhesion to the polarizing film, an acid treatment or an alkaline treatment, namely, a saponification treatment for cellulose acylate, is preferably performed.

In view of adhesion or the like, the surface energy of the cellulose acylate film is preferably 55 mN/m or more, and more preferably from 60 to 75 mN/m. The surface energy may be adjusted by the above-described surface treatment.

The surface energy of a solid can be determined by a contact angle method, a wetting heat method or an adsorption method as described in *Nure No Kiso To Oyo* (*Foundations and Applications of Wetting*), Realize Sha (Dec. 10, 1989). In the case of the cellulose acylate film of the present invention, a contact angle method is preferably used.

More specifically, two kinds of solutions each having a known surface energy are dropped on the cellulose acylate film, and by defining the contact angle as an angle including the liquid droplet out of the angles made by a tangent drawn on the liquid droplet with the film surface at an intersection point between the liquid droplet surface and the film surface, the surface energy of the film can be calculated by computation.

The surface treatment is specifically described below by referring, for example, to an alkaline saponification treatment.

The alkaline saponification treatment is preferably performed by a cycle that the film surface is dipped in an alkali solution, neutralized with an acidic solution, washed with water and dried.

Examples of the alkali solution include a potassium hydroxide solution and a sodium hydroxide solution. The alkali concentration thereof is preferably from 0.1 to 3.0 mol/liter, more preferably from 0.5 to 2.0 mol/liter. The temperature of the alkali solution is preferably from room temperature to 90° C., more preferably from 40 to 70° C.

In view of productivity, after coating the alkali solution and performing the saponification treatment, the alkali is preferably removed from the film surface by washing with water. In the light of wettability, the coating solvent is preferably an alcohol such as IPA, n-butanol, methanol and ethanol. It is preferred to add water, propylene glycol, ethylene glycol or the like as the alkali dissolution aid.

(Hard Coat Layer)

The antireflection film of the present invention preferably has a construction such that a hard coat layer is provided on at least one surface of the transparent support for imparting a physical strength to the film, and a low refractive index layer is provided thereon.

The antireflection film of the present invention is more preferably constituted such that a medium refractive index layer and a high refractive index layer are provided between the hard coat layer and the low refractive index layer. Also, the hard coat layer may have a constitution such that two or more layers are stacked.

With respect to the refractive index of the hard coat layer for use in the present invention, in view of the optical design for obtaining an antireflection film, the refractive index is preferably from 1.48 to 2.00, more preferably from 1.52 to 1.90, still more preferably from 1.55 to 1.80. In the present invention, at least one low refractive index layer is provided on the hard coat layer and therefore, if the refractive index is excessively lower than this range, the antireflection property is reduced, whereas if it is too high, the tint of reflected light tends to become strong.

With respect to the film thickness of the hard coat layer, from the standpoint of imparting sufficiently high durability and impact resistance to the film, the thickness of the hard coat layer is usually on the order of 0.5 to 50 μm, preferably from 1 to 20 μm, more preferably from 2 to 10 μm, and most preferably from 3 to 7 μm.

Also, the strength of the hard coat layer is, in the pencil hardness test according to JIS K5400, preferably H or more, more preferably 2H or more, and most preferably 3H or more.

Furthermore, in the taper test according to JIS K5400, the abrasion amount of a specimen between before and after the test is preferably as small as possible.

The hard coat layer is preferably formed by a crosslinking or polymerization reaction of an ionizing radiation-curable compound. For example, the hard coat layer may be formed by coating a coating composition containing an ionizing radiation-curable polyfunctional monomer or oligomer on a transparent support, and causing a crosslinking or polymerization reaction of the polyfunctional monomer or oligomer.

The functional group of the ionizing radiation-curable polyfunctional monomer or oligomer is preferably a functional group polymerizable by the effect of light, electron beam or ionizing radiation, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

Specific examples of photopolymerizable functional group-containing photopolymerizable polyfunctional monomer include:

(meth)acrylic acid diesters of alkylene glycol, such as neopentyl glycol acrylate, 1,6-hexanediol (meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis{4-(acryloxy-diethoxy)phenyl}propane and 2,2-bis{4-(acryloxy-polypropoxy)phenyl}propane.

Furthermore, epoxy (meth)acrylates, urethane (meth)acrylates and polyester (meth)acrylates are also preferably used as the photopolymerizable polyfunctional monomer.

Among these, esters of polyhydric alcohol with (meth)acrylic acid are preferred, and a polyfunctional monomer having three or more (meth)acryloyl groups within one molecule are more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate and tripentaerythritol hexatriacrylate. In present invention, the terms "(meth)acrylate", "(meth)acrylic acid" and "(meth)acryloyl" mean "acrylate or methacrylate", "acrylic acid or methacrylic acid" and "acryloyl or methacryloyl", respectively.

Two or more kinds of polyfunctional monomers may be used in combination.

The polymerization of such an ethylenically unsaturated group-containing monomer can be performed by ionizing radiation irradiation or heating in the presence of a photoradical initiator or a thermal radical initiator.

Examples of the photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borates, active esters, active halogens, an inorganic complex and coumarins.

Examples of the acetophenones include 2,2-dimethoxyacetophenone, 2,2-diethoxyacetophenone, p-dimethylacetophenone, 1-hydroxydimethyl phenyl ketone, 1-hydroxydimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-tert-butyldichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(tert-butylperoxycarbonyl)benzophenone.

Examples of the phosphine oxides include 2,4,6-trimethylbenzoyldiphenylphosphine oxide.

Examples of the active esters include 1,2-octanedione, 1-[4-(phenylthio)-2-(O-benzoyloxime)], sulfonic acid esters and cyclic active ester compounds.

Examples of the onium salts include an aromatic diazonium salt, an aromatic iodonium salt and an aromatic sulfonium salt.

Examples of the borates include ion complexes with a cationic coloring matter.

As for the active halogens, an S-triazine or oxathiazole compound is known, and examples thereof include compounds described in *Bull. Chem. Soc. Japan*, 42, 2924 (1969), such as 2-phenyl-4,6-bis(trichloromethyl)-s-triazine, 2-(p-chlorophenyl)-4,6-bis(trichloromethyl)-s-triazine, 2-(p-tolyl)-4,6-bis(trichloromethyl)-s-triazine, 2-(p-methoxyphenyl)-4,6-bis(trichloromethyl)-s-triazine, 2-(2'.4'-dichlorophenyl)-4,6-bis(trichloromethyl)-s-triazine, 2,4,6-tris(trichloromethyl)-s-triazine, 2-methyl-4,6-bis(trichloromethyl)-s-triazine, 2-n-nonyl-4,6-bis(trichloromethyl)-s-triazine, 2-($\alpha,\alpha,\beta$-trichloroethyl)-4,6-bis(trichloromethyl)-s-triazine and 2-[4-(4-hydroxybenzoylamino)phenyl]-4,6-bis(trichloromethyl)-1,3,5-triazine; compounds described in British Patent 1,388,492, such as 2-styryl-4,6-bis(trichloromethyl)-s-triazine, 2-(p-methylstyryl)-4,6-bis(trichloromethyl)-s-triazine, 2-(p-methoxystyryl)-4,6-bis(trichloromethyl)-s-triazine and 2-(p-methoxystyryl)-4-amino-6-trichloromethyl-s-triazine; and compounds described in *J. Org. Chem.*, 29, 1527 (1964), such as 2-methyl-4,6-bis(tribromomethyl)-s-triazine, 2,4,6-tris(tribromomethyl)-s-triazine, 2,4,6-tris(dibromomethyl)-s-triazine, 2-amino-4-methyl-6-tribromomethyl-s-triazine, 2-methoxy-4-methyl-6-trichloromethyl-s-triazine and 2-trihalomethyl-5-(p-methoxyphenyl)-1,3,4-oxadiazole.

Examples of the inorganic complex include bis-($\eta^5$-2,4-cyclopentadien-1-yl)-bis(2,6-difluoro-3-(1H-pyrrol-1-yl)-phenyl)titanium.

Examples of the coumarins include 3-ketocoumarin.

One of these initiators may be used alone or a mixture thereof may be used.

Various examples are also described in *Saishin UV Koka Gijutsu* (*Latest UV Curing Technologies*), page 159, Technical Information Institute Co., Ltd. (1991), and these are useful in the present invention.

Examples of the commercially available photoradical polymerization initiator include KAYACURE (e.g., DETX-S, BP-100, BDMK, CTX, BMS, 2-EAQ, ABQ, CPTX, EPD, ITX, QTX, BTC, MCA) produced by Nippon Kayaku Co., Ltd., IRGACURE (e.g., 651, 184, 819, 500, 907, 369, 1173, 2959, 4265, 4263) produced by Ciba Specialty Chemicals, and Esacure (e.g., KIP100F, KB1, EB3, BP, X33, KT046, KT37, KIP150, TZT) produced by Sartomer Company Inc.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone. Examples of the commercially available photosensitizer include KAYACURE Series (e.g., DMBI, EPA) produced by Nippon Kayaku Co., Ltd.

The photopolymerization reaction is preferably performed by irradiation of ultraviolet rays after coating and drying of the hard coat layer.

As for the thermal radical initiator, an organic or inorganic peroxide, an organic azo or diazo compound, and the like can be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compounds include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzenediazonium.

The polymer containing a polyether as the main chain is preferably a ring-opened polymer of a polyfunctional epoxy compound. The ring-opening polymerization of the polyfunctional epoxy compound may be performed by ionizing radiation irradiation or heating in the presence of a photoacid generator or a thermal acid generator.

Accordingly, the hard coat layer can be formed by preparing a coating solution containing a polyfunctional epoxy compound, a photoacid generator or thermal acid generator, a light-transparent fine particle and an inorganic filler, coating the coating solution on a transparent support, and then curing it through a polymerization reaction by the effect of ionizing radiation or heat.

A crosslinked structure may be introduced into the binder polymer by using a crosslinking functional group-containing monomer in place of or in addition to the monomer having two or more ethylenically unsaturated groups, thereby introducing the crosslinking functional group into the polymer, and reacting the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. In addition, a vinylsulfonic acid, an acid anhydride, a cyanoacrylate derivative, a melamine, an etherified methylol, an ester, a urethane, and a metal alkoxide (e.g., tetramethoxysilane) may also be utilized as the monomer for introducing a crosslinked structure. A functional group which exhibit a crosslinking property as a result of decomposition reaction, such as block isocyanate group, may also be used. That is, in the present invention, the crosslinking functional group may be a functional group which exhibits reactivity not directly but as a result of decomposition.

The binder polymer having such a crosslinking functional group can form a crosslinked structure after coating and heating.

The crosslinked or polymerized binder of the hard coat layer has a structure that the main chain of the polymer is crosslinked or polymerized. Examples of the main chain of the polymer include a polyolefin (saturated hydrocarbon), a polyether, a polyurea, a polyurethane, a polyester, a polyamine, a polyamide and a melamine resin. A polyolefin main chain, a polyether main chain and a polyurea main chain are preferred, a polyolefin main chain and a polyether main chain are more preferable, and a polyolefin main chain is most preferred.

The polyolefin main chain comprises a saturated hydrocarbon. The polyolefin main chain is obtained, for example, by an addition polymerization reaction of an unsaturated polymerizable group. In the polyether main chain, repeating units are bonded through an ether bond (—O—). The polyether main chain is obtained, for example, by a ring-opening reaction of an epoxy group. In the polyurea main chain, repeating units are bonded through a urea bond (—NH—CO—NH—). The polyurea main chain is obtained, for example, by a polycondensation reaction between an isocyanate group and an amino group. In the polyurethane main chain, repeating units are bonded through a urethane bond (—NH—CO—O—). The polyurethane main chain is obtained, for example, by a polycondensation reaction between an isocyanate group and a hydroxyl group (including an N-methylol group). In the polyester main chain, repeating units are bonded through an ester bond (—CO—O—). The polyester main chain is obtained, for example, by a polycondensation reaction between a carboxyl group (including an acid halide group) and a hydroxyl group (including an N-methylol group). In the polyamine main chain, repeating units are bonded through an imino bond (—NH—). The polyamine main chain is obtained, for example, by a ring-opening reaction of an ethyleneimine group. In the polyamide main chain, repeating units are bonded through an amide bond (—NH—CO—). The polyamide main chain is obtained, for example, by a reaction between an isocyanate group and a carboxyl group (including an acid halide group). The melamine resin main chain is obtained, for example, by a polycondensation reaction between a triazine group (e.g., melamine) and an aldehyde (e.g., formaldehyde). Incidentally, in the melamine resin, the main chain itself has a crosslinked or polymerized structure.

For the purpose of controlling the refractive index of the hard coat layer, either one or both of a high refractive index monomer and an inorganic fine particle may be added to the binder of the hard coat layer. The inorganic fine particle has also an effect of suppressing the cure shrinkage due to a crosslinking reaction, in addition to the effect of controlling the refractive index. In the present invention, a polymer formed by the polymerization of the above-described polyfunctional monomer and/or high refractive index monomer after forming the hard coat layer, including an inorganic fine particle dispersed therein, is called a binder.

Examples of the high refractive index monomer include bis(4-methacryloylthiophenyl) sulfide, vinylnaphthalene, biphenyl sulfide and 4-methacryloxyplhenyl-4'-methoxyphenyl thioether.

Examples of the inorganic fine particle include an oxide of at least one metal selected from silicon, zirconium, titanium, aluminum, indium, zinc, tin and antimony. Other examples thereof include $BaSO_4$, $CaCO_3$, talc and kaolin. The particle diameter of the inorganic fine particle is 100 nm or less, preferably 50 nm or less. By pulverizing the inorganic fine particle to 100 nm or less, the hard coat layer can be formed without impairing the transparency.

For the purpose of forming the hard coat layer to have a high refractive index, an ultrafine particulate oxide of at least one metal selected from Al, Zr, Zn, Ti, In and Sn is preferred, and specific examples thereof include $ZrO_2$, $TiO_2$, $Al_2O_3$, $In_2O_3$, $ZnO$, $SnO_2$, $Sb_2O_3$ and ITO. Among these, $ZrO_2$ is preferred.

The amount added of the high refractive index monomer or inorganic fine particle is preferably from 10 to 90 mass %, more preferably from 20 to 80 mass %, based on the entire mass of the binder. Two or more kinds of inorganic fine particles may be used in the hard coat layer.

The haze of the hard coat layer varies depending on the function imparted to the antireflection film.

In the case of not imparting a function of scattering light in the inside and on the surface of the hard coat layer by maintaining the image clearness and suppressing the surface reflectance, the haze value is preferably lower, specifically, the haze value is preferably 10% or less, more preferably 5% or less, and most preferably 2% or less.

On the other hand, in the case of imparting an antiglare function by the effect of surface scattering on the hard coat layer in addition to the function of suppressing the surface reflectance, the surface haze is preferably from 5 to 15%, more preferably from 5 to 10%.

Furthermore, in the case of imparting a function of rendering less visible the pattern, color unevenness, brightness unevenness, glaring or the like on the liquid crystal panel by the effect of internal scattering in the hard coat layer or enlarging the viewing angle by scattering, the internal haze (a value obtained by subtracting the surface haze value from the entire haze value) is preferably from 10 to 90%, more preferably from 15 to 80%, and most preferably from 20 to 70%.

In the antireflection film of the present invention, the surface haze and internal haze can be freely set according to the purpose.

The haze can be measured by using a haze meter, Model 1001DP (manufactured by Nippon Denshoku Industries Co., Ltd.).

With respect to the surface irregularity shape of the hard coat layer for use in the present invention, in order to obtain a clear surface for the purpose of maintaining the image clearness, out of the characteristics showing the surface roughness, for example, the centerline average roughness (Ra) is preferably adjusted to 0.10 μm or less. The Ra is more preferably 0.09 μm or less, still more preferably 0.08 μm or less. In the antireflection film of the present invention, the surface irregularity of the film is governed by the surface irregularity of the hard coat layer, and the centerline average roughness of the antireflection film can be made to fall within the above-described range by adjusting the centerline average roughness of the hard coat layer.

The centerline average roughness (Ra) can be measured according to JIS-B0601-2001.

For the purpose of maintaining the image clearness, in addition to the adjustment of the surface irregularity shape, it is preferred to adjust the transmitted image clarity. The transmitted image clarity of the clear antireflection film is preferably 60% or more. The transmitted image clarity is an index generally showing the blurring degree of an image reflected by transmission through a film. As this value is larger, this indicates that the image viewed through the film is clearer and better. The transmitted image clarity is more preferably 70% or more, still more preferably 80% or more.

Here, the transmitted image clarity can be measured according to JIS K 7105 by using an optical comb with a slit width of 0.5 mm of an image clarity meter (Model ICM-2D) manufactured by Suga Test Instruments Co., Ltd.

On the other hand, in the case of imparting an antiglare function, the centerline average roughness (Ra) is preferably from 0.10 to 0.40 μm. If the Ra exceeds 0.40 μm, there arises a problem such as glaring or surface whitening due to reflection of outside light. Also, the transmitted image clarity is preferably from 5 to 60%.

In order to impart a viewing angle enlarging function, in addition to the adjustment of the haze value, it is important to adjust the intensity distribution of scattered light (scattered light profile) of the hard coat layer as measured by a goniophotometer. For example, in the case of a liquid crystal display, as the light emitted from a backlight is more diffused by the antireflection film disposed on the surface of a polarizing plate on the viewing side, the viewing angle property becomes better. However, if the light is too much diffused, this causes a problem such as reduction in the front brightness resulting from increased back scattering or deterioration of the image clearness due to excessive scattering. Accordingly, the intensity distribution of scattered light of the hard coat layer needs to be controlled to a certain range. In order to achieve the desired viewing property, the intensity of scattered light particularly at an outgoing angle of 30° having correlation with the effect of improving the viewing angle is preferably from 0.01 to 0.2%, more preferably from 0.02% to 0.15%, and most preferably from 0.02% to 0.1%, based on the intensity of light at an outgoing angle of 0° of a scattered light profile.

The scattered light profile can be measured for an antireflection film in which a hard coat layer is provided, by using a goniophotometer, Model GP-5, manufactured by Murakami Color Research Laboratory.

The method for imparting surface haze and/or internal haze to the hard coat layer is preferably a method of incorporating a light-transparent particle in a binder (containing the above-described inorganic particle capable of adjusting the refractive index, or the like) comprising an ionizing radiation-curable compound.

In the case of imparting surface haze, an irregularity shape is preferably formed on the surface by incorporating a light-transparent particle into the hard coat layer.

On the other hand, in the case of imparting internal haze, a light-transparent particle differing in the refractive index from the binder is preferably incorporated. The difference in the refractive index between the binder and the light-transparent particle is preferably from 0.02 to 0.20. The difference in the refractive index within this range provides an effect of appropriately diffusing light and the same time, causes no problem that the film is entirely whitened by an excessive light diffusing effect. The difference in the refractive index is more preferably from 0.03 to 0.15, and most preferably from 0.04 to 0.13.

The combination of the binder and the light-transparent particle can be appropriately selected for the purpose of adjusting the difference in the refractive index.

The particle diameter of the light-transparent particle is preferably from 0.5 to 6 μm. When the particle diameter is within this range, an appropriate light diffusion effect is obtained and the back scattering is small, so that the light can be utilized with good efficiency and at the same time, generation of white blurring or glaring phenomenon can be substantially prevented by virtue of the small surface irregularity. The particle diameter of the light-transparent particle is more preferably from 0.7 to 5 μm, and most preferably from 1 to 4 μm.

For incorporating a light-transparent particle into the hard coat layer and at the same time, obtaining a clear surface, the thickness of the hard coat layer needs to be adjusted so as not to produce surface irregularities due to the particles. The surface roughness Ra (centerline average roughness) can be made to be 0.10 μm or less by increasing the thickness and preventing the protrusion of a particle projection from the hard coat surface.

The light-transparent particle may be an organic particle or an inorganic particle. As the particle diameter is less fluctuated, the scattering property less fluctuates and the haze value is more easily designed. The light-transparent fine particle is suitably a plastic bead, preferably a plastic bead having high transparency and having a refractive index differing by the above-described numeral value from the binder.

Examples of the organic particle include a polymethyl methacrylate bead (refractive index: 1.49), an acryl-styrene copolymer bead (refractive index: 1.54), a melamine bead (refractive index: 1.57), a polycarbonate bead (refractive index: 1.57), a styrene bead (refractive index: 1.60), a crosslinked polystyrene bead (refractive index: 1.61), a polyvinyl chloride bead (refractive index: 1.60) and a benzoguanamine-melamine formaldehyde bead (refractive index: 1.68).

Examples of the inorganic particle include a silica bead (refractive index: 1.44) and an alumina bead (refractive index: 1.63).

Here, the refractive index of the binder can be quantitatively evaluated by directly measuring the refractive index with an Abbe refractometer or by measuring a spectral reflection spectrum or a spectral ellipsometry. The refractive index of the light-transparent fine particle is determined by dispersing light-transparent fine particles in an equal amount in solvents varied in the refractive index by changing the mixing ratio of two kinds of solvents differing in the refractive index, measuring the turbidity, and reading the refractive index of the solvent on giving a minimum turbidity by an Abbe refractometer.

As described above, a light-transparent particle having a particle diameter of 0.5 to 5 μm may be appropriately selected, and a mixture of two or more kinds of particles may also be used. The light-transparent particle is suitably incorporated in an amount of 5 to 30 parts by mass per 100 parts by mass of the binder.

In the case of the above-described light-transparent particle, since the light-transparent particle readily precipitates in the binder, an inorganic filler such as silica may be added for the purpose of preventing the precipitation. Incidentally, as the amount added of the inorganic filler is increased, the precipitation of the light-transparent particle may be more effectively prevented, but the transparency of the coating film is adversely affected. Therefore, it is preferred that an inorganic filler having a particle diameter of 0.5 μm or less is incorporated in an amount of less than about 0.1 mass % in the binder to such an extent of not impairing the transparency of the coating film.

<Surfactant for Hard Coat Layer>

As for the hard coat layer of the present invention, for improving particularly surface failure such as coating unevenness, drying unevenness and point defect and securing surface uniformity, either one or both of a fluorine-containing surfactant and a silicone-containing surfactant is preferably contained in the coating composition for the formation of a light diffusion layer. In particular, a fluorine-containing surfactant is preferably used because the effect of improving surface failure such as coating unevenness, drying unevenness and point defect of the antireflection film of the present invention is obtained by the addition in a smaller amount.

Such a surfactant is added for the purpose of elevating the productivity by imparting suitability for high-speed coating while enhancing the surface uniformity.

Preferred examples of the fluorine-containing surfactant include a fluoroaliphatic group-containing copolymer (sometimes simply referred to as a "fluorine-based polymer"). As for the fluorine-based polymer, a copolymer of an acrylic or methacrylic resin containing a repeating unit corresponding to the following monomer (i) with a vinyl-based monomer copolymerizable therewith (e.g. a repeating unit corresponding to the following monomer (ii)) is useful.

(i) Fluoroaliphatic Group-Containing Monomer Represented by the Following Formula (a)

Formula (a):

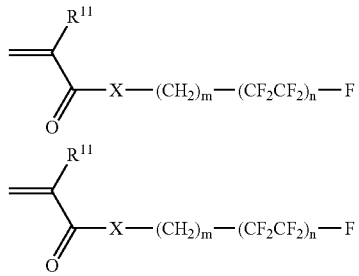

In formula (a), $R^{11}$ represents a hydrogen atom or a methyl group, X represents an oxygen atom, a sulfur atom or —$N(R^{12})$—, m represents an integer of 1 to 6, and n represents an integer of 2 to 4. $R^{12}$ represents a hydrogen atom or an alkyl group having a carbon number of 1 to 4, specifically a methyl group, an ethyl group, a propyl group or a butyl group, preferably a hydrogen atom or a methyl group. X is preferably an oxygen atom.

(ii) Monomer Represented by the Following Formula (b), Which is Copolymerizable with the Monomer (i):

Formula (b):

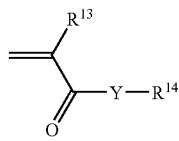

In formula (b), $R^{13}$ represents a hydrogen atom or a methyl group, and Y represents an oxygen atom, a sulfur atom or —$N(R^{15})$—. $R^{15}$ represents a hydrogen atom or an alkyl group having a carbon number of 1 to 4, specifically a methyl group, an ethyl group, a propyl group or a butyl group, preferably a hydrogen atom or a methyl group. Y is preferably an oxygen atom, —N(H)— or —$N(CH_3)$—.

$R^{14}$ represents a linear, branched or cyclic alkyl group having a carbon number of 4 to 20 which may be substituted. Examples of the substituent for the alkyl group of $R^{14}$ include, but are not limited to, a hydroxyl group, an alkylcarbonyl group, an arylcarbonyl group, a carboxyl group, an alkyl ether group, an aryl ether group, a halogen atom (e.g., fluorine, chlorine, bromine), a nitro group, a cyano group and an amino group. Examples of the linear, branched or cyclic alkyl group having a carbon number of 4 to 20 include a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group and an eicosanyl group, each of which may be linear or branched; a monocyclic cycloalkyl group such as cyclohexyl group and cycloheptyl group; and a polycyclic cycloalkyl group such as bicycloheptyl group, bicyclodecyl group, tricycloundecyl group, tetracyclododecyl group, adamantyl group, norbornyl group and tetracyclodecyl group.

The amount of the fluoroaliphatic group-containing monomer represented by formula (a) for use in the fluorine-based polymer used in the present invention is 10 mol % or more, preferably from 15 to 70 mol %, more preferably from 20 to 60 mol %, based on each monomer of the fluorine-based polymer.

The mass average molecular weight of the fluorine-based polymer for use in the present invention is preferably from 3,000 to 100,000, more preferably from 5,000 to 80,000.

Furthermore, the amount added of the fluorine-based polymer for use in the present invention is from 0.001 to 5 mass %, preferably from 0.005 to 3 mass %, more preferably from 0.01 to 1 mass %, based on the coating solution. If the amount added of the fluorine-based polymer is less than 0.001 mass %, a sufficiently high effect may not be obtained, whereas if it exceeds 5 mass %, drying of the coating film does not proceed satisfactorily or the performance (for example, reflectance and scratch resistance) as the coating film may be adversely affected.

Specific structural examples of the fluorine-based polymer comprising the fluoroaliphatic group-containing monomer represented by formula (a) are set forth below, but the present invention is not limited thereto. Incidentally, the numerals in formulae show a molar ratio of respective monomer components, and Mw indicates a mass average molecular weight.

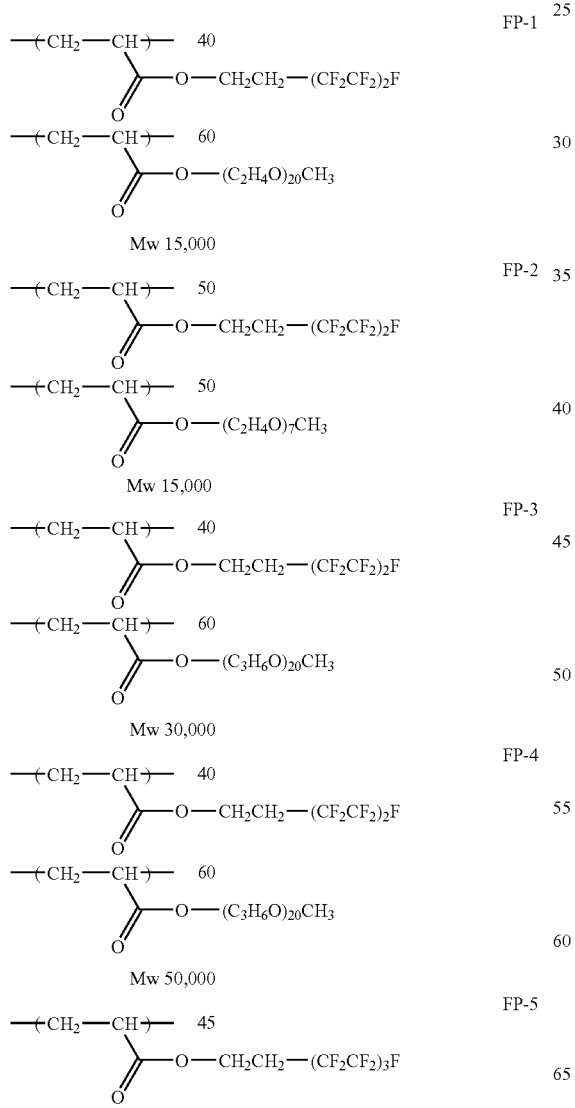

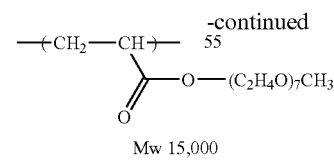

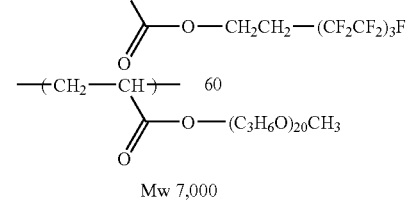

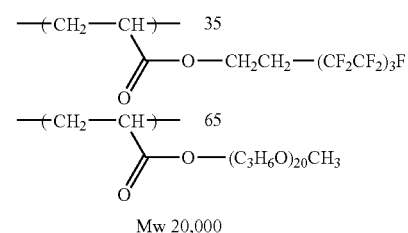

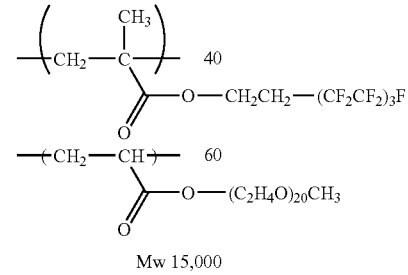

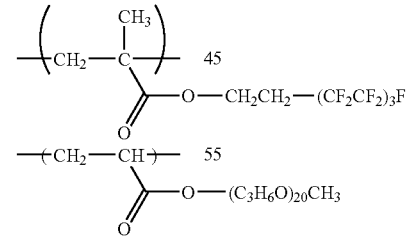

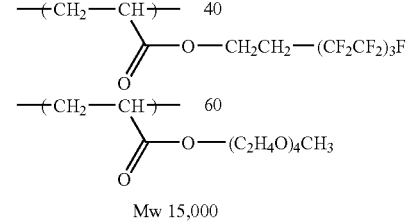

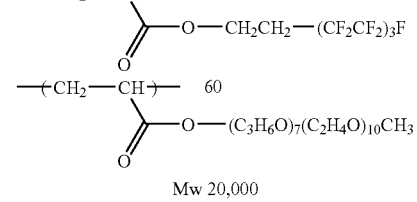

-continued

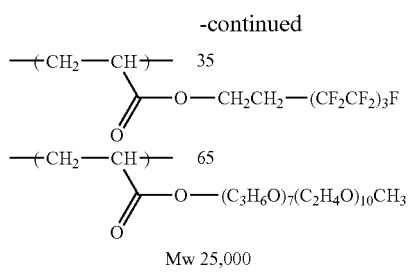

FP-12

Mw 25,000

However, when the above-described fluorine-based polymer is used, the F atom-containing functional group is segregated on the surface of the hard coat layer and the surface energy of the hard coat layer is thereby decreased, as a result, there arises a problem that when the low refractive index layer is overcoated on the hard coat layer, the antireflection performance is worsened. This is presumed to occur because the wettability of the curable composition used for forming the low refractive index layer is decreased and visually undetectable fine unevenness of the low refractive index layer is worsened. For solving such a problem, it has been found effective to adjust the structure and amount added of the fluorine-based polymer and thereby control the surface energy of the hard coat layer to preferably from 20 to 50 $mN \cdot m^{-1}$, more preferably from 30 to 40 $mN \cdot m^{-1}$. In order to realize such a surface energy, F/C which is a ratio of a peak assignable to the fluorine atom to a peak assignable to the carbon atom as measured by the X-ray photoelectron spectroscopy must be from 0.1 to 1.5.

Alternatively, in the case of coating an upper layer, a fluorine-based polymer capable of being extracted with an upper layer-forming solvent at the coating of the upper layer is selected to eliminate the uneven distribution on the lower layer surface (i.e., interface), whereby adhesion between the upper layer and the lower layer can be secured and the surface uniformity can be maintained even in the high-speed coating. At the same time, reduction in the surface free energy capable of providing an antireflection film with strong scratch resistance can be prevented and the surface energy of the hard coat layer before coating of the low refractive index layer can be controlled to the above-described range, thereby achieving the purpose. Such a raw material is, for example, a copolymer of an acrylic or methacrylic resin characterized by containing a repeating unit corresponding to a fluoroaliphatic group-containing monomer represented by the following formula (c), with a vinyl-based monomer copolymerizable therewith (e.g. a repeating unit corresponding to a monomer represented by the following formula (iv))

(iii) Fluoroaliphatic Group-Containing Monomer Represented by the Following Formula (c):

Formula (c):

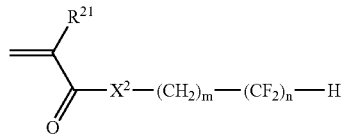

In formula (c), $R^{21}$ represents a hydrogen atom, a halogen atom or a methyl group, preferably a hydrogen atom or a methyl group. $X^2$ represents an oxygen atom, a sulfur atom or $—N(R^{22})—$, preferably an oxygen atom or $—N(R^{22})—$, more preferably an oxygen atom. m represents an integer of from 1 to 6 (preferably from 1 to 3, more preferably 1), and n represents an integer of from 1 to 18 (preferably from 4 to 12, more preferably from 6 to 8). $R^{22}$ represents a hydrogen atom or an alkyl group having a carbon number of 1 to 8 which may have a substituent, preferably a hydrogen atom or an alkyl group having a carbon number of 1 to 4, more preferably a hydrogen atom or a methyl group. X is preferably an oxygen atom.

Also, two or more kinds of fluoroaliphatic group-containing monomers represented by formula (c) may be contained as the constituent component in the fluorine-based polymer.

(iv) Monomer Represented by the Following Formula (d), Which is Copolymerizable with the Monomer (iii):

Formula (d):

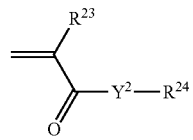

In formula (d), $R^{23}$ represents a hydrogen atom, a halogen atom or a methyl group, preferably a hydrogen atom or a methyl group. $Y^2$ represents an oxygen atom, a sulfur atom or $—N(R^{25})—$, preferably an oxygen atom or $—N(R^{25})—$, more preferably an oxygen atom. $R^{25}$ represents a hydrogen atom or an alkyl group having a carbon number of 1 to 8, preferably a hydrogen atom or an alkyl group having a carbon number of 1 to 4, more preferably a hydrogen atom or a methyl group.

$R^{24}$ represents a linear, branched or cyclic alkyl group having a carbon number of 1 to 20 which may have a substituent, a poly(alkyleneoxy) group-containing alkyl group or an aromatic group (e.g., phenyl, naphthyl) which may have a substituent, preferably a linear, branched or cyclic alkyl group having a carbon number of 1 to 12 or an aromatic group having a total carbon number of 6 to 18, more preferably a linear, branched or cyclic alkyl group having a carbon number of 1 to 8.

Specific structural examples of the fluorine-based polymer containing a repeating unit corresponding to the fluoroaliphatic group-containing monomer represented by formula (c) are set forth below, but the present invention is not limited thereto. Incidentally, the numerals in the formula show a molar ratio of respective monomer components, and Mw indicates a mass average molecular weight.

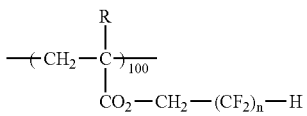

|  | R | n | Mw |
|---|---|---|---|
| P-1 | H | 4 | 8000 |
| P-2 | H | 4 | 16000 |
| P-3 | H | 4 | 33000 |
| P-4 | CH₃ | 4 | 12000 |
| P-5 | CH₃ | 4 | 28000 |
| P-6 | H | 6 | 8000 |
| P-7 | H | 6 | 14000 |
| P-8 | H | 6 | 29000 |

-continued

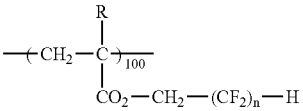

| | R | n | Mw |
|---|---|---|---|
| P-9 | CH$_3$ | 6 | 10000 |
| P-10 | CH$_3$ | 6 | 21000 |
| P-11 | H | 8 | 4000 |
| P-12 | H | 8 | 16000 |
| P-13 | H | 8 | 31000 |
| P-14 | CH$_3$ | 8 | 3000 |

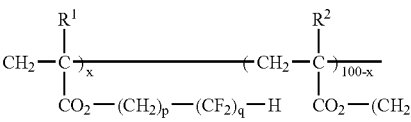

| | x | R$^1$ | p | q | R$^2$ | r | s | Mw |
|---|---|---|---|---|---|---|---|---|
| P-15 | 50 | H | 1 | 4 | CH$_3$ | 1 | 4 | 10000 |
| P-16 | 40 | H | 1 | 4 | H | 1 | 6 | 14000 |
| P-17 | 60 | H | 1 | 4 | CH$_3$ | 1 | 6 | 21000 |
| P-18 | 10 | H | 1 | 4 | H | 1 | 8 | 11000 |
| P-19 | 40 | H | 1 | 4 | H | 1 | 8 | 16000 |
| P-20 | 20 | H | 1 | 4 | CH$_3$ | 1 | 8 | 8000 |
| P-21 | 10 | CH$_3$ | 1 | 4 | CH$_3$ | 1 | 8 | 7000 |
| P-22 | 50 | H | 1 | 6 | CH$_3$ | 1 | 6 | 12000 |
| P-23 | 50 | H | 1 | 6 | CH$_3$ | 1 | 6 | 22000 |
| P-24 | 30 | H | 1 | 6 | CH$_3$ | 1 | 6 | 5000 |

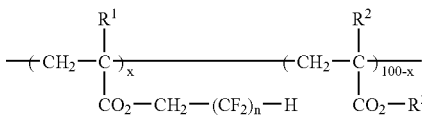

| | x | R$^1$ | n | R$^2$ | R$^3$ | Mw |
|---|---|---|---|---|---|---|
| FP-148 | 80 | H | 4 | CH$_3$ | CH$_3$ | 11000 |
| FP-149 | 90 | H | 4 | H | C$_4$H$_9$(n) | 7000 |
| FP-150 | 95 | H | 4 | H | C$_6$H$_{13}$(n) | 5000 |
| FP-151 | 90 | CH$_3$ | 4 | H | CH$_2$CH(C$_2$H$_5$)C$_4$H$_9$(n) | 15000 |
| FP-152 | 70 | H | 6 | CH$_3$ | C$_2$H$_5$ | 18000 |
| FP-153 | 90 | H | 6 | CH$_3$ | 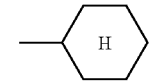 | 12000 |
| FP-154 | 80 | H | 6 | H | C$_4$H$_9$(sec) | 9000 |
| FP-155 | 90 | H | 6 | H | C$_{12}$H$_{25}$(n) | 21000 |
| FP-156 | 60 | CH$_3$ | 6 | H | CH$_3$ | 15000 |
| FP-157 | 60 | H | 8 | H | CH$_3$ | 10000 |
| FP-158 | 70 | H | 8 | H | C$_2$H$_6$ | 24000 |
| FP-159 | 70 | H | 8 | H | C$_4$H$_9$(n) | 5000 |
| FP-160 | 50 | H | 8 | H | C$_4$H$_9$(n) | 16000 |
| FP-161 | 80 | H | 8 | CH$_3$ | C$_4$H$_9$(iso) | 13000 |
| FP-162 | 80 | H | 8 | CH$_3$ | C$_4$H$_9$(t) | 9000 |
| FP-163 | 60 | H | 8 | H | 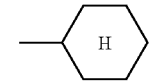 | 7000 |
| FP-164 | 80 | H | 8 | H | CH$_2$CH(C$_2$H$_5$)C$_4$H$_9$(n) | 8000 |

-continued

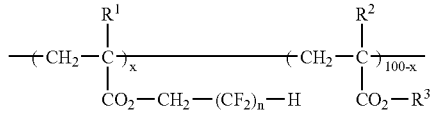

| | x | R$^1$ | n | R$^2$ | R$^3$ | Mw |
|---|---|---|---|---|---|---|
| FP-165 | 90 | H | 8 | H | C$_{12}$H$_{25}$(n) | 6000 |
| FP-166 | 80 | CH$_3$ | 8 | CH$_3$ | C$_4$H$_9$(sec) | 18000 |
| FP-167 | 70 | CH$_3$ | 8 | CH$_3$ | CH$_3$ | 22000 |
| FP-168 | 70 | H | 10 | CH$_3$ | H | 17000 |
| FP-169 | 90 | H | 10 | H | H | 9000 |

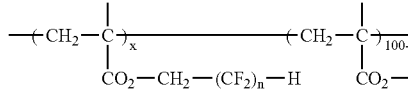

| | x | R$^1$ | n | R$^2$ | R$^3$ | Mw |
|---|---|---|---|---|---|---|
| FP-170 | 95 | H | 4 | CH$_3$ | —(CH$_2$CH$_2$O)$_2$—H | 18000 |
| FP-171 | 80 | H | 4 | H | —(CH$_2$CH$_2$O)$_2$—CH$_3$ | 16000 |
| FP-172 | 80 | H | 4 | H | —(C$_3$H$_6$O)$_7$—H | 24000 |
| FP-173 | 70 | CH$_3$ | 4 | H | —(C$_3$H$_6$O)$_{13}$—H | 18000 |
| FP-174 | 90 | H | 6 | H | —(CH$_2$CH$_2$O)$_2$—H | 21000 |
| FP-175 | 90 | H | 6 | CH$_3$ | —(CH$_2$CH$_2$O)$_9$—H | 9000 |
| FP-176 | 80 | H | 6 | H | —(CH$_2$CH$_2$O)$_2$—C$_4$H$_9$(n) | 12000 |
| FP-177 | 80 | H | 6 | H | —(C$_3$H$_6$O)$_7$—H | 34000 |
| FP-178 | 75 | H | 6 | H | —(C$_3$H$_6$O)$_{13}$—H | 11000 |
| FP-179 | 85 | CH$_3$ | 6 | CH$_3$ | —(C$_3$H$_6$O)$_{20}$—H | 18000 |
| FP-180 | 95 | CH$_3$ | 6 | CH$_3$ | —CH$_2$CH$_2$OH | 27000 |
| FP-181 | 80 | H | 8 | CH$_3$ | —(CH$_2$CH$_2$O)$_6$—H | 12000 |
| FP-182 | 95 | H | 8 | H | —(CH$_2$CH$_2$O)$_9$—CH$_3$ | 20000 |
| FP-183 | 90 | H | 8 | H | —(C$_3$H$_6$O)$_7$—H | 8000 |
| FP-184 | 95 | H | 8 | H | —(C$_3$H$_6$O)$_{20}$—H | 15000 |
| FP-185 | 90 | H | 8 | H | —(C$_3$H$_6$O)$_{12}$—H | 12000 |
| FP-186 | 80 | H | 8 | CH$_3$ | —(CH$_2$CH$_2$O)$_2$—H | 20000 |
| FP-187 | 95 | CH$_3$ | 8 | H | —(CH$_2$CH$_2$O)$_9$—CH$_3$ | 17000 |
| FP-188 | 90 | CH$_3$ | 8 | H | —(C$_3$H$_6$O)$_7$—H | 34000 |
| FP-189 | 80 | H | 10 | H | —(CH$_2$CH$_2$O)$_3$—H | 19000 |
| FP-190 | 90 | H | 10 | H | —(C$_3$H$_6$O)$_7$—H | 8000 |
| FP-191 | 80 | H | 12 | H | —(CH$_2$CH$_2$O)$_7$—CH$_3$ | 7000 |
| FP-192 | 95 | CH$_3$ | 12 | H | —(C$_3$H$_6$O)$_7$—H | 10000 |

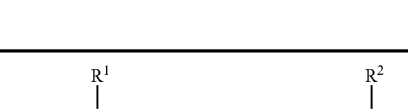

| | x | R$^1$ | p | q | R$^2$ | R$^3$ | Mw |
|---|---|---|---|---|---|---|---|
| FP-193 | 80 | H | 2 | 4 | H | C$_4$H$_9$(n) | 18000 |
| FP-194 | 90 | H | 2 | 4 | H | —(CH$_2$CH$_2$O)$_9$—CH$_3$ | 16000 |
| FP-195 | 90 | CH$_3$ | 2 | 4 | F | C$_6$H$_{13}$(n) | 24000 |
| FP-196 | 80 | CH$_3$ | 1 | 6 | F | C$_4$H$_9$(n) | 18000 |
| FP-197 | 95 | H | 2 | 6 | H | —(C$_3$H$_6$O)$_2$—H | 21000 |
| FP-198 | 90 | H | 3 | 6 | H | —CH$_2$CH$_2$OH | 9000 |
| FP-199 | 75 | H | 1 | 8 | F | CH$_3$ | 12000 |
| FP-200 | 80 | H | 2 | 8 | H | CH$_2$CH(C$_2$H$_6$)C$_4$H$_9$(n) | 34000 |
| FP-201 | 90 | CH$_3$ | 2 | 8 | H | —(C$_3$H$_6$O)$_7$—H | 11000 |
| FP-202 | 80 | H | 3 | 8 | CH$_3$ | CH$_3$ | 18000 |
| FP-203 | 90 | H | 1 | 10 | F | C$_4$H$_9$(n) | 27000 |
| FP-204 | 95 | H | 2 | 10 | H | —(CH$_2$CH$_2$O)$_9$—CH$_3$ | 12000 |
| FP-205 | 85 | CH$_3$ | 2 | 10 | CH$_3$ | C$_4$H$_9$(n) | 20000 |
| FP-206 | 80 | H | 1 | 12 | H | C$_6$H$_{13}$(n) | 8000 |
| FP-207 | 90 | H | 1 | 12 | H | —(C$_3$H$_6$O)$_{13}$—H | 15000 |

-continued $$-(CH_2-\underset{\underset{CO_2-(CH_2)_p-(CF_2)_q-H}{|}}{\overset{R^1}{\underset{|}{C}}})_x-(CH_2-\underset{\underset{CO_2-R^3}{|}}{\overset{R^2}{\underset{|}{C}}})_{100-x}$$

| | x | $R^1$ | p | q | $R^2$ | $R^3$ | Mw |
|---|---|---|---|---|---|---|---|
| FP-208 | 60 | $CH_3$ | 3 | 12 | $CH_3$ | $C_2H_5$ | 12000 |
| FP-209 | 60 | H | 1 | 16 | H | $CH_2CH(C_2H_6)C_4H_9(n)$ | 20000 |
| FP-210 | 80 | $CH_3$ | 1 | 16 | H | $—(CH_2CH_2O)_2—C_4H_9(n)$ | 17000 |
| FP-211 | 90 | H | 1 | 18 | H | $—CH_2CH_2OH$ | 34000 |
| FP-212 | 60 | H | 3 | 18 | $CH_3$ | $CH_3$ | 19000 |

The antireflection performance can also be prevented from deterioration by preventing the reduction in the surface energy at the time of overcoating the low refractive index layer on the hard coat layer. Also, when the surface tension of the coating solution is decreased by using a fluorine-based polymer at the coating of the hard coat layer to enhance the surface uniformity and maintain the high productivity by high-speed coating and reduction in the surface free energy is prevented by employing a surface treatment technique such as corona treatment, UV treatment, heat treatment, saponification treatment or solvent treatment, preferably corona treatment, after coating of the hard coat layer, the surface energy of the hard coat layer before coating of the low refractive index layer can be controlled to the above-described range and thereby the purpose can be achieved.

Furthermore, a thixotropic agent may be added in the coating composition for forming the hard coat layer of the present invention. Examples of the thixotropic agent include silica and mica each having a particle diameter of 0.1 μm or less. Usually, the content of such an additive is suitably on the order of 1 to 10 parts by mass per 100 parts by mass of the ultraviolet-curable resin.

In the case where the hard coat layer comes into contact with the transparent support, the solvent of the coating )solution for forming the hard coat layer preferably comprises at least one kind of a solvent capable of dissolving the transparent support (for example, triacetyl cellulose support) and at least one kind of a solvent incapable of dissolving the transparent support, so that both the control of surface irregularity of the hard coat layer (to reduce the irregularity size or flatten the surface) and the adhesion between the transparent support and the hard coat layer can be achieved. More preferably, at least one of the solvents incapable of dissolving the transparent support has a boiling point higher than that of at least one of the solvents capable of dissolving the transparent support. Still more preferably, the difference in the boiling point between a solvent having a highest boiling point out of the solvents incapable of dissolving the transparent support and a solvent having a highest boiling point out of the solvents capable of dissolving the transparent support is 30° C. or more, and most preferably 50° C. or more.

Examples of the solvent capable of dissolving the transparent support (preferably triacetyl cellulose) include:

ethers having a carbon number of 3 to 12, specifically, dibutyl ether, dimethoxymethane, dimethoxyethane, diethoxyethane, propylene oxide, 1,4-dioxane, 1,3-dioxolan, 1,3,5-trioxane, tetrahydrofuran, anisole and phenetole;

ketones having a carbon number of 3 to 12, specifically, acetone, methyl ethyl ketone, diethyl ketone, dipropyl ketone, diisobutyl ketone, cyclopentanone, cyclohexanone, methylcyclohexanone and methylcyclohexanone;

esters having a carbon number of 3 to 12, specifically, ethyl formate, propyl formate, n-pentyl formate, methyl acetate, ethyl acetate, methyl propionate, ethyl propionate, n-pentyl acetate and γ-butyrolactone; and an organic solvent having two or more kinds of functional groups, specifically, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate and ethyl acetoacetate.

One of these solvents may be used alone or two or more thereof may be used in combination. The solvent capable of dissolving the transparent support is preferably a ketone-based solvent.

Examples of the solvent incapable of dissolving the transparent support (preferably triacetyl cellulose) include methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-octanone, 2-pentanone, 2-hexanone, 2-heptanone, 3-pentanone, 3-heptanone and 4-heptanone.

One of these solvents may be used alone or two or more thereof may be used in combination.

The mass ratio (A/B) of the total amount (A) of the solvent capable of dissolving the transparent support to the total amount (B) of the solvent incapable of dissolving the transparent support is preferably from 5/95 to 50/50, more preferably from 10/90 to 40/60, still more preferably from 15/85 to 30/70.

(Low Refractive Index Layer)

The antireflection film of the present invention has a low refractive index layer as the outermost layer. The refractive index of the low refractive index layer is preferably from 1.20 to 1.46, more preferably from 1.25 to 1.41, and most preferably from 1.30 to 1.39. Furthermore, in view of reducing the reflectance, the low refractive index layer preferably satisfies the following mathematical formula (1):

$$(m_1/4)\lambda \times 0.7 < n_1 d_1 < (m_1/4)\lambda \times 1.3 \qquad \text{Mathematical Formula (1)}$$

wherein $m_1$ is a positive odd number, $n_1$ is the refractive index of the low refractive index layer, $d_1$ is the film thickness (nm) of the low refractive index layer, and λ is a wavelength and is a value in the range from 500 to 550 nm. Incidentally, when mathematical formula (1) is satisfied, this means that $m_1$ (a positive odd number, usually 1) satisfying mathematical formula (1) is present within the above-described wavelength range.

The low refractive index layer as the outermost layer of the antireflection film of the present invention is formed of the coating composition for the formation of a low refractive index layer of the present invention, comprising, as essential components, a fluorine-containing olefin-based polymer and a hollow silica fine particle having an average particle diameter of 5 to 200 nm and a refractive index of 1.17 to 1.40, the fluorine-containing olefin-based polymer having a polysiloxane segment in the main chain, having a fluorine content of 30 mass % or more, and containing a plurality of ethylenically unsaturated groups.

The dynamic friction coefficient on the surface of the low refractive index layer of the present invention is from 0.03 to 0.15, and the contact angle with water is preferably from 90 to 120°.

The fluorine-containing olefin-based polymer for use in the present invention is an olefin-based polymer having a polysiloxane segment represented by the following formula 1 in the main chain, and the proportion of the polysiloxane segment in the specific fluorine-based polymer is usually from 0.1 to 10 mol %.

Formula 1:

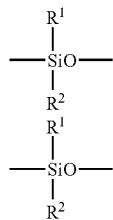

wherein $R^1$ and $R^2$ above, which may be the same or different, each represents a hydrogen atom, an alkyl group, an alkyl halide group or an aryl group.

The fluorine content of the fluorine-containing olefin-based polymer for use in the present invention is 30 mass % or more, preferably from 30 to 70 mass %, and the polystyrene-reduced number average molecular weight as determined by the gel permeation chromatography is preferably 5,000 or more, more preferably from 10,000 to 500,000. Here, the fluorine content is a value measured by the alizarin complexone method, and the number average molecular weight is a value determined by using tetrahydrofuran as the developer solvent.

The fluorine-containing olefin-based polymer for use in the present invention can be obtained by reacting (a) a fluorine-containing olefin compound (hereinafter referred to as a "component (a)"), (b) another monomer compound copolymerizable with the component (a) (hereinafter referred to as a "component (b)"), (c) an azo group-containing polysiloxane compound (hereinafter referred to as a "component (c)") and, if desired, (d) a reactive emulsifier (hereinafter referred to as a "component (d)").

Examples of the component (a) include a compound having at least one polymerizable unsaturated double bond and at least one fluorine atom, and specific examples thereof include (1) fluoroolefins such as tetrafluoroethylene, hexafluoropropylene, 3,3,3-trifluoropropylene and chlorotrifluoroethylene; (2) alkyl or alkoxyalkyl perfluorovinyl ethers; (3) perfluoro (alkyl vinyl ethers) such as perfluoro(methyl vinyl ether), perfluoro(ethyl vinyl ether), perfluoro(propyl vinyl ether), perfluoro(butyl vinyl ether) and perfluoro(isobutyl vinyl ether); (4) perfluoro(alkoxyalkyl vinyl ethers) such as perfluoro(propoxypropyl vinyl ether); (5) fluorine-containing (meth)acrylates such as trifluoroethyl (meth)acrylate, tetrafluoropropyl (meth)acrylate, octafluoropentyl (meth)acrylate and heptadecafluorodecyl (meth)acrylate; and others. One of these compounds may be used alone or two or more thereof may be used in combination. Among these compounds, preferred are fluoroolefins, perfluoro(alkyl vinyl ethers) and perfluoro(alkoxyalkyl vinyl ethers), and more preferred is a combination use of these compounds. Specifically, the component (a) is preferably one compound or two or more compounds selected from hexafluoropropylene, perfluoropropyl vinyl ether and perfluoropropoxypropyl vinyl ether.

Specific examples of the component (b) copolymerizable with the component (a) include (1) alkyl or cycloalkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, lauryl vinyl ether, cetyl vinyl ether, 2-ethylhexyl vinyl ether, ethylene glycol butyl vinyl ether, diethylene glycol monovinyl ether, triethylene glycol methyl vinyl ether and cyclohexyl vinyl ether; (2) carboxylic acid vinyl esters such as vinyl acetate, vinyl propionate, vinyl butyrate, vinyl pivalate, vinyl caproate, vinyl versatate, vinyl stearate and benzoic acid; (3) (α-olefins such as ethylene, propylene and isobutene; (4) vinyl aromatic compounds such as styrene, α-methylstyrene, o-methylstyrene, m-methylstyrene, p-methylstyrene, p-tert-butylstyrene, diisopropenylbenzene, o-chlorostyrene, m-chlorostyrene, p-chlorostyrene, 1,1-diphenylethylene, p-methoxystyrene, N,N-dimethyl-p-aminostyrene, N,N-diethyl-p-aminostyrene, vinylpyridine and vinylimidazole; (5) a carboxyl group-containing compound such as (meth)acrylic acid, crotonic acid, maleic acid, fumaric acid and itaconic acid; (6) alkyl (meth)acrylates such as methyl (meth)acrylate, ethyl (meth)acrylate, propyl (meth) acrylate, isopropyl (meth)acrylate, butyl (meth)acrylate, isobutyl (meth)acrylate, tert-butyl (meth)acrylate, pentyl (meth)acrylate, amyl (meth)acrylate, isoamyl (meth)acrylate, hexyl (meth)acrylate, heptyl (meth)acrylate, octyl (meth) acrylate, isooctyl (meth)acrylate, 2-ethylhexyl (meth)acrylate, nonyl (meth)acrylate, decyl (meth)acrylate, isodecyl (meth)-acrylate, undecyl (meth)acrylate, dodecyl (meth) acrylate, lauryl (meth)acrylate, stearyl (meth)acrylate and isostearyl (meth)acrylate; (7) hydroxyalkyl (meth)acrylates such as hydroxyethyl (meth)acrylate, hydroxypropyl (meth) acrylate and hydroxybutyl (meth)acrylate; (8) phenoxyalkyl (meth)acrylates such as phenoxyethyl (meth)acrylate and 2-hydroxy-3-phenoxypropyl (meth)acrylate; (9) alkoxyalkyl (meth)acrylates such as methoxyethyl (meth)acrylate, ethoxyethyl (meth)acrylate, propoxyethyl (meth)acrylate, butoxyethyl (meth)acrylate and methoxybutyl (meth)acrylate; (10) polyethylene glycol (meth)acrylates such as polyethylene glycol mono(meth)acrylate, ethoxydiethylene glycol (meth)acrylate, methoxypolyethylene glycol (meth) acrylate, phenoxypolyethylene glycol (meth)acrylate and nonylphenoxypolyethylene glycol (meth)acrylate; (11) polypropylene glycol (meth)acrylates such as polypropylene glycol mono(meth)acrylate, methoxypolypropylene glycol (meth)-acrylate, ethoxypolypropylene glycol (meth)acrylate and nonylphenoxypolypropylene glycol (meth)acrylate; (12) cycloalkyl (meth)acrylates such as cyclohexyl (meth)acrylate, 4-butylcyclohexyl (meth)acrylate, dicyclopentanyl (meth)acrylate, dicyclopentenyl (meth)acrylate, dicyclopentadienyl (meth)acrylate, bornyl (meth)acrylate, isobornyl (meth)acrylate and tricyclodecanyl (meth)acrylate; (13) (meth)acrylates such as benzyl (meth)acrylate, tetrahydrofurfuryl (meth)acrylate and compounds represented by the following formulae 2 to 4:

Formula 2:

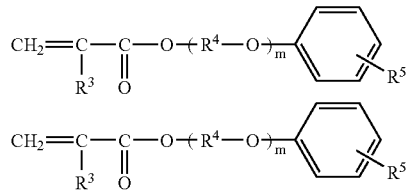

(wherein $R^3$ represents a hydrogen atom or a methyl group, $R^4$ represents an alkylene group having a carbon number of 2 to 6, $R^5$ represents a hydrogen atom or an alkyl group having a carbon number of 1 to 12, and m is an integer of 0 to 12);

Formula 3:

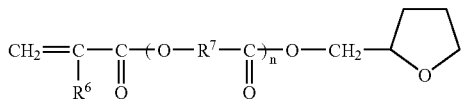

(wherein $R^6$ represents a hydrogen atom or methyl group, $R^7$ represents an alkylene group having a carbon number of 2 to 8, and n is an integer of 1 to 8);

Formula 4:

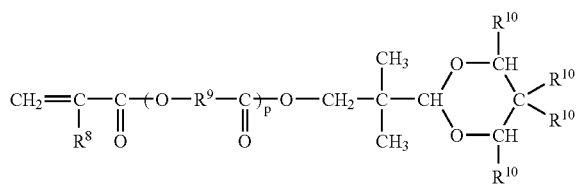

(wherein $R^8$ represents a hydrogen atom or a methyl group, $R^9$ represents an alkylene group having a carbon number of 2 to 8, $R^{10}$ represents a hydrogen atom or a methyl group, and p is an integer of 1 to 8);

lactam; and others. Among these, 2-hydroxyethyl vinyl ether and 2-hydroxybutyl vinyl ether are preferred. One of these compounds may be used alone or two or more thereof may be used in combination. Other than these monomers, by copolymerizing a monomer having various functional groups such as epoxy group and isocyanate group, a fluorine-containing olefin-based polymer having a functional group can be obtained.

Out of the above-described monomer compounds, from the standpoint of increasing the yield in a polymerization reaction for obtaining the fluorine-containing olefin-based polymer, alkyl vinyl ethers, cycloalkyl vinyl ethers and carboxylic acid vinyl esters are preferably used. On the other hand, from the standpoint of elevating the fluorine content in the specific fluorine-containing polymer, a low molecular weight monomer such as methyl vinyl ether, ethyl vinyl ether, n-propyl vinyl ether, isopropyl vinyl ether, isobutyl vinyl ether, vinyl acetate, vinyl propionate, vinyl butyrate and vinyl pivalate are preferably used. Furthermore, for elevating the hardness and decreasing the refractive index of the thin film after the curing of the curable resin composition, use of a branched monomer such as isopropyl vinyl ether, isobutyl vinyl ether, tert-butyl vinyl ether and vinyl pivalate, or an alicyclic monomer such as cyclohexyl vinyl ether is effective.

The azo group-containing polysiloxane compound as the component (c) is a compound having an easily thermally cleavable azo group —N=N— and a polysiloxane segment represented by formula 1, and such a compound can be produced by a method described, for example, in JP-A-6-93100. Specific examples of the component (c) include a compound represented by the following formula 5:

Formula 5:

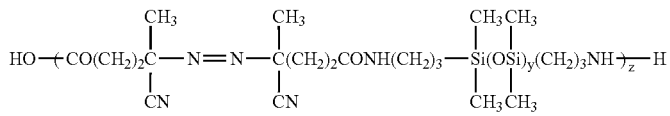

wherein y=10 to 500 and z=1 to 50. Examples of the commercially available product which can be used as the component (c) include "VPS-0501" and "VPS-1001" (produced by Wako Pure Chemicals Industries, Ltd.).

Preferred examples of the combination of the components (a), (b) and (c) include (1) fluoroolefin/alkyl vinyl ether/polydimethylsiloxane unit, (2) fluoroolefin/perfluoro(alkyl vinyl ether)/alkyl vinyl ether/polydimethylsiloxane unit, (3) fluoroolefin/perfluoro-(alkoxyalkyl)vinyl ether/alkyl vinyl ether/polydimethylsiloxane unit, (4) fluoroolefin/(perfluoroalkyl)vinyl ether/alkyl vinyl ether/polydimethylsiloxane unit, and (5) fluoroolefin/(perfluoroalkoxyalkyl)vinyl ether/alkyl vinyl ether/polydimethylsiloxane unit.

In the fluorine-containing olefin-based polymer of the present invention, the proportion of the structural unit originated in the component (a) is from 20 to 70 mol %, preferably from 25 to 65 mol %, more preferably from 30 to 60 mol %. If the proportion of the structural monomer originated in the component (a) is less than 20 mol %, the fluorine content in the specific fluorine-based copolymer obtained is excessively small and the cured product of the obtained curable resin composition can hardly have a sufficiently low refractive index, whereas if the proportion of the structural unit originated in the component (a) exceeds 70 mol %, the solubility of the obtained specific fluorine-based polymer in an organic

(14) (meth)acrylamides such as acryloylmorpholine, diacetone (meth)acrylamide, isobutoxymethyl (meth)acrylamide, dimethylaminoethyl (meth)acrylamide, diethylaminoethyl (meth)acrylamide, dimethylaminopropyl (meth)acrylamide, tert-octyl (meth)acrylamide, 7-amino-3,7-dimethyloctyl (meth)acrylamide, N,N-dimethyl (meth)acrylamide and N,N-diethyl (meth)acrylamide;

(15) unsaturated carboxylic acid esters such as methyl crotonate, ethyl crotonate, propyl crotonate, butyl crotonate, methyl cinnamate, ethyl cinnamate, propyl cinnamate, butyl cinnamate, dimethyl itaconate, diethyl itaconate, dimethyl maleate, diethyl maleate, dimethyl fumarate and diethyl fumarate;

(16) unsaturated nitriles such as (meth)acrylonitrile, α-chloroacrylonitrile, α-chloromethylacrylonitrile, α-methoxyacrylonitrile, α-ethoxyacrylonitrile, crotonitrile, cinnamonitrile, itacondinitrile, maleindinitrile and fumarodinitrile; (17) hydroxyl group-containing vinyl ethers such as 2-hydroxyethyl vinyl ether, 2-hydroxypropyl vinyl ether, 3-hydroxypropyl vinyl ether, 3-hydroxybutyl vinyl ether, 4-hydroxybutyl vinyl ether, 5-hydroxypentyl vinyl ether and 6-hydroxyhexyl vinyl ether; (18) hydroxyl group-containing allyl ethers such as 2-hydroxyethyl allyl ether, 4-hydroxybutyl allyl ether and glycerol monoallyl ether; (19) N-vinyl lactams such as N-vinyl-2-pyrrolidone and N-vinyl-2-caprosolvent is extremely decreased and at the same time, the obtained curable resin composition comes to have low transparency and poor adhesion to the substrate.

In the fluorine-containing olefin-based polymer, the proportion of the structural unit originated in the component (b) is from 10 to 70 mol %, preferably from 15 to 65 mol %, more preferably from 30 to 60 mol %. If the proportion of the structural monomer originated in the component (b) is less than 10 mol %, the specific fluorine-based polymer comes to exhibit poor solubility in an organic solvent, whereas if the proportion exceeds 70 mol %, the cured product of the curable resin composition is deteriorated in the optical properties of transparency and low reflectance.

The azo group-containing polysiloxane as the component (c) is a thermal radical generator by itself and acts as a polymerization initiator in a polymerization reaction for obtaining the specific fluorine-based polymer, but other radical initiator may also be used in combination. In the specific fluorine-based polymer, the proportion of the structural unit originated in the component (c) is such a proportion that the polysiloxane segment represented by formula 1 occupies from 0.1 to 20 mol %, preferably from 0.1 to 15 mol %, more preferably from 0.1 to 10 mol %. If the proportion of the polysiloxane segment represented by formula 1 exceeds 20 mol %, the obtained specific fluorine-based polymer may have poor transparency and in the case of using it as a coating agent, repelling readily occurs at the coating.

In the present invention, a reactive emulsifier, that is, a component (d), is preferably used as a monomer component other than the components (a) to (c). When the component (d) is used, the specific fluorine-based polymer when used as a coating agent can exhibit good coatability and leveling property. As for the reactive emulsifier, particularly, a nonionic reactive emulsifier is preferably used. Specific examples of the nonionic reactive emulsifier include a compound represented by the following formula 6:

Formula 6:

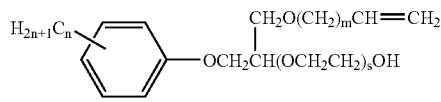

wherein n, m and s each represents a repeating unit and preferably, n=1 to 20, m=0 to 4, and s=3 to 50. Examples of the commercially available compound which can be used as the component (d) include "ADEKA REASOAP NE-5", "ADEKA REASOAP NE-10", "ADEKA REASOAP NE-20", "ADEKA REASOAP NE-30" and "ADEKA REASOAP NE-40" (produced by Asahi Denka Co., Ltd.).

In the fluorine-containing olefin-based polymer of the present invention, the proportion of the structural unit originated in the component (d) is usually from 0 to 10 mol %, preferably from 0.1 to 5 mol %. If this proportion exceeds 10 mol %, the obtained curable resin composition becomes viscous and difficult to handle and when used as a coating agent, decreases in the moisture resistance.

In the case where the component (d) is contained, preferred examples of the combination (1) fluoroolefin/alkyl vinyl ether/polydimethylsiloxane unit/nonionic reactive emulsifier, (2) fluoroolefin/perfluoro(alkyl vinyl ether)/alkyl vinyl ether/polydimethylsiloxane unit/nonionic reactive emulsifier, (3) fluoroolefin/perfluoro(alkoxyalkyl) vinyl ether/alkyl vinyl ether/polydimethylsiloxane unit/nonionic reactive emulsifier, (4) fluoro-olefin/(perfluoroalkyl)vinyl ether/alkyl vinyl ether/polydimethylsiloxane unit/nonionic reactive emulsifier, and (5) fluoroolefin/(perfluoroalkoxyalkyl)vinyl ether/alkyl vinyl ether/polydimethylsiloxane unit/nonionic reactive emulsifier.

In the present invention, as for the polymerization mode for producing the fluorine-containing olefin-based polymer, any of emulsion polymerization, suspension polymerization, block polymerization and solution polymerization each using a radical initiator may be used. Also, the polymerization operation may be appropriately selected from, for example, batch system, semi-continuous system and continuous system.

Examples of the radical polymerization initiator which can be used in combination with the component (c) include (1) diacyl peroxides such as acetyl peroxide and benzoyl peroxide; (2) ketone peroxides such as methyl ethyl ketone peroxide and cyclohexanone peroxide; (3) hydroperoxides such as hydrogen peroxide, tert-butyl hydroperoxide and cumene hydroperoxide; (4) dialkyl peroxides such as di-tert-butyl peroxide, dicumyl peroxide and dilauroyl peroxide; (5) peroxy esters such as tert-butylperoxy acetate and tert-butylperoxy pivalate; (6) azo-based compounds such as azobisisobutyronitrile and azobisisovaleronitrile; and (7) persulfates such as ammonium persulfate, sodium persulfate and potassium persulfate.

Specific examples of the radical polymerization initiator include an iodine-containing fluorine compound such as perfluoroethyl iodide, perfluoropropyl iodide, perfluorobutyl iodide, (perfluorobutyl)ethyl iodide, perfluorohexyl iodide, 2-(perfluorohexyl)ethyl iodide, perfluoroheptyl iodide, perfluorooctyl iodide, 2-(perfluorooctyl)ethyl iodide, perfluorodecyl iodide, 2-(perfluorodecyl)ethyl iodide, heptafluoro-2-iodopropane, perfluoro-3-methylbutyl iodide, perfluoro-5-methylhexyl iodide, 2-(perfluoro-5-methylhexyl)ethyl iodide, perfluoro-7-methyloctyl iodide, 2-(perfluoro-7-methyloctyl)ethyl iodide, perfluoro-9-methyldecyl iodide, 2-(perfluoro-9-methyldecyl)ethyl iodide, 2,2,3,3-tetrafluoropropyl iodide, 1H, 1H, 5H-octafluoropentyl iodide, 1H, 1H, 7H-dodecafluoroheptyl iodide, tetrafluoro-1,2-diiodoethane, octafluoro-1,4-diiodobutane and dodecafluoro-1,6-diiodohexane. The iodine-containing fluorine compound may be used alone or in combination with the above-described organic peroxide, azo-based compound or persulfate. Among these radical polymerization initiators which can be used in combination with the component (c), dilauroyl peroxide is particularly preferred.

The polymerization reaction for obtaining the fluorine-containing olefin-based polymer is preferably performed in a solvent system using a solvent. Preferred examples of the organic solvent used here include (1) esters such as ethyl acetate, butyl acetate, isopropyl acetate, isobutyl acetate and cellosolve acetate; (2) ketones such as acetone, methyl ethyl ketone, methyl isobutyl ketone and cyclohexanone; (3) cyclic ethers such as tetrahydrofuran and dioxane; (4) amides such as N,N-dimethylformamide and N,N-dimethylacetamide; (5) aromatic hydrocarbons such as toluene and xylene; and others. If desired, an alcohol, an aliphatic hydrocarbon or the like may be further mixed and used. Among those solvents, ethyl acetate and methyl isobutyl ketone are preferred in view of solubility of each component.

The fluorine-containing olefin-based polymer constituting the coating composition for the formation of a low refractive index layer of the present invention further contains a plurality of ethylenically unsaturated groups. The number of ethylenically unsaturated groups contained in the fluorine-containing olefin-based polymer is 2 or more, preferably 5 or more, more preferably 10 or more. The fluorine-containing olefin-based polymer has curability by virtue of containing a plurality of ethylenically unsaturated groups which are photopolymerizable.

With respect to the method of introducing a photopolymerizable group, a crosslinking functional group is first introduced into the fluorine-containing olefin-based polymer and then reacted with a compound containing a photopolymerizable group and a group capable of reacting with the crosslinking functional group, thereby introducing the photopolymerizable group.

The crosslinking functional group-containing copolymer can be obtained by using a crosslinking functional group-containing copolymerizable monomer as the component (b). Examples of the crosslinking functional group include an anhydride group of hydroxyl group, carboxyl group or dicarboxylic acid, an epoxy group, an amino group, a hydrolyzable silyl group, a silanol group, an isocyanate group and a thiol group.

Specific suitable examples of the crosslinking functional group-containing copolymerizable monomer include a monomer containing a hydroxyl group, such as hydroxyethyl vinyl ether, hydroxybutyl vinyl ether and hydroxyethyl (meth)acrylate; a monomer containing a carboxyl group, such as vinylacetic acid, crotonic acid, cinnamic acid, maleic acid, fumaric acid, itaconic acid, citraconic acid and (meth) acrylic acid; a monomer containing an anhydride group of dicarboxylic acid, such as maleic anhydride and phthalic anhydride; a monomer containing an epoxy group, such as vinyl glycidyl ether, allyl glycidyl ether, glycidyl (meth)acrylate, glycidyl crotonate and methyl glycidyl maleate; and a monomer containing a hydrolyzable silyl group, such as vinyltrimethoxysilane. When a crosslinking functional group-containing polymer is used as the specific fluorine-based polymer and a crosslinking compound which is described later is added in the process of preparing the coating composition for the formation of a low refractive index layer of the present invention, a crosslinked structure can be introduced into the cured film formed of the composition and therefore, the cured film can have high hardness and be more enhanced in the solvent resistance and chemical resistance.

The photopolymerizable group-containing copolymer can be obtained by reacting the crosslinking functional group-containing copolymer with a compound containing a photopolymerizable group and a group capable of reacting with the crosslinking functional group, thereby introducing the photopolymerizable group into the copolymer. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinonediazido group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. Not only one of these groups but also two or more thereof may be contained. Among these, a (meth)acryloyl group and a cinnamoyl group are preferred, and a (meth)acryloyl group is more preferred.

Specific examples of the method for preparing the photopolymerizable group-containing copolymer include, but are not limited to, the following methods:

(1) a method where a crosslinking functional group-containing copolymer having a hydroxyl group is esterified through a reaction with a (meth)acrylic acid chloride;

(2) a method where a crosslinking functional group-containing copolymer having a hydroxyl group is urethanized through a reaction with a (meth)acrylic acid ester containing an isocyanate group;

(3) a method where a crosslinking functional group-containing copolymer having an epoxy group is esterified through a reaction with a (meth)acrylic acid; and (4) a method where a crosslinking functional group-containing copolymer having a carboxyl group is esterified through a reaction with a (meth)acrylic acid ester containing an epoxy group.

After the fluorine-containing olefin-based polymer is obtained in this way, the reaction solution obtained by the polymerization reaction may be used as it is, but the polymerization reaction solution may also be freely subjected to an appropriate after-treatment. The after-treatment may be performed according to, for example, a general re-precipitation process as represented by a purification method where the polymerization reaction solution is added dropwise to an insolubilizing solvent comprising an alcohol or the like for the specific fluorine-based polymer and thereby, the specific fluorine-based polymer is coagulated. By dissolving the obtained solid copolymer in a solvent, a fluorine-containing olefin-based polymer solution can be prepared. Also, the solution after removing the residual monomer from the polymerization reaction solution may be used as a fluorine-containing olefin-based polymer solution as it is.

According to the coating composition for the formation of a low refractive index layer of the present invention obtained by using a photopolymerizable group-containing polymer as the fluorine-containing olefin-based polymer, when the coating film obtained from this composition is irradiated with radiation, a photopolymerization reaction takes place and a crosslinked structure is introduced into the resulting cured film, so that the cured film can have high hardness and be more enhanced in the solvent resistance, chemical resistance, antifouling property and the like.

In the low refractive index layer (coating composition for the formation of a low refractive index layer) of the present invention, for the purpose of more enhancing the antifouling property, a reactive organic functional group-containing polysiloxane compound represented by the following formula 7 is preferably added.

Formula 7:

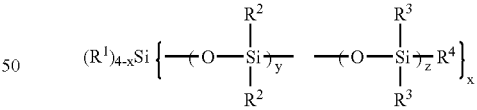

The ratio of the polysiloxane compound to the fluorine-containing olefin-based polymer is, in terms of the mass ratio, preferably from 0.05:100 to 20:100, more preferably from 0.5:100 to 5:100.

In formula 7, $R^1$ to $R^4$ each represents a substituent having a carbon number of 1 to 20, preferably from 1 to 10; when each substituent is present in a plural number, these groups may be the same or different; and at least one group of $R^1$, $R^3$ and $R^4$ represents a reactive organic functional group.

The term "reactive organic functional group" as used in the present invention means a group capable of forming a bond through a reaction with a crosslinking group in a fluorine-containing olefin-based polymer or hardening agent used to form the low refractive index layer. Examples thereof include a group having an active hydrogen atom, such as hydroxyl group, carboxyl group, amino group, carbamoyl group, mercapto group, β-ketoester group, hydrosilyl group and silanol group; a cationic polymerizable group such as epoxy group, oxetanyl group, oxazolyl group and vinyloxy group; a group having an unsaturated double bond capable of being added or polymerized with a radical species, such as acryloyl group, methacryloyl group and allyl group; a hydrolyzable silyl group such as alkoxysilyl group and acryloxysilyl group; and a group capable of being substituted with an acid anhydride, an isocyanate group or a nucleophilic reagent, such as active halogen atom and sulfonic acid ester.

This reactive group is important, for example, to compatibilize a silicone component in the low refractive index layer or prevent it from bleeding out and is appropriately selected according to reactivity of the fluorine-containing olefin-based polymer or hardening agent contained in the low refractive index layer. In the present invention, it is particularly preferred that the fluorine-containing olefin-based polymer or hardening agent has the same functional group as the reactive organic functional group in formula 7. In particular, this functional group is preferably a cationic ring-opening polymerization reactive group (more preferably an epoxy group or an oxetanyl group) or a radical polymerization reactive group (more preferably a (meth)acryloyl group).

In formula 7, $R^2$ is a substituted or unsubstituted organic group having a carbon number of 1 to 20, preferably an alkyl group having a carbon number of 1 to 10 (e.g., methyl, ethyl, hexyl), a fluorinated alkyl group (e.g., trifluoromethyl, pentafluoroethyl), or an aryl group having a carbon number of 6 to 20 (e.g., phenyl, naphthyl), more preferably an alkyl group having a carbon number of 1 to 5, a fluorinated alkyl group, or a phenyl group, still more preferably a methyl group.

x represents an integer satisfying $1 \leq x \leq 4$. y represents an integer satisfying $10 \leq y \leq 500$, preferably $50 \leq y \leq 400$, more preferably $100 \leq y \leq 300$.

z represents an integer satisfying $0 \leq z \leq 500$, preferably $0 \leq z \leq y$, more preferably $0 \leq z \leq 0.5y$.

The polysiloxane structure in the compound represented by formula 7 may be a homopolymer where the repeating unit ($-OSi(R^2)_2-$) comprises only a single substituent ($R^2$), or may be a random or block copolymer comprising a combination of repeating units having different substituents.

The molecular weight of the compound represented by formula 7 is preferably from $10^3$ to $10^6$, more preferably from $5 \times 10^3$ to $5 \times 10^5$, still more preferably from $10^4$ to $10^5$.

As for the polysiloxane compound represented by formula 7, a commercially available product (for example, KF-100T, X-22-169AS, KF-102, X-22-3701IE, X-22-164B, X-22-5002, X-22-173B, X-22-174D, X-22-167B and X-22-161AS (each trade name, produced by Shin-Etsu Chemical Co., Ltd.); AK-5, AK-30 and AK-32 (each trade name, produced by Toagosei Co., Ltd.); and. SILAPLANE FM0275 and SILAPLANE FM0721 (produced by Chisso Corp.) may also be used, or the compound may be synthesized, for example, by a method of introducing a functional group into a commercially available polysiloxane compound having a reactive group such as hydroxyl group, amino group or mercapto group.

In order to satisfy both the low refractive index and the scratch resistance, the low refractive index layer of the present invention further comprises a hollow silica fine particle.

The refractive index of the hollow silica fine particle is preferably from 1.17 to 1.40, more preferably from 1.17 to 1.35, and most preferably from 1.17 to 1.30. The refractive index used here indicates a refractive index of the particle as a whole and does not indicate a refractive index of only silica as an outer shell forming the hollow silica particle. At this time, assuming that the radius of the cavity inside the particle is a and the radius of the outer shell of the particle is b, the porosity x is calculated according the following mathematical formula (2).

$$x=(4\pi a^3/3)/(4\pi b^3/3)\times 100 \qquad \text{Formula (2)}$$

The porosity x is preferably from 10 to 60%, more preferably from 20 to 60%, and most preferably from 30 to 60%. If the hollow silica particle is rendered to have a lower refractive index and a higher porosity, the thickness of the outer shell becomes small and the strength as a particle decreases. Therefore, in view of scratch resistance, a particle having a refractive index as low as less than 1.17 cannot be used.

Here, the refractive index of the hollow silica particle was measured by an Abbe refractometer (manufactured by ATAGO K.K.).

The production method of the hollow silica fine particle is described, for example, in JP-A-2001-233611 and JP-A-2002-79616.

The coated amount of the hollow silica fine particle is preferably from 1 to 100 mg/m$^2$, more preferably from 5 to 80 mg/m$^2$, still more preferably from 10 to 60 mg/m$^2$. When the coated amount is in the above-described range, the effect of reducing the refractive index or improving the scratch resistance is brought out and at the same time, the low refractive index layer surface is free from generation of fine irregularities, eliminating the fear of deterioration in the appearance (e.g., real black) or the integrated reflectance.

The average particle diameter of the hollow silica fine particles is from 5 to 200 nm, preferably from 20 to 150 nm, more preferably from 30 to 80 nm, still more preferably from 40 to 60 nm.

When the particle diameter of the hollow silica fine particle is in this range, the proportion of the cavity is appropriate, the refractive index is decreased, and the fear of deterioration in the appearance (e.g., real black) or the integrated reflectance due to fine irregularities on the low refractive index surface is eliminated.

The silica in the outer shell portion of the hollow silica fine particle may be crystalline or amorphous. As for the size distribution of the hollow silica fine particle, a monodisperse particle is preferred, but the particle may be a polydisperse particle or may be even an aggregated particle as long as the predetermined particle diameter is satisfied. The shape is most preferably spherical but even if amorphous, there arises no problem.

The average particle diameter of the hollow silica fine particle can be measured from an electron micrograph.

In the present invention, for the purpose of enhancing the scratch resistance, another inorganic fine particle may be contained in combination with the hollow silica fine particle.

The inorganic fine particle is contained in the low refractive index layer and therefore, preferably has a low refractive index.

Examples thereof include fine magnesium fluoride and silica. Particularly, in view of refractive index, dispersion stability and cost, a silica fine particle without cavity is preferred. The particle diameter of the silica fine particle without cavity is preferably from 30 to 150 nm, more preferably from 35 to 80 nm, and most preferably from 40 to 60 nm.

Also, at least one silica fine particle having an average particle diameter of less than 25% of the thickness of the low refractive index layer (this particle is referred to as a "small particle-size silica fine particle") is preferably used in combination with the silica fine particle having the above-described particle diameter (this particle is referred to as a "large particle-size silica fine particle").

The small particle-size silica fine particle can be present in a gap between large particle-size silica fine particles and therefore, can contribute as a holding agent for the large particle-size silica fine particle.

The average particle diameter of the small particle-size silica fine particle is preferably from 1 to 20 nm, more preferably from 5 to 15 nm, still more preferably from 10 to 15 nm. Use of such a silica fine particle is preferred in view of the raw material cost and the holding agent effect.

The silica fine particle may be subjected to a physical surface treatment such as plasma discharge treatment and corona discharge treatment, or a chemical surface treatment with a surfactant, a coupling agent or the like, so as to stabilize the dispersion in a liquid dispersion or a coating solution or to enhance the affinity for or binding property with a binder component. Use of a coupling agent is particularly preferred. As for the coupling agent, an alkoxy metal compound (e.g., titanium coupling agent, silane coupling agent) is preferably used. Among these, a silane coupling agent is preferred, and an organosilane compound represented by formula (1) or (2) is preferred. A treatment with a silane coupling agent having an acryloyl group or a methacryloyl group is particularly effective.

The coupling agent may be used as a surface treating agent for previously applying a surface treatment to the inorganic fine particle of the low refractive index layer before the coating solution for the layer is prepared, but the coupling agent is preferably further added as an additive at the preparation of the coating solution for the low refractive index layer and incorporated into the layer.

The silica fine particle is preferably dispersed in a medium in advance of the surface treatment so as to reduce the load of the surface treatment.

In the present invention, from the standpoint of scratch resistance, a so-called sol component, that is, at least either a hydrolysate or a partial condensate of an organosilane compound (hereinafter referred to as a "sol component"), is preferably incorporated into at least either one of the hard coat layer and the low refractive layer, more preferably into both the hard coat layer and the low refractive index layer.

The appropriate content of the organosilane sol varies depending on the layer to which the sol is added, but when added to the low refractive index layer, the amount added is preferably 0.1 to 50 mass %, more preferably from 0.5 to 20 mass %, still more preferably from 1 to 10 mass %, based on the entire solid content of the low refractive index layer.

In view of, for example, the effect by the addition of the sol and the refractive index of the layer as well as the shape-surface state of the layer formed, the amount used of the organosilane sol in the low refractive index layer is preferably from 5 to 100 mass %, more preferably from 5 to 40 mass %, still more preferably from 8 to 35 mass %, yet still more preferably from 10 to 30 mass %, based on the fluorine-containing olefin-based polymer.

The amount added of the organosilane sol to the hard coat layer is preferably from 0.5 to 50 mass %, more preferably from 1 to 30 mass %, more preferably from 2 to 20 mass %, based on the entire solid content of the hard coat layer. The amount added to a layer other than the hard coat layer is preferably from 0.001 to 50 mass %, more preferably from 0.01 to 20 mass %, still more preferably from 0.05 to 10 mass %, yet still more preferably from 0.1 to 5 mass %, based on the entire solid content of the layer containing it (layer to which added).

The organosilane compound used can be represented by the following formula (1):

$$(R^{10})_m\text{—Si}(X)_{4-m} \quad \text{Formula (1)}$$

In formula (1), $R^{10}$ represents a substituted or unsubstituted alkyl group or a substituted or unsubstituted aryl group.

X represents a hydroxyl group or a hydrolyzable group such as an alkoxy group (preferably an alkoxy group having a carbon number of 1 to 5, e.g., methoxy, ethoxy), a halogen atom (e.g., Cl, Br, I) and $R^2COO$ (wherein $R^2$ is preferably a hydrogen atom or an alkyl group having a carbon number of 1 to 5, e.g., $CH_3COO$, $C_2H_5COO$), and X is preferably an alkoxy group, more preferably a methoxy group or an ethoxy group.

m represents an integer of 1 to 3. When a plurality of $R^{10}$s or Xs are present, the plurality of $R^{10}$s or Xs may be the same or different. m is preferably 1 or 2, more preferably 1.

The substituent contained in $R^{10}$ is not particularly limited, but examples thereof include a halogen (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxy-carbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

When a plurality of $R^{10}$s are present, at least one is preferably a substituted alkyl group or a substituted aryl group.

Among the organosilane compounds represented by formula (1), an organosilane compound having a vinyl polymerizable substituent represented by the following formula (2) is preferred.

Formula (2):

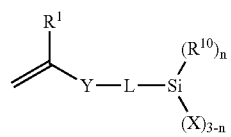

In formula (2), $R^1$ represents a hydrogen atom, an alkyl group (e.g., methyl, ethyl), an alkoxy group (e.g., methoxy, ethoxy), an alkoxycarbonyl group (e.g., methoxycarbonyl, ethoxycarbonyl), a cyano group, or a halogen atom (e.g., fluorine, chlorine). $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, an ester group, an amido group, an ether group or a urea group. Y is preferably a single bond, an ester group or an amido group, more preferably a single bond or an ester group, still more preferably an ester group.

L represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group. L is preferably a substituted or unsubstituted alkylene group, a substituted or unsubstituted arylene group, or a substituted or unsubstituted alkylene group having in the inside thereof a linking group, more preferably an unsubstituted alkylene group, an unsubstituted arylene group or an unsubstituted alkylene group having in the inside thereof a linking group comprising an ether or an ester, still more preferably an unsubstituted alkylene group or an unsubstituted alkylene group having in the inside thereof a linking group comprising an ether or an ester. Examples of the substituent include a halogen, a hydroxyl group, a mercapto group, a carboxyl group, an epoxy group, an alkyl group and an aryl group. These substituents each may be further substituted.

n represents 0 or 1. When a plurality of Xs are present, the plurality of Xs may be the same or different. n is preferably 0.

$R^{10}$ has the same meaning as in formula (1) and is preferably a substituted or unsubstituted alkyl group or an unsubstituted aryl group, more preferably an unsubstituted alkyl group or an unsubstituted aryl group.

X has the same meaning as in formula (1) and is preferably a halogen, a hydroxyl group or an unsubstituted alkoxy group, more preferably a chlorine atom, a hydroxyl group or an unsubstituted alkoxy group having a carbon number of 1 to 6, still more preferably a hydroxyl group or an alkoxy having a carbon number of 1 to 3, and yet still more preferably a methoxy group.

As for the organosilane compound, two or more compounds represented by formulae (1) and (2) may be used in combination. Specific examples of the compounds represented by formulae (1) and (2) are set forth below, but the present invention is not limited thereto.

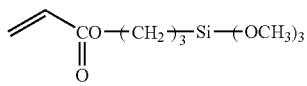

M-1

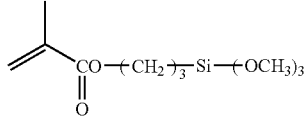

M-2

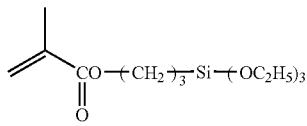

M-3

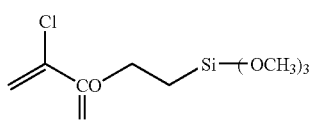

M-4

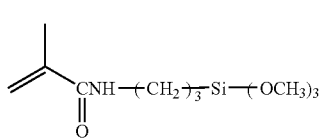

M-5

-continued

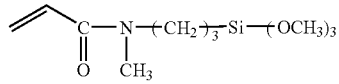

M-6

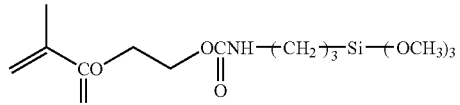

M-7

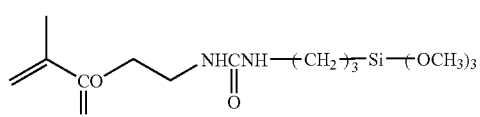

M-8

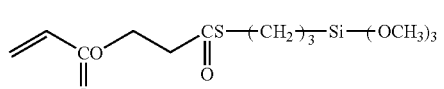

M-9

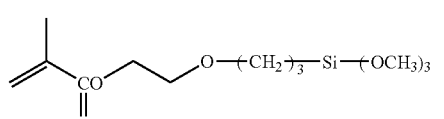

M-10

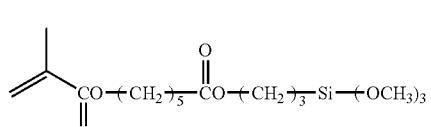

M-11

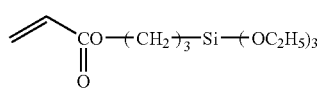

M-12

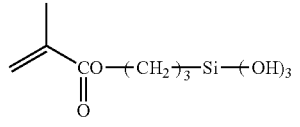

M-13

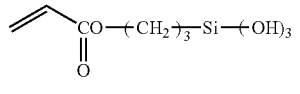

M-14

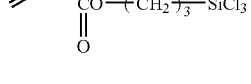

M-15

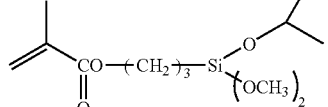

M-16

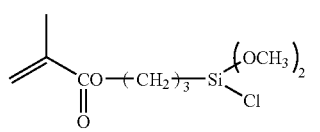

M-17

M-18

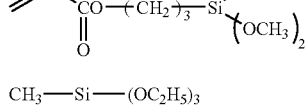

M-19

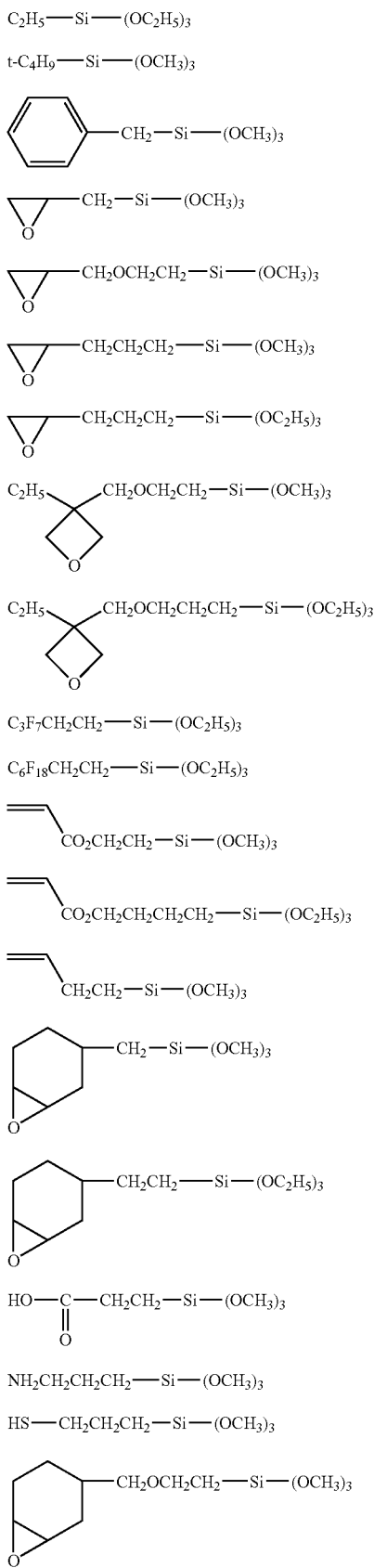
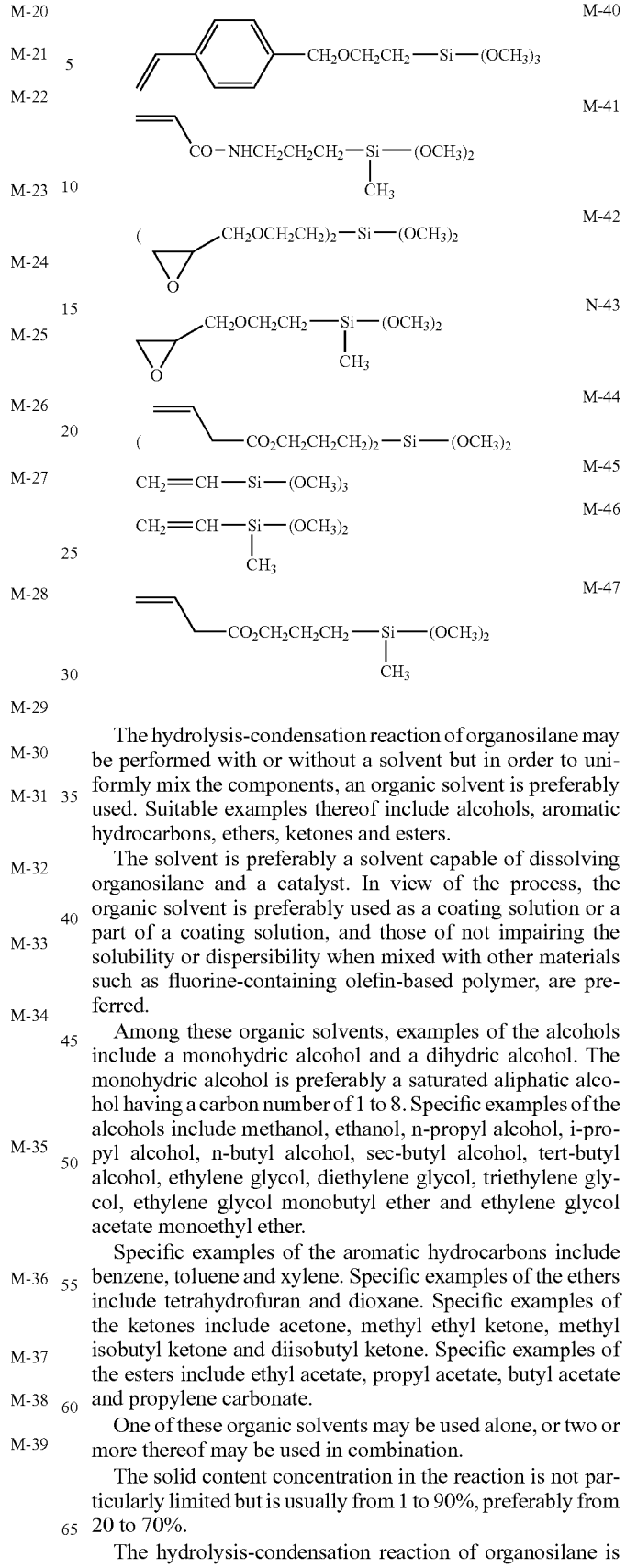

The hydrolysis-condensation reaction of organosilane may be performed with or without a solvent but in order to uniformly mix the components, an organic solvent is preferably used. Suitable examples thereof include alcohols, aromatic hydrocarbons, ethers, ketones and esters.

The solvent is preferably a solvent capable of dissolving organosilane and a catalyst. In view of the process, the organic solvent is preferably used as a coating solution or a part of a coating solution, and those of not impairing the solubility or dispersibility when mixed with other materials such as fluorine-containing olefin-based polymer, are preferred.

Among these organic solvents, examples of the alcohols include a monohydric alcohol and a dihydric alcohol. The monohydric alcohol is preferably a saturated aliphatic alcohol having a carbon number of 1 to 8. Specific examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol acetate monoethyl ether.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate.

One of these organic solvents may be used alone, or two or more thereof may be used in combination.

The solid content concentration in the reaction is not particularly limited but is usually from 1 to 90%, preferably from 20 to 70%.

The hydrolysis-condensation reaction of organosilane is preferably performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum and tetrabutoxyzirconium; and metal chelate compounds with the center metal being a metal such as Zr, Ti or Al. In view of production stability or storage stability of the sol solution, an acid catalyst(inorganic acids, organic acids) and a metal chelate compound are preferred. As for the acid catalyst, an inorganic acid such as hydrochloric acid and sulfuric acid, and an organic acid having an acid dissociation constant (pKa value (25° C.)) of 4.5 or less in water are preferred, a hydrochloric acid, a sulfuric acid and an organic acid having an acid dissociation constant of 3.0 or less in water are more preferred, a hydrochloric acid, a sulfuric acid and an organic acid having an acid dissociation constant of 2.5 or less in water are still more preferred, and an organic acid having an acid dissociation constant of 2.5 or less in water is yet still more preferred, with a methanesulfonic acid, an oxalic acid, a phthalic acid and a malonic acid being more preferred, and an oxalic acid being still more preferred.

The hydrolysis-condensation reaction is usually performed by adding water in an amount of 0.3 to 2 mol, preferably 0.5 to 1 mol, per mol of the hydrolyzable group of organosilane, and stirring the solution with or without the above-described solvent at 25 to 100° C. preferably in the presence of a catalyst.

In the case where the hydrolyzable group is an alkoxide and the catalyst is an organic acid, since the carboxyl group or sulfo group of the organic acid supplies a proton, the amount added of water can be reduced. The amount added of water is from 0 to 2 mol, preferably from 0 to 1.5 mol, more preferably from 0 to 1 mol, and still more preferably from 0 to 0.5 mol, per mol of the alkoxide group of the organosilane. In the case of using an alcohol as the solvent, addition of substantially no water is also suitable.

In the case where the catalyst is an inorganic acid, the amount used of the catalyst is from 0.01 to 10 mol %, preferably from 0.1 to 5 mol %, based on the hydrolyzable group. In the case where the catalyst is an organic acid, the optimum amount used of the catalyst varies depending on the amount added of water, but when water is added, the amount used of the catalyst is from 0.01 to 10 mol %, preferably from 0.1 to 5 mol %, based on the hydrolyzable group, and when water is not substantially added, the amount used of the catalyst is from 1 to 500 mol %, preferably from 10 to 200 mol %, more preferably from 20 to 200 mol %, still more preferably from 50 to 150 mol %, yet still more preferably from 50 to 120 mol %, based on the hydrolyzable group.

The reaction is performed with stirring at 25 to 100° C., but it is preferred that the reaction is appropriately adjusted depending upon the reactivity of the organosilane.

As for the metal chelate compound, any metal chelate compound may be suitably used without particular limitation as long as an alcohol represented by the formula: $R^3OH$ (wherein $R^3$ represents an alkyl group having a carbon number of 1 to 10) and a compound represented by $R^4COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10) are present as ligands and the center metal is a metal selected from Zr, Ti and Al. Within this scope, two or more kinds of metal chelate compounds may be used in combination. The metal chelate compound for use in the present invention is preferably a compound selected from the group consisting of compounds represented by the formulae: $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$, and has an action to accelerate a condensation reaction of the hydrolysate and/or partial condensate of an organosilane compound.

In the metal chelate compounds, $R^3$ and $R^4$, which may be the same or different, each represents an alkyl group having a carbon number of 1 to 10, specifically, such as ethyl group, n-propyl group, i-propyl group, n-butyl group, sec-butyl group, tert-butyl group and n-pentyl group. $R^5$ represents an alkyl group having a carbon number of 1 to 10 similarly to the above, or an alkoxy group having a carbon number of 1 to 10, such as methoxy group, ethoxy group, n-propoxy group, i-propoxy group, n-butoxy group, sec-butoxy group and tert-butoxy group. Also, in the metal chelate compounds, p1, p2, q1, q2, r1 and r2 each represents an integer as determined such that p1+p2 is 4, q1+q2 is 4, and r1+r2 is 3.

Specific examples of these metal chelate compounds include a zirconium chelate compound such as tri-n-butoxyethyl acetoacetate zirconium, di-n-butoxybis(ethyl acetoacetate) zirconium, n-butoxytris(ethyl acetoacetate) zirconium, tetrakis(n-propyl acetoacetate) zirconium, tetrakis(acetyl acetoacetate) zirconium and tetrakis(ethyl aetoacetate) zirconium; a titanium chelate compound such as diisopropoxybis (ethyl acetoacetate) titanium, diisopropoxybis(acetyl acetate) titanium and diisopropoxybis(acetylacetone) titanium; and an aluminum chelate compound such as diisopropoxyethyl acetoacetate aluminum, diisopropoxyacetylacetonatoaluminum, isopropoxybis(ethyl acetoacetate) aluminum, isopropoxybis(acetylacetonato)aluminum, tris(ethyl acetoacetate) aluminum, tris-(acetylacetonato)aluminum and monoacetylacetonatobis(ethyl acetoacetate) aluminum.

Among these metal chelate compounds, preferred are tri-n-butoxyethyl acetoacetate zirconium, diisopropoxybis (acetylacetonato)titanium, dipropoxyethyl acetoacetate aluminum and tris(ethyl acetoacetate) aluminum. One of these metal chelate compounds may be used alone, or two or more thereof may be used as a mixture. Also, a partial hydrolysate of such a metal chelate compound can be used.

In view of the condensation reaction rate and the film strength when formed into a coating film, the metal chelate compound of the present invention is preferably used in a proportion of 0.01 to 50 mass %, more preferably from 0.1 to 50 mass %, still more preferably from 0.5 to 10 mass %, based on the organosilane.

For the purpose of enhancing the scratch resistance, the coating composition for the formation of a low refractive index layer of the present invention preferably contains a polyfunctional (meth)acrylate compound having two or more (meth)acryloyl groups within one molecule and a radiation polymerization initiator.

The polyfunctional (meth)acrylate compound for use in the present invention contains two or more, preferably from 3 to 10, more preferably from 3 to 6, (meth)acryloyl groups within one molecule. Specific examples of such a compound include (1) alkylene glycol di(meth)acrylates such as ethylene glycol di(meth)acrylate, diethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate and neopentyl glycol di(meth)acrylate; (2) poly(meth)acrylates of polyhydric alcohol, such as trimethylolpropane tri(meth)acrylate, trimethylolpropane trihydroxyethyl tri(meth)acrylate, ditrimethylolpropane tetra (meth)acrylate, pentaerythritol tri(meth)acrylate, pentaerythritol tetra(meth)acrylate, dipentaerythritol hexa(meth) acrylate and hydroxypivalic acid neopentyl glycol di(meth)

acrylate; (3) poly(meth)acrylates of isocyanurate, such as isocyanurate tri(meth)acrylate, tris(2-hydroxyethyl)isocyanurate di(meth)acrylate and tris(2-hydroxyethyl)isocyanurate tri(meth)acrylate; (4) poly(meth)acrylates of cycloalkane, such as tricyclodecanediyldimethyl di(meth)acrylate; (5) (meth)acrylate derivatives of bisphenol A, such as di(meth)acrylate of ethylene oxide adduct of bisphenol A, di(meth)acrylate of propylene oxide adduct of bisphenol A, di(meth)acrylate of alkylene oxide adduct of bisphenol A, di(meth)acrylate of ethylene oxide adduct of hydrogenated bisphenol A, di(meth)acrylate of propylene oxide adduct of hydrogenated bisphenol A, di(meth)acrylate of alkylene oxide adduct of hydrogenated bisphenol A, and (meth)acrylate obtained from bisphenol A diglycidyl ether and (meth) acrylic acid; and (6) fluorine-containing (meth)acrylates such as 3,3,4,4,5,5,6,6-octafluorooctane di(meth)acrylate, 3-(2-perfluorohexyl)ethoxy-1,2-di(meth)acryloylpropane and N-n-propyl-N-2,3-di(meth)acryloyl-propylperfluorooctyl sulfonamide. One of these compounds may be used alone, or two or more thereof may be used in combination. Among these, preferred are dipentaerythritol hexaacrylate, pentaerythritol tetraacrylate, pentaerythritol triacrylate and trimethylolpropane triacrylate.

The proportion of the polyfunctional (meth)acrylate compound blended is preferably from 10 to 70 mass %, more preferably from 20 to 60 mass %, based on the fluorine-containing olefin-based polymer. If this proportion is less than 10 mass %, the cured product is not satisfied in the hardness and scratch resistance, whereas if it exceeds 70 mass %, the refractive index of the composition becomes high and an insufficient antireflection effect results.

Specific examples of the radiation polymerization initiator used in the coating composition for the formation of a low refractive index layer of the present invention include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholinopropan-1-one, 2,4,6-trimethylbenzoyl diphenylphosphine oxide, 2-benzyl-2-dimethylamino-1-(4-morpholino-phenyl)butan-1-one and 1-[4-(2-hydroxyethoxy)phenyl]-2-hydroxy-2-methyl-1-propan-1-one. One of these compounds may be used alone, or two or more thereof may be used in combination. Among these compounds, 2-methyl-1-[4-(methylthio)phenyl]-2-morpholinopropan-1-one and diethylthioxanthone are preferred.

When a radiation polymerization initiator is blended, the obtained coating composition for the formation of a low refractive index layer of the present invention comes to have satisfactory curability, but excessive blending of a radiation polymerization initiator is not only unprofitable but also gives rise to fragility of the cured product. Therefore, the proportion of the radiation polymerization initiator blended is preferably from 0.1 to 10 mass %, more preferably from 0.2 to 5 mass %, based on the fluorine-containing olefin-based polymer.

The solvent composition of the coating composition for the formation of a low refractive index layer of the present invention may be a single solvent or a mixed solvent. In the case of a mixed solvent, a solvent having a boiling point of 100° C. or less preferably occupies from 50 to 100%, more preferably from 80 to 100%, still more preferably from 90 to 100%, yet still more preferably 100%. When the proportion of the solvent having a boiling point of 100° C. or less is in this range, a high drying speed and a good coated surface state are obtained and since the thickness of the coating film is uniform, optical properties such as reflectance are also good.

Examples of the solvent having a boiling point of 100° C. or less include hydrocarbons such as hexane (boiling point: 68.7° C.; hereinafter, "° C." is omitted), heptane (98.4), cyclohexane (80.7) and benzene (80.1); halogenated hydrocarbons such as dichloromethane (39.8), chloroform (61.2), carbon tetrachloride (76.8), 1,2-dichloroethane (83.5) and trichloroethylene (87.2); ethers such as diethyl ether (34.6), diisopropyl ether (68.5), dipropyl ether (90.5) and tetrahydrofuran (66); esters such as ethyl formate (54.2), methyl acetate (57.8), ethyl acetate (77.1) and isopropyl acetate (89); ketones such as acetone (56.1) and 2-butanone (=methyl ethyl ketone, 79.6); alcohols such as methanol (64.5), ethanol (78.3), 2-propanol (82.4) and 1-propanol (97.2); cyano compounds such as acetonitrile (81.6) and propionitrile (97.4); and carbon disulfide (46.2). Among these, ketones and esters are preferred, and ketones are more preferred. Out of ketones, 2-butanone is preferred.

Examples of the solvent having a boiling point of 100° C. or more include octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-butanol (117.7), N,N-dimethylformamide (153), N,N-dimethylacetamide (166) and dimethyl sulfoxide (189). Among these, cyclohexanone and 2-methyl-4-pentanone are preferred.

By diluting the low refractive index layer components with a solvent having the above-described composition, the coating composition for the formation of a low refractive index layer of the present invention is prepared. The coating solution is preferably adjusted to an appropriate solid content concentration by taking account of, for example, the viscosity of the coating solution and the specific gravity of the layer raw material, but the solid content concentration is preferably from 0.1 to 20 mass %, more preferably from 1 to 10 mass %.

(High Refractive Index Layer)

In the antireflection film of the present invention, a high refractive index layer and a medium refractive index layer may be provided on the hard coat layer to enhance the antireflection properties. The refractive index of the high refractive index layer and the medium refractive index layer of the present invention is preferably from 1.55 to 2.40. In this specification, the high refractive index layer and the medium refractive index layer are sometimes collectively called "high refractive index layer". Incidentally, in the present invention, the terms "high", "medium" and "low" of the high refractive index layer, the medium refractive index layer and the low refractive index layer express a relative relationship in the size of the refractive index among the layers. Also, in regard to the relationship with the transparent support, the refractive index preferably satisfies the relationships of transparent layer>low refractive index layer and high refractive index layer>transparent support.

The high refractive index layer of the present invention preferably contains an inorganic fine particle comprising titanium dioxide as the main component and containing at least one element selected from cobalt, aluminum and zirconium. The main component as used herein means a component having a largest content (mass %) among the components constituting the particle.

The inorganic fine particle mainly comprising titanium dioxide for use in the present invention preferably has a refractive index of 1.90 to 2.80, more preferably from 2.10 to 2.80, and most preferably from 2.20 to 2.80.

The mass average primary particle diameter of the inorganic fine particle mainly comprising titanium dioxide is preferably from 1 to 200 nm, more preferably from 1 to 150 nm, still more preferably from 1 to 100 nm, yet still more preferably from 1 to 80 nm.

The particle diameter of the inorganic fine particle can be measured by a light scattering method or from an electron micrograph. The specific surface area of the inorganic fine particle is preferably from 10 to 400 m$^2$/g, more preferably from 20 to 200 m$^2$/g, and most preferably from 30 to 150 m$^2$/g.

As for the crystal structure of the inorganic fine particle mainly comprising titanium dioxide, the main component preferably has a rutile structure, a rutile/anatase mixed crystal structure, an anatase structure or an amorphous structure, more preferably a rutile structure. The main component means a component having a largest content (mass %) among the components constituting the particle.

By virtue of containing at least one element selected from Co (cobalt), Al (aluminum) and Zr (zirconium) in the inorganic fine particle mainly comprising titanium dioxide, the photocatalytic activity of the titanium dioxide can be suppressed and the weather resistance of the high refractive index layer for use in the present invention can be improved.

The element is preferably Co (cobalt). A combination use of two or more kinds of elements is also preferred.

The contents of Co (cobalt), Al (aluminum) and Zr (zirconium) with respect to Ti (titanium) each is preferably from 0.05 to 30 mass %, more preferably from 0.1 to 10 mass %, still more preferably from 0.2 to 7 mass %, yet still more preferably from 0.3 to 5 mass %, and most preferably from 0.5 to 3 mass %, based on Ti.

Co (cobalt), Al (aluminum) or Zr (zirconium) can be caused to be present at least in either the inside or the surface of the inorganic fine particle mainly comprising titanium dioxide, but the element is preferably caused to be present in the inside of the inorganic fine particle mainly comprising titanium dioxide, most preferably in both the inside and the surface.

Co (cobalt), Al (aluminum) or Zr (zirconium) can be made to exist (for example, doped) in the inside of the inorganic fine particle mainly comprising titanium dioxide by various methods. Examples of the method include the methods described in Yasushi Aoki, *Ion Chunyu Ho* (*Ion Injection Method*), Vol. 18, No. 5, pp. 262-268, Hyomen Kagaku (1998)), JP-A-11-263620, JP-T-11-512336 (the term "JP-T" as used herein means a "published Japanese translation of a PCT patent application"), EP-A-335773 and JP-A-5-330825.

A method of introducing Co (cobalt), Al (aluminum) or Zr (zirconium) in the particle formation process of forming the inorganic fine particle mainly comprising titanium dioxide (see, for example, JP-T-11-512336, EP-A-33577 and JP-A-5-330825) is particularly preferred.

Co (cobalt), Al (aluminum) or Zr (zirconium) is also preferably present in the form of an oxide.

The inorganic fine particle mainly comprising titanium dioxide may further contain other elements according to the purpose. Other elements may be contained as impurities. Examples of other elements include Sn, Sb, Cu, Fe, Mn, Pb, Cd, As, Cr, Hg, Zn, Mg, Si, P and S.

The inorganic fine particle mainly comprising titanium dioxide for use in the present invention may be surface-treated. The surface treatment is performed by using an inorganic compound or an organic compound. Examples of the inorganic compound for use in the surface treatment include a cobalt-containing inorganic compound (e.g., $CoO_2$, $Co_2O_3$, $Co_3O_4$), an aluminum-containing inorganic compound (e.g., $Al_2O_3$, $Al(OH)_3$), a zirconium-containing inorganic compound (e.g., $ZrO_2$, $Zr(OH)_4$), a silicon-containing inorganic compound (e.g., $SiO_2$) and an iron-containing inorganic compounds (e.g., $Fe_2O_3$).

Among these, a cobalt-containing inorganic compound, an aluminum-containing inorganic compound and a zirconium-containing inorganic compound are preferred, and a cobalt-containing inorganic compound, $Al(OH)_3$ and $Zr(OH)_4$ are most preferred.

Examples of the organic compound for use in the surface treatment include a silane coupling agent and a titanate coupling agent. Among these, a silane coupling agent is most preferred, and examples thereof include silane coupling agents represented by formulae (1) and (2).

The content of the silane coupling agent is preferably from 1 to 90 mass %, more preferably from 2 to 80 mass %, still more preferably from 5 to 50 mass %, based on the entire solid content of the high refractive index layer.

Examples of the titanate coupling agent include a metal alkoxide such as tetramethoxy titanium, tetraethoxy titanium and tetraisorpopoxy titanium, and Preneact (e.g., KR-TTS, KR-46B, KR-55, KR-41B, produced by Ajinomoto Co., Inc.).

Preferred examples of other organic compounds for use in the surface treatment include a polyol, an alkanolamine and other organic compounds having an anionic group. Among these, an organic compound having a carboxyl group, a sulfonic acid group or a phosphoric acid group is more preferred.

A stearic acid, a lauric acid, an oleic acid, a linoleic acid and a linolenic acid are preferably used.

The organic compound for use in the surface treatment preferably further has a crosslinking or polymerizable functional group. Examples of the crosslinking or polymerizable functional group include an ethylenically unsaturated group capable of undergoing an addition reaction/polymerization reaction by the effect of a radical, such as (meth)acryl group, allyl group, styryl group and vinyloxy group; a cationic polymerizable group such as epoxy group, oxatanyl group and vinyloxy group; and a polycondensation reactive group such as hydrolyzable silyl group and N-methylol group.

These surface treatments may also be used in combination of two or more thereof.

A combination use of an aluminum-containing organic compound and a zirconium-containing inorganic compound is particularly preferred.

As described in JP-A-2001-166104, the inorganic fine particle mainly comprising titanium dioxide for use in the present invention may be rendered to have a core/shell structure by the surface treatment.

The shape of the inorganic fine particle mainly comprising titanium dioxide, which is contained in the high refractive index layer, is preferably a pebble-like form, a spherical form, a cubic form, a spindle form or an amorphous form, more preferably an amorphous form or a spindle form.

(Dispersant)

The inorganic fine particle mainly comprising titanium dioxide, which is used in the refractive index layer, may be dispersed by using a dispersant.

For the dispersion of the inorganic fine particle mainly comprising titanium dioxide for use in the present invention, a dispersant having an anionic group is preferably used.

As for the anionic group, a group having an acidic proton, such as carboxyl group, sulfonic acid group (and sulfo group), phosphoric acid group (and phosphono group) and sulfonamide group, and a salt thereof are effective. Among these, a carboxyl group, a sulfonic acid group, a phosphonic acid group, and a salt thereof are preferred, and a carboxyl group and a phosphoric acid group are more preferred. The number of anionic groups contained per one molecule of the dispersant is 1 or more.

For the purpose of more improving the dispersibility of the inorganic fine particle, a plurality of anionic groups may be contained. The average number of anionic groups is preferably 2 or more, more preferably 5 or more, still more preferably 10 or more. Also, plural kinds of anionic groups may be contained in one molecule of the dispersant.

The dispersant preferably further contains a crosslinking or polymerizable functional group. Examples of the crosslinking or polymerizable functional group include an ethylenically unsaturated group capable of undergoing an addition reaction/polymerization reaction by the effect of a radical, such as (meth)acryloyl group, allyl group, styryl group and vinyloxy group; a cationic polymerizable group such as epoxy group, oxatanyl group and vinyloxy group; and a polycondensation reactive group such as hydrolyzable silyl group and N-methylol group. Among these, a functional group having an ethylenically unsaturated group is preferred.

The dispersant used for dispersing the inorganic fine particle mainly comprising titanium dioxide, which is used in the high refractive index layer of the present invention, is preferably a dispersant having an anionic group and a crosslinking or polymerizable functional group and at the same time, having the crosslinking or polymerizable functional group in the side chain.

The mass average molecular weight (Mw) of the dispersant having an anionic group and a crosslinking or polymerizable functional group and at the same time, having the crosslinking or polymerizable functional group in the side chain is not particularly limited but is preferably 1,000 or more, more preferably from 2,000 to 1,000,000, still more preferably from 5,000 to 200,000, yet still more preferably from 10,000 to 100,000.

As for the anionic group, a group having an acidic proton, such as carboxyl group, sulfonic acid group (and sulfo group), phosphoric acid group (and phosphono group) and sulfonamide group, and a salt thereof are effective. In particular, the anionic group is preferably a carboxyl group, a sulfonic acid group, a phosphonic acid group or a salt thereof, more preferably a carboxyl group or a phosphoric acid group. The average number of anionic groups contained per one molecule of the dispersant is preferably 2 or more, more preferably 5 or more, still more preferably 10 or more. Also, plural kinds of anionic groups may be contained in one molecule of the dispersant.

The dispersant having an anionic group and a crosslinking or polymerizable functional group and at the same time, having the crosslinking or polymerizable functional group in the side chain has the anionic group in the side chain or at the terminal. As for the method of introducing an anionic group into the side chain, the synthesis may be performed, for example, by using a polymer reaction, such as a method of polymerizing an anionic group-containing monomer (e.g., (meth)acrylic acid, maleic acid, partially esterified maleic acid, itaconic acid, crotonic acid, 2-carboxyethyl (meth)acrylate, 2-sulfoethyl (meth)acrylate, mono-2-(meth)acryloyloxyethyl phosphate), or a method of causing an acid anhydride to act on a polymer having a hydroxyl group, an amino group or the like.

In the dispersant having an anionic group in the side chain, the composition of an anionic group-containing repeating unit is from $10^{-4}$ to 100 mol %, preferably from 1 to 50 mol %, more preferably from 5 to 20 mol %, of all repeating units.

On the other hand, as for the method of introducing an anionic group into the terminal, the synthesis may be performed, for example, by a method of conducting a polymerization reaction in the presence of an anionic group-containing chain transfer agent (e.g., thioglycolic acid), or a method of conducting a polymerization reaction by using an anionic group-containing polymerization initiator (e.g., V-501, produced by Wako Pure Chemical Industries, Ltd.).

The dispersant is preferably a dispersant having an anionic group in the side chain.

Examples of the crosslinking or polymerizable functional group include an ethylenically unsaturated group capable of undergoing an addition reaction-polymerization reaction by the effect of a radical species, such as (meth)acryl group, allyl group, styryl group and vinyloxy group; a cationic polymerizable group such as epoxy group, oxetanyl group and vinyloxy group; and a polycondensation reactive group such as hydrolyzable silyl group and N-methylol group. Among these, a group having an ethylenically unsaturated group is preferred.

The average number of crosslinking or polymerizable functional groups contained per one molecule of the dispersant is preferably 2 or more, more preferably 5 or more, still more preferably 10 or more. Also, plural kinds of crosslinking or polymerizable functional groups may be contained in one molecule of the dispersant.

The repeating unit having an ethylenically unsaturated group in the side chain, which is contained in the preferred dispersant for use in the present invention, may be, for example, a poly-1,2-butadiene or poly-1,2-isoprene structure or a (meth)acrylic acid ester or amide repeating unit bonded with a specific residue (R group of —COOR or —CONHR). Examples of the specific residue (R group) include —$(CH_2)_n$—$CR_1$=$CR_2R_3$, —$(CH_2O)_n$—$CH_2CR_1$=$CR_2R_3$, —$(CH_2CH_2O)_n$—$CH_2CR_1$=$CR_2R_3$, —$(CH_2)_n$—NH—CO—O—$CH_2CR_1$=$CR_2R_3$, —$(CH_2)_n$—O—CO—$CR_1$=$CR_2R_3$ and —$(CH_2CH_2O)_2$—X (wherein $R_1$ to $R_3$ each is a hydrogen atom, a halogen atom, an alkyl group having from 1 to 20 carbon atoms, an aryl group, an alkoxy group or an aryloxy group, $R_1$ may combine with $R_2$ or $R_3$ to form a ring, n is an integer of 1 to 10, and X is a dicyclopentadienyl residue). Specific examples of the ester residue include —$CH_2CH$=$CH_2$, —$CH_2CH_2O$—$CH_2CH$=$CH_2$, $CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X is a dicyclopentadienyl residue). Specific examples of the amide residue include —$CH_2CH$=$CH_2$, —$CH_2CH_2$—Y (wherein Y is a 1-cyclohexenyl residue), —$CH_2CH_2$—OCO—CH=$CH_2$ and —$CH_2CH_2$—OCO—$C(CH_3)$=$CH_2$.

In the dispersant having an ethylenically unsaturated group, a free radical (a polymerization initiation radical or a radical grown in the polymerization process of a polymerizable compound) is added to the unsaturated bond group to cause an addition polymerization between molecules directly or through polymerization linkage of a polymerizable compound, as a result, crosslinking is formed between molecules, thereby effecting curing. Alternatively, an atom in the molecule (for example, a hydrogen atom on a carbon atom adjacent to the unsaturated bond group) is withdrawn by a free radical to produce a polymer radical, and the polymer radicals are bonded with each other to form crosslinking between molecules, thereby effecting curing.

As for the method of introducing a crosslinking or polymerizable functional group into the side chain, the synthesis may be performed, for example, by a method of copolymerizing a crosslinking or polymerizable functional group-containing monomer (e.g., allyl (meth)acrylate, glycidyl (meth) acrylate, trialkoxysilylpropyl methacrylate), copolymerizing butadiene or isoprene, or copolymerizing a vinyl monomer containing a 3-chloropropionic ester site, and then conducting dehydrochlorination, described in JP-A-3-249653, or a method of introducing a crosslinking or polymerizable functional group through a polymer reaction (e.g., polymeric reaction of an epoxy group-containing vinyl monomer into a carboxyl group-containing polymer).

The crosslinking or polymerizable functional group-containing unit may constitute all repeating units except for the anionic group-containing repeating unit, but the proportion thereof is preferably from 5 to 50 mol %, more preferably from 5 to 30 mol %, in all crosslinking or repeating units.

The dispersant preferably used in the present invention may be a copolymer with an appropriate monomer other than the monomer having a crosslinking or polymerizable functional group and an anionic group. The component copolymerized is not particularly limited but is selected from various viewpoints such as dispersion stability, compatibility with other monomer component and strength of film formed. Preferred examples thereof include methyl (meth)acrylate, n-butyl (meth)acrylate, tert-butyl (meth)acrylate, cyclohexyl (meth)acrylate and styrene.

The dispersant preferably used in the present invention is not particularly limited in the form but is preferably a block copolymer or a random copolymer and in view of cost and easiness of synthesis, more preferably a random copolymer.

Specific examples of the dispersant preferably used in the present invention are set forth below, but the dispersant for use in the present invention is not limited thereto. Unless otherwise indicated, these are a random copolymer.

$$-(CH_2-\underset{CO_2CH_2CH=CH_2}{\underset{|}{\overset{CH_3}{\overset{|}{C}}}})_x- \quad -(CH_2-\underset{CO_2H}{\underset{|}{\overset{CH_3}{\overset{|}{C}}}})_y- \quad -(CH_2-\underset{COOR}{\underset{|}{\overset{CH_3}{\overset{|}{C}}}})_z-$$

|  | x | y | z | R | Mw |
|---|---|---|---|---|---|
| P-(1) | 80 | 20 | 0 | — | 40,000 |
| P-(2) | 80 | 20 | 0 | — | 110,000 |
| P-(3) | 80 | 20 | 0 | — | 10,000 |
| P-(4) | 90 | 10 | 0 | — | 40,000 |
| P-(5) | 50 | 50 | 0 | — | 40,000 |
| p-(6) | 30 | 20 | 50 | $CH_2CH_2CH_3$ | 30,000 |
| P-(7) | 20 | 30 | 50 | $CH_2CH_2CH_2CH_3$ | 50,000 |
| P-(8) | 70 | 20 | 10 | $CH(CH_2)_3$ | 60,000 |
| P-(9) | 70 | 20 | 10 | $-CH_2CHCH_2CH_2CH_2CH_3$ $\underset{CH_2CH_3}{\mid}$ | 150,000 |
| P-(10) | 40 | 30 | 30 | $-CH_2-\text{C}_6H_5$ | 15,000 | x/y/z is a molar ratio.

$$-(CH_2-\underset{CO_2CH_2CH=CH_2}{\underset{|}{\overset{CH_3}{\overset{|}{C}}}})_{80}- \quad -(A)_{20}-$$

|  | A | Mw |
|---|---|---|
| P-(11) | $-CH_2-CH-$ $\underset{COOH}{\mid}$ | 20,000 |
| P-(12) | $-CH_2-CH-$ $\underset{CO_2CH_2CH_2COOH}{\mid}$ | 30,000 |
| P-(13) | $-CH_2-CH-$ $\underset{C_6H_4SO_3Na}{\mid}$ | 100,000 |
| P-(14) | $-CH_2-\underset{CO_2CH_2CH_2SO_3H}{\underset{|}{\overset{CH_3}{\overset{|}{C}}}}-$ | 20,000 |
| P-(15) | $-CH_2-\underset{CO_2CH_2CH_2OP(OH)_2}{\underset{|}{\overset{CH_3}{\overset{|}{C}}}}\overset{O}{\underset{\|}{}}$ | 50,000 |
| P-(16) | $-CH_2-CH-$ $\underset{CO_2CH_2CH_2O-(CH_2)_5-OP(OH)_2}{\mid} \overset{O}{\underset{\|}{}}$ | 15,000 |

$$-(A)_{80}- \quad -(CH_2-\underset{COOH}{\underset{|}{\overset{CH_3}{\overset{|}{C}}}})_{20}-$$

|  | A | Mw |
|---|---|---|
| P-(17) | $-CH_2-\underset{COOCH_2CH_2OCH=CH-C_6H_5}{\underset{|}{\overset{CH_3}{\overset{|}{C}}}}-$ | 20,000 |
| P-(18) | $-CH_2-CH-$ $\underset{COOCH_2CH_2OCCH_2CH=CH_2}{\mid} \overset{O}{\underset{\|}{}}$ | 25,000 |
| P-(19) | $-CH_2-\underset{COO-CH_2-C_6H_4-CH=CH_2}{\underset{|}{\overset{CH_3}{\overset{|}{C}}}}-$ | 18,000 |

-continued
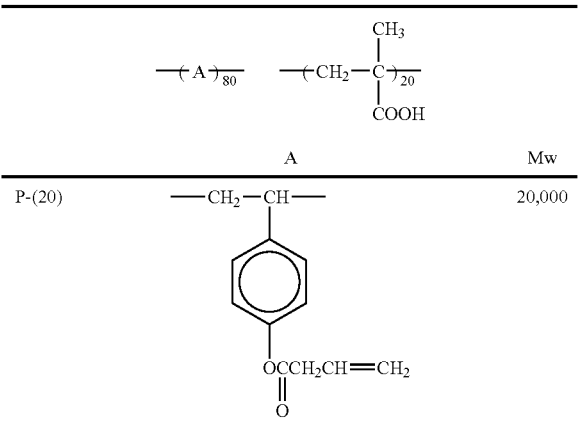
| | A | Mw |
|---|---|---|
| P-(20) | 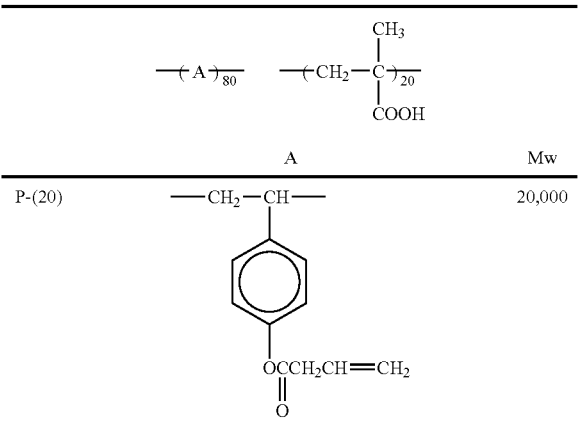 | 20,000 |
-continued
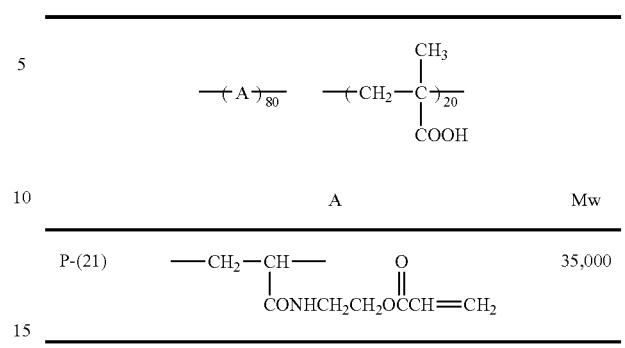
| | A | Mw |
|---|---|---|
| P-(21) | —CH₂—CH—<br>　　　　CONHCH₂CH₂OCCH=CH₂<br>　　　　　　　　　　　　　　‖<br>　　　　　　　　　　　　　　O | 35,000 |
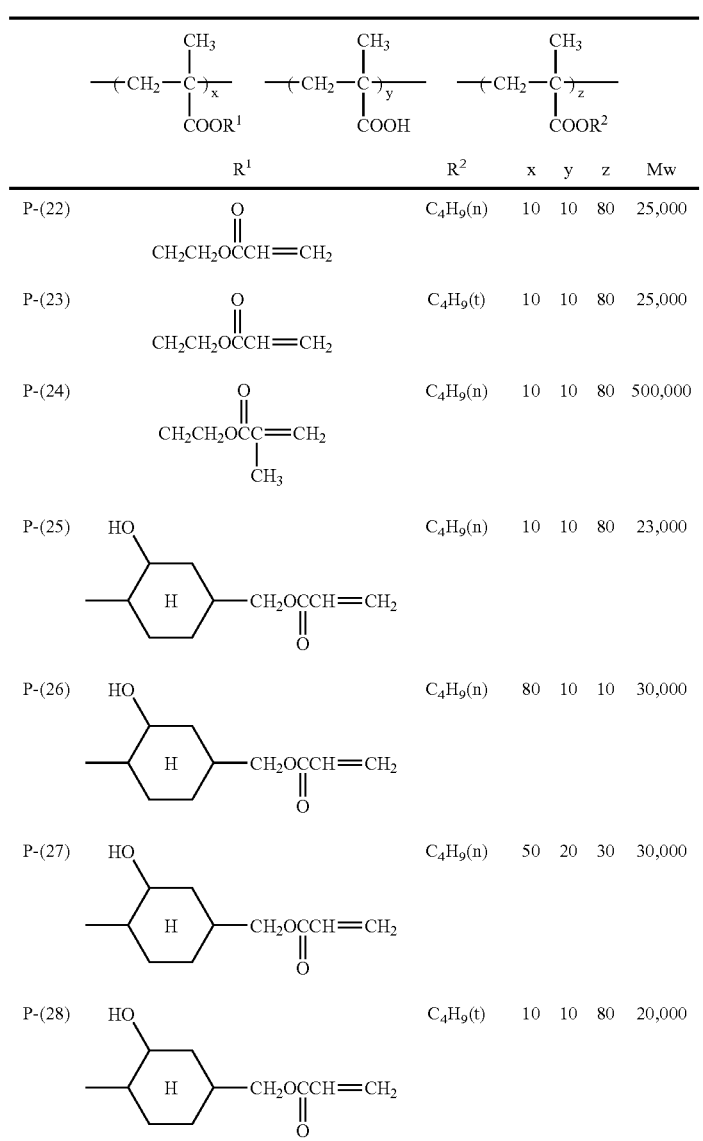
| | R¹ | R² | x | y | z | Mw |
|---|---|---|---|---|---|---|
| P-(22) | CH₂CH₂OCCH=CH₂ (‖O) | C₄H₉(n) | 10 | 10 | 80 | 25,000 |
| P-(23) | CH₂CH₂OCCH=CH₂ (‖O) | C₄H₉(t) | 10 | 10 | 80 | 25,000 |
| P-(24) | CH₂CH₂OCC(CH₃)=CH₂ (‖O) | C₄H₉(n) | 10 | 10 | 80 | 500,000 |
| P-(25) | HO-cyclohexyl-CH₂OCCH=CH₂ | C₄H₉(n) | 10 | 10 | 80 | 23,000 |
| P-(26) | HO-cyclohexyl-CH₂OCCH=CH₂ | C₄H₉(n) | 80 | 10 | 10 | 30,000 |
| P-(27) | HO-cyclohexyl-CH₂OCCH=CH₂ | C₄H₉(n) | 50 | 20 | 30 | 30,000 |
| P-(28) | HO-cyclohexyl-CH₂OCCH=CH₂ | C₄H₉(t) | 10 | 10 | 80 | 20,000 |

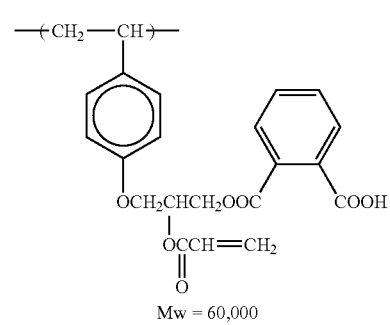

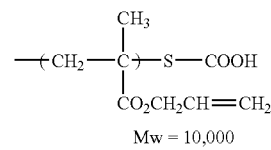

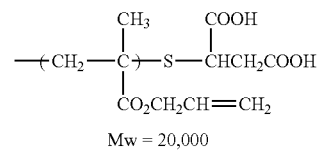

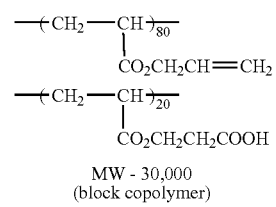

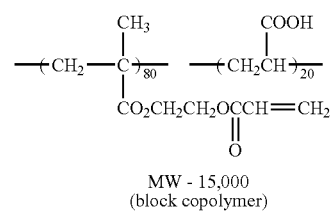

The amount used of the dispersant is preferably from 1 to 50 mass %, more preferably from 5 to 30 mass %, and most preferably from 5 to 20 mass %, based on the inorganic fine particle mainly comprising titanium dioxide. Also, two or more kinds of dispersants may be used in combination.

(High Refractive Index Layer and Formation Method Thereof)

The inorganic fine particle mainly comprising titanium dioxide, which is used in the high refractive index layer, is used in the dispersion state for the formation of a high refractive index layer. The inorganic fine particle is dispersed in a dispersion medium in the presence of a dispersant described above.

The dispersion medium is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran), and an ether alcohol (e.g., 1-methoxy-2-propanol). Among these, toluene, xylene, methyl ethyl ketone, methyl isobutyl ketone, cyclohexanone and butanol are preferred.

In particular, the dispersion medium is preferably methyl ethyl ketone, methyl isobutyl ketone or cyclohexanone.

The inorganic fine particle is dispersed by using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. A preliminary dispersion treatment may also be performed. Examples of the disperser for use in the preliminary dispersion treatment include a ball mill, a three-roll mill, a kneader and an extruder.

The inorganic fine particle is preferably dispersed in the dispersion medium to have a small particle size. The mass average particle diameter is from 1 to 200 nm, preferably from 5 to 150 nm, more preferably from 10 to 100 nm, still more preferably from 10 to 80 nm.

By dispersing the inorganic fine particle to a small particle diameter of 200 nm or less, the high refractive index layer can be formed without impairing transparency.

The high refractive index layer for use in the present invention is preferably formed as follows. A binder (for example, an ionizing radiation-curable polyfunctional monomer or oligomer described above with examples in regard to the hard coat layer), a photo-polymerization initiator, a sensitizer, a coating solvent and the like are added to a liquid dispersion resulting from dispersing the inorganic fine particle in the dispersion medium as above, to prepare a coating solution for forming a high refractive index layer, and the obtained coating solution for forming a high refractive index layer is coated on the hard coat layer and cured through a crosslinking or polymerization reaction of an ionizing radiation-curable compound (for example, a polyfunctional monomer or a polyfunctional oligomer). As for specific examples of the binder, photopolymerization initiator, sensitizer and coating solvent, the compounds described above in regard to the hard coat layer can be used.

Furthermore, the binder of the high refractive index layer is preferably caused to undergo a crosslinking or polymerization reaction with the dispersant at the same time with or after coating of the layer.

The binder of the thus-prepared high refractive index layer takes, for example, a form that an anionic group of the dispersant is taken into the binder through a crosslinking or polymerization reaction between the preferred dispersant and the ionizing radiation-curable polyfunctional monomer or oligomer. Furthermore, the anionic group taken into the binder of the high refractive index layer exerts a function of maintaining the dispersed state of the inorganic fine particle, and the crosslinked or polymerized structure imparts a film-forming ability to the binder to improve the physical strength, chemical resistance and weather resistance of the inorganic fine particle-containing high refractive index layer.

The inorganic fine particle has not only an effect of controlling the refractive index of the high refractive index but also a function of suppressing the cure shrinkage.

In the high refractive index layer, the inorganic fine particle is preferably dispersed to have a small particle diameter, and the mass average diameter is from 1 to 200 nm. The mass average diameter of the inorganic fine particle in the high refractive index layer is preferably from 5 to 150 nm, more preferably from 10 to 100 nm, and most preferably from 10 to 80 nm.

By dispersing the inorganic fine particle to a small particle diameter of 200 nm or less, the high refractive index layer can be formed without impairing transparency.

The content of the inorganic fine particle in the high refractive index layer is preferably from 10 to 90 mass %, more preferably from 15 to 80 mass %, still more preferably from 15 to 75 mass %, based on the mass of the high refractive index layer. Two or more kinds of inorganic fine particles may be used in combination in the high refractive index layer.

The low refractive index layer is provided on the high refractive index layer and therefore, the refractive index of the high refractive index layer is preferably higher than that of the transparent support.

In the high refractive index layer, a binder obtained by a crosslinking or polymerization reaction of, for example, an aromatic ring-containing ionizing radiation-curable compound, an ionizing radiation-curable compound containing a halogen element other than fluorine (for example, Br, I or Cl), or an ionizing radiation-curable compound containing an atom such as S, N and P, can also be preferably used.

The refractive index of the high refractive index layer is preferably from 1.55 to 2.40, more preferably from 1.60 to 2.20, still more preferably from 1.65 to 2.10, and most preferably from 1.80 to 2.00.

For example, in the case where three layers of a medium refractive index layer, a high refractive index layer and a low refractive index layer are provided in this order on the hard coat layer, it is preferred that the refractive index of the medium refractive index layer is from 1.55 to 1.80, the refractive index of the high refractive index layer is from 1.80 to 2.40, and the refractive index of the low refractive index layer is from 1.20 to 1.46.

In addition to the above-described components (e.g., inorganic fine particle, polymerization initiator, photosensitizer), a resin, a surfactant, an antistatic agent, a coupling agent, a thickener, a coloration inhibitor, a coloring agent (e.g., pigment, dye), a defoaming agent, a leveling agent, a flame retardant, an ultraviolet absorbent, an infrared absorbent, an adhesion-imparting agent, a polymerization inhibitor, an antioxidant, a surface modifier, an electrically conducting metal fine particle and the like can be added to the high refractive index layer.

The thickness of the high refractive index layer can be appropriately designed according to usage. In the case of using the high refractive index layer as an optical interference layer described later, the thickness is preferably from 30 to 200 nm, more preferably from 50 to 170 nm, still more preferably from 60 to 150 nm.

(Other Layers of Antireflection Film)

In order to produce an antireflection film having more excellent antireflection performance, a medium refractive index layer having a refractive index between the refractive index of the high refractive index layer and the refractive index of the transparent support is preferably provided.

The medium refractive index layer is preferably produced in the same manner as the high refractive index layer of the present invention, and the refractive index can be adjusted by controlling the content of the inorganic fine particle in the film.

In the antireflection film, layers other than those described above may also be provided. For example, an adhesive layer, a shield layer, an antifouling layer, a sliding layer and an antistatic layer may be provided. The shield layer is provided for shielding an electromagnetic wave or an infrared ray.

The antireflection film of the present invention may be formed by the following method, but the present invention is not limited to this method.

[Preparation of Coating Solution]

First, a coating solution containing components for forming each layer is prepared. At this time, increase in the water content of the coating solution can be suppressed by minimizing the volatilization volume of the solvent. The water content of the coating solution is preferably 5% or less, more preferably 2% or less. The volatilization volume of the solvent can be controlled, for example, by enhancing the hermetic property at the stirring after charging respective raw materials into a tank, or minimizing the contact area with air of the coating solution at the liquid transfer. Also, a device for reducing the water content in the coating solution during coating or before or after coating may be provided.

The coating solution for forming the hard coat layer is preferably subjected to filtration capable of removing substantially all (this means 90% or more) foreign substances corresponding to the dry thickness (approximately from 50 to 120 nm) of the low refractive index layer formed directly thereon. The light-transparent fine particle for imparting light diffusibility is equal to or greater than the thickness of the low refractive index layer and therefore, the above-described filtration is preferably performed for an intermediate solution after adding all raw materials except for the light-transparent fine particle. In the case where a filter capable of removing foreign substances having such a small particle diameter is not available, filtration capable of removing substantially all foreign substances corresponding to the wet thickness (approximately from 1 to 10 µm) of at least a layer formed directly thereon is preferably performed. By such means, the point failure of the layer formed directly thereon can be reduced.

Each layer of the antireflection film of the present invention may be formed by the following coating methods, but the present invention is not limited to these methods.

Known methods such as dip coating method, air knife coating method, curtain coating method, roller coating method, wire bar coating method, gravure coating method, extrusion coating method (die coating method) (see, U.S. Pat. No. 2,681,294) and micro gravure coating method may be used. Among these coating methods, a microgravure coating method and a die coating method are preferred.

The microgravure coating method for use in the present invention is a coating method characterized in that a gravure roll having a diameter of about 10 to 100 mm, preferably from about 20 to 50 mm, and having a gravure pattern stamped on the entire circumference is rotated under the support in the direction reverse to the support-transporting direction and at the same time, an extra coating solution is scraped off from the surface of the gravure roll by a doctor blade, whereby a constant amount of the coating solution is transferred to and coated on the lower surface of the support while the upper surface of the support is left in a free state. A roll-form transparent support is continuously unrolled and on one surface of the unrolled support, at least one hard coat layer or at least one low refractive index layer comprising a fluorine-containing olefin-based polymer can be coated by the microgravure coating method.

As for the coating conditions by the microgravure coating method, the number of lines in the gravure pattern stamped on the gravure roll is preferably from 50 to 800 lines/inch, more preferably from 100 to 300 lines/inch, the depth of the gravure pattern is preferably from 1 to 600 µm, more preferably from 5 to 200 µm, the rotation number of the gravure roll is preferably from 3 to 800 rpm, more preferably from 5 to 200 rpm, and the support transportation speed is preferably from 0.5 to 100 m/min, more preferably from 1 to 50 m/min.

For supplying the antireflection film of the present invention with high productivity, an extrusion method (die coating method) is preferably used. In particular, a die coater which can be preferably used for a region having a small wet coated amount (20 ml/m$^2$ or less) as in the hard coat layer or antireflection layer is described below.

<Constitution of Die Coater>

Figure 5:
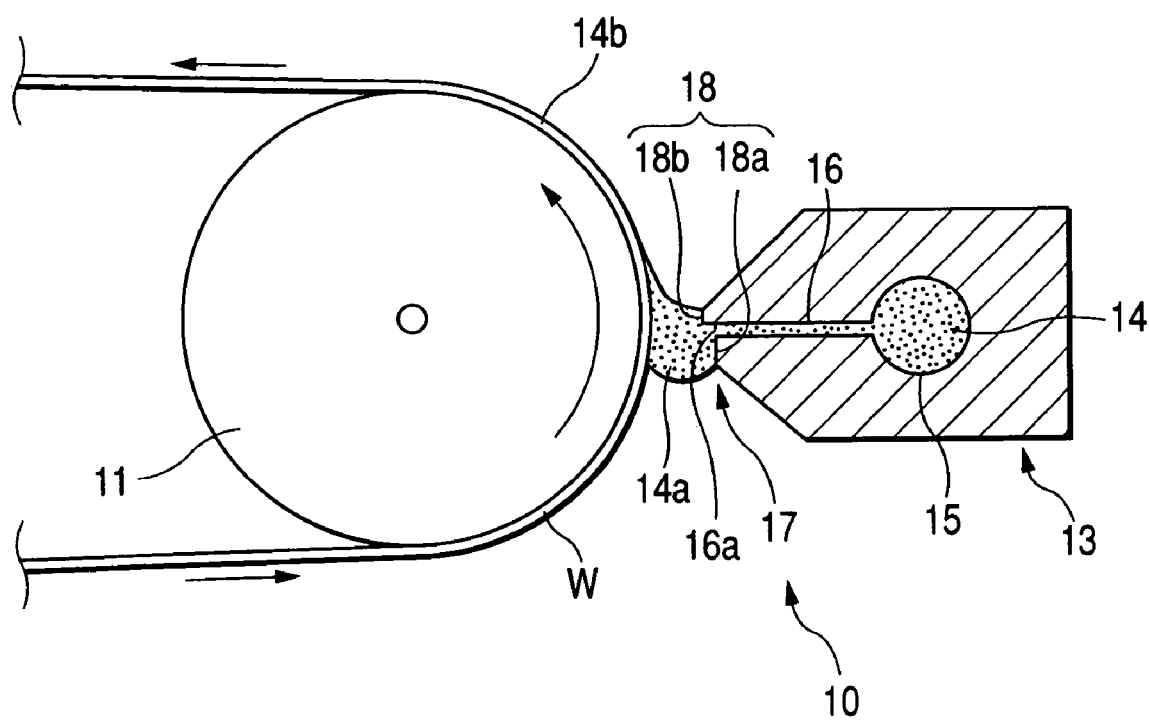
FIG. 5 is a cross-sectional view of a coater 10 using a slot die 13 with which the present invention is practiced.

FIG. 5 is a cross-sectional view of a coater using a slot die, with which the present invention is practiced. In the coater 10, a coating solution 14 formed into a bead 14a is coated from a slot die 13 on a continuously running web W supported by a backup roller 11 to form a coating film 14b on the web W.

A pocket 15 and a slot 16 are formed inside the slot die 13. The cross section of the pocket 15 is constituted by a curve and a straight line and may have, for example, a nearly circular shape as shown in FIG. 5 or a semicircular shape. The pocket 15 is a liquid reservoir space for the coating solution and has a cross-sectional shape extended in the width direction of the slot die 13, and the length of its effective extension is generally set to be equal to or slightly longer than the coating width. The coating solution 14 is supplied to the pocket 15 from the side surface of the slot die 13 or from the center of the surface opposite the slot opening 16a. Also, in the pocket 15, a stopper for preventing leakage of the coating solution 14 is provided.

The slot 16 is a flow path of the coating solution 14 from the pocket 15 to the web W and, similarly to the pocket 15, has a cross-sectional shape extended in the width direction of the slot die 13, and the opening 16a positioned on the web side is generally adjusted to have nearly the same width as the coating width by using a width regulating plate (not shown). The angle between the slot end of the slot 16 and the tangent line in the web running direction of the backup roller 11 is preferably from 30 to 90°.

The end lip 17 of the slot die 13, where the opening 16a of the slot 16 is positioned, is tapered and the distal end thereof forms a flat part 18 called a land. In this land 18, the upstream side in the travelling direction of the web W with respect to the slot 16 is referred to as an upstream lip land 18a, and the downstream side is referred to as a downstream lip land 18b.

Figure 6A:
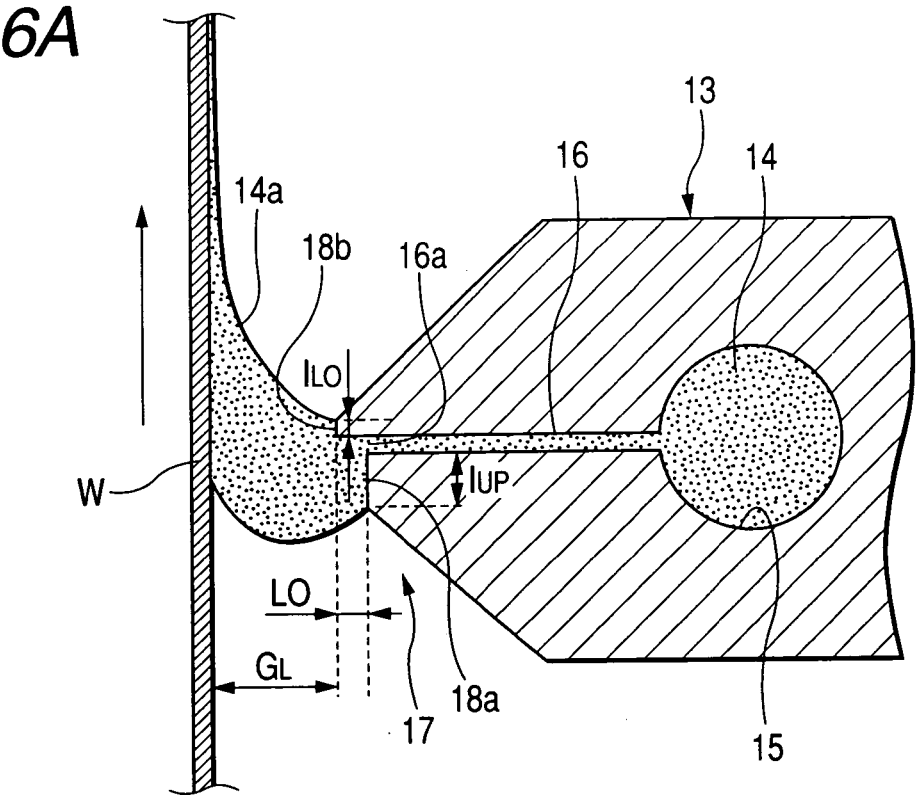
FIG. 6A shows the cross-sectional shape of the slot die 13 of the present invention.
Figure 6B:
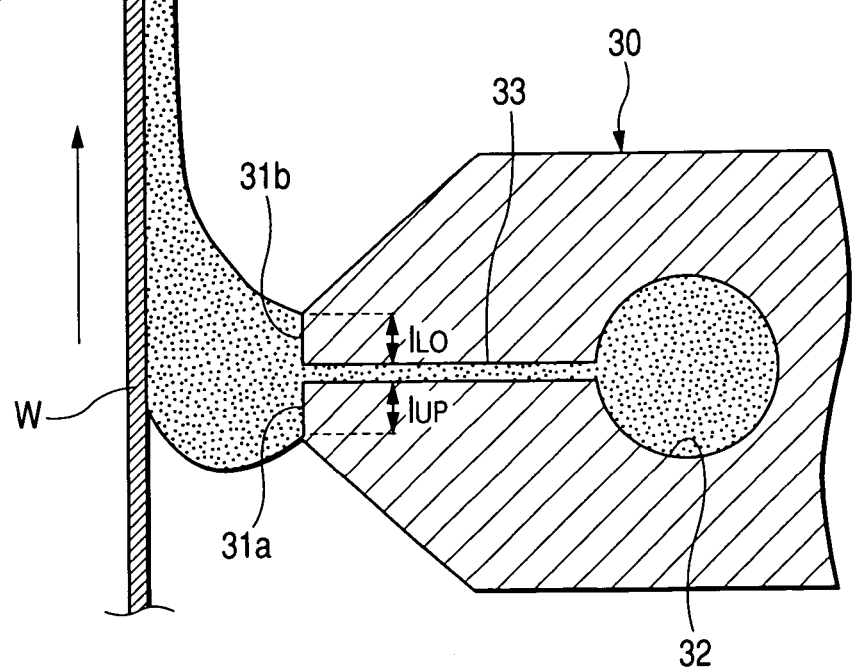
FIG. 6B is the cross-sectional shape of a conventional slot die 30.

FIG. 6 shows the cross-sectional shape of the slot die 13 in comparison with a conventional one. FIG. 6(A) shows the slot die 13 of the present invention, and FIG. 6(B) shows a conventional slot die 30. In the conventional slot die 30, the distances from the web to the upstream lip land 31a and to the downstream lip land 31b are equal. Incidentally, the numeral 32 denotes a pocket, and 33 denotes a slot. On the other hand, in the slot die 13 of the present invention, the length $I_{LO}$ of the downstream lip land is made shorter and by virtue of this constitution, coating for a wet film thickness of 20 µm or less can be performed with good precision.

The land length up of the upstream lip land 18a is not particularly limited but is preferably from 500 µm to 1 mm. The land length $I_{LO}$ of the downstream lip land 18b is from 30 to 100 μm, preferably from 30 to 80 μm, more preferably from 30 to 60 μm. If the land length $I_{LO}$ of the downstream lip is less than 30 μm, the edge or land of the end lip is readily chipped and generation of streaks are liable to occur in the coating film, leading to incapability of coating. Also, the setting of the wet line position on the downstream side becomes difficult and there arises a problem that the coating solution is liable to spread on the downstream side. The wet spreading of the coating solution on the downstream side means that the wet line becomes non-uniform and as conventionally known, this gives rise to a problem of incurring a defective profile such as streak on the coated surface. On the other hand, if the land length $I_{LO}$ of the downstream lip exceeds 100 μm, the bead itself cannot be formed and therefore, thin-layer coating cannot be performed.

The downstream lip land 18b is in the overbite form and approaches closer to the web W than the upstream lip land 18a, so that the degree of reduced pressure can be made small and a bead suitable for thin-film coating can be formed. The difference between the distance from the downstream lip land 18b to the web W and the distance from the upstream lip land 18a to the web W (hereinafter, this difference is referred to as an "overbite length LO") is preferably from 30 to 120 μm, more preferably from 30 to 100 μm, and most preferably from 30 to 80 μm. When the slot die 13 has an overbite shape, the gap $G_L$ between the end lip 17 and the web W indicates the gap between the downstream lip land 18b and the web W.

Figure 7:
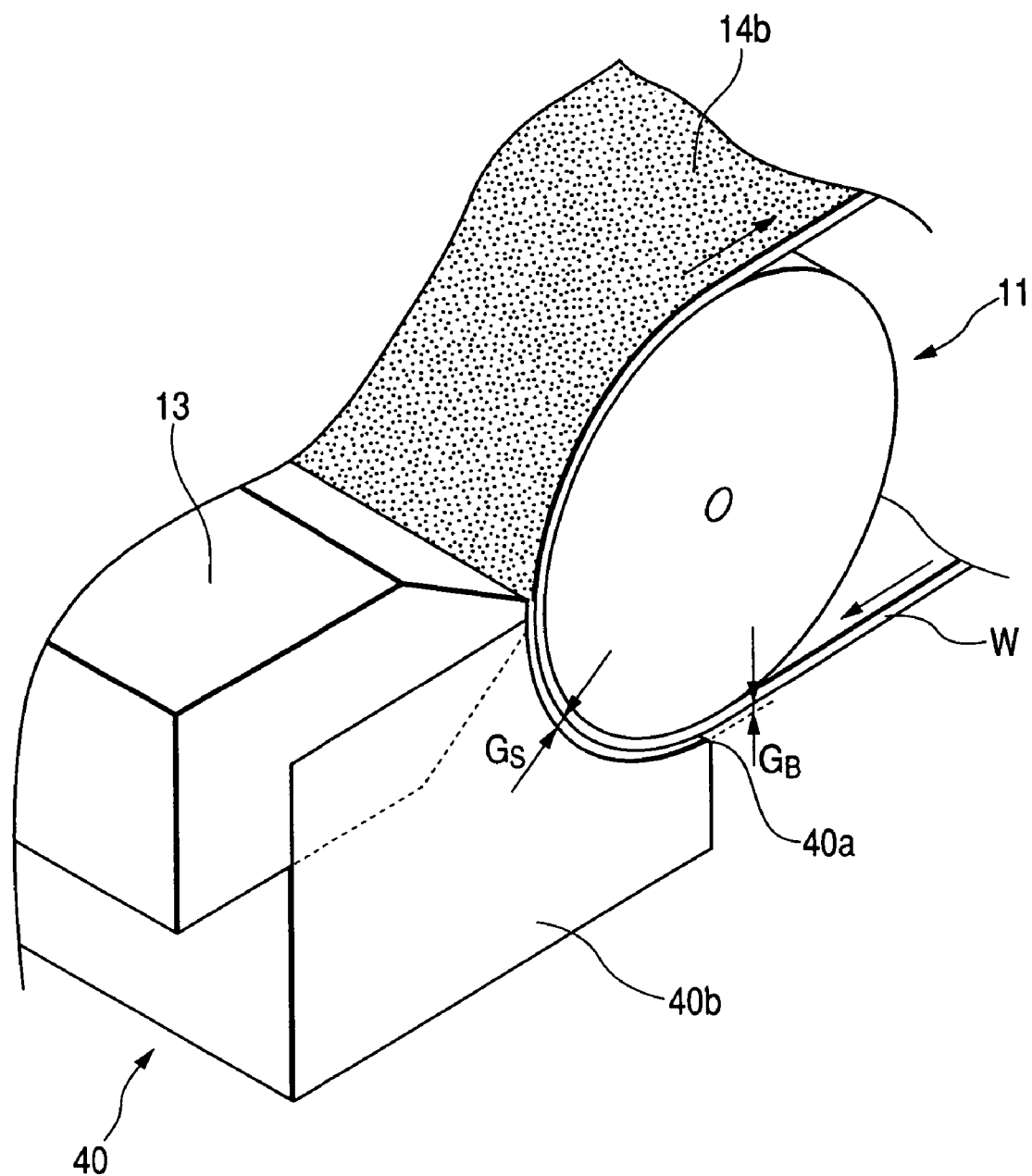
FIG. 7 is a perspective view showing the slot die 13 and its periphery in the coating step for practicing the present invention.

FIG. 7 is a perspective view showing the slot die and the periphery thereof in the coating process for practicing the present invention.

Figure 8:
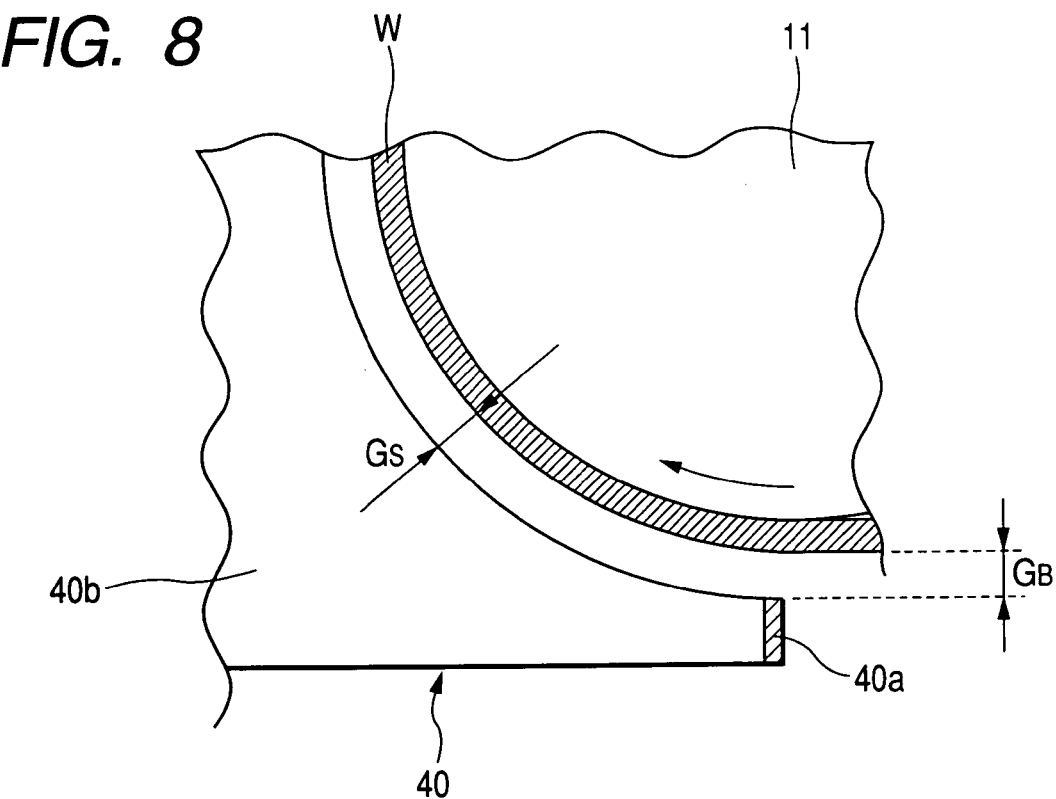
FIG. 8 is a cross-sectional view showing the low-pressure chamber 40 and the web W approaching closer (the back plate 40a is integral with the chamber 40 body)
Figure 9:
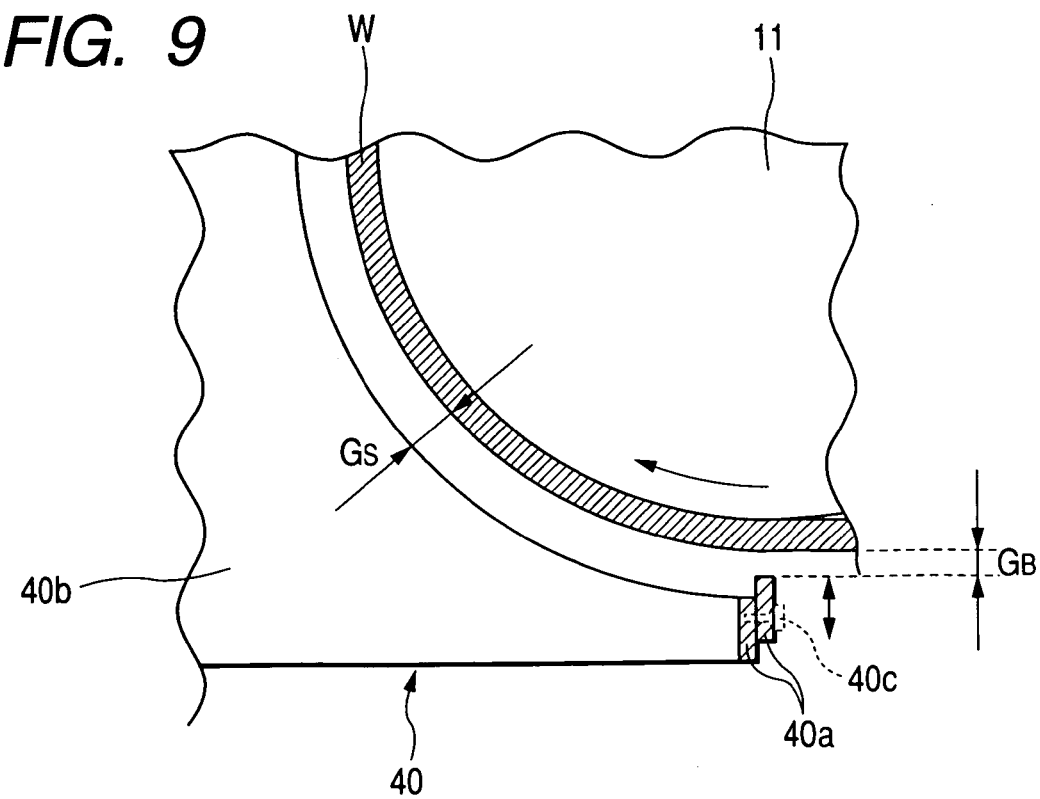
FIG. 9 is a cross-sectional view showing the low-pressure chamber 40 and the web W approaching closer (the back plate 40a is fixed to the chamber 40 with a screw 40c).

On the side opposite the web W travelling direction side, a low-pressure chamber 40 is disposed at the position not coming into contact with the bead so as to satisfactorily adjust the pressure reduction for the bead 14a. The low-pressure chamber 40 comprises a back plate 40a and a side plate 40b for keeping the operation efficiency, and gaps $G_B$ and $G_S$ are present between the back plate 40a and the web W and between the side plate 40b and the web W, respectively. FIGS. 8 and 9 each is a cross-sectional view of the low-pressure chamber 40 and the web W approaching closer. The side plate and the back plate may be integral with the chamber body as shown in FIG. 8 or may be fixed to the chamber with a screw 40c or the like so as to allow for appropriate change of the gap as shown in FIG. 9. In any structure, the actually vacant-portions between the back plate 40a and the web W and between the side plate 40b and the web W are defined as the gaps $G_B$ and $G_S$, respectively. In the case where the low-pressure chamber 40 is, as shown in FIG. 7, disposed below the web W and the slot die 13, the gap $G_B$ between the back plate 40a of the low-pressure chamber 40 and the web W indicates the gap from the top end of the back plate 40a to the web W.

The low-pressure chamber is preferably disposed such that the gap $G_B$ between the back plate 40a and the web W is larger than the gap $G_L$ between the end lip 17 of the slot die 13 and the web W. By virtue of this arrangement, the degree of pressure reduction in the vicinity of the bead can be prevented from changing due to eccentricity of the backup roller 11. For example, when the gap $G_L$ between the end lip 17 of the slot die 13 and the web W is from 30 to 100 μm, the gap $G_B$ between the back plate 40a and the web W is preferably from 100 to 500 μm.

<Construction Material and Precision>

As the length in the web running direction of the end lip on the web travelling direction side is loner, this is more disadvantageous to the bead formation. If this length fluctuates between arbitrary portions in the width direction of the slot die, the bead becomes unstable due to slight disturbance. Accordingly, the fluctuation width of this length in the width direction of the slot die is preferably within 20 μm.

As for the construction material for the end lip of the slot die, if a material such as stainless steel is used, the material is worn at the die working stage and even when the end lip of the slot die is made to have a length of 30 to 100 μm in the web running direction, the precision of the end lip cannot be satisfied. Therefore, for maintaining high working precision, it is important to use a super-hard material as described in Japanese Patent No. 2817053. More specifically, at least the end lip of the slot die is preferably formed of a cemented carbide obtained by binding carbide crystals having an average particle diameter of 5 μm or less. Examples of the cemented carbide include those obtained by binding carbide crystal particles such as tungsten carbide (hereinafter referred to as WC) with a binding metal such as cobalt. As for the binding metal, titanium, tantalum, niobium and a mixed metal thereof may be also used other than cobalt. The average particle diameter of WC crystal is more preferably 3 μm or less.

For realizing high-precision coating, the length of the land on the web travelling direction side of the end lip and the fluctuation of the gap with the web in the width direction of the slot die are also important factors. It is preferred to achieve a combination of these two factors, namely, a straightness within the range capable of suppressing the fluctuation width of the gap to a certain extent. The straightness between the end lip and the backup roller is preferably established such that the fluctuation width of the gap in the width direction of the slot die becomes 5 μm or less.

<Coating Speed>

By virtue of achieving the above-described precision of backup roller and end lip, the coating system preferably used in the present invention can be assured of high stability of the film thickness at high-speed coating. Furthermore, this coating system is a pre-measuring system and therefore, a stabilized film thickness can be easily ensured even at high-speed coating. According to this coating system, the coating solution coated in a small amount as in the antireflection film of the present invention can be coated at a high speed with good stability of the film thickness. The coating may be performed by other coating systems, but in the dip coating method, vibration of the coating solution in the liquid-receiving tank is inevitable and stepwise unevenness is readily generated. In the reverse roll coating method, stepwise unevenness is readily generated due to eccentricity or sagging of the roller related to coating. Furthermore, these coating systems are a post-measuring system and therefore, a stabilized film thickness can be hardly ensured. In view of productivity, it is preferred to perform the coating at 25 m/min or more by using the above-described die coating method.

<Wet Coated Amount>

At the time of forming the hard coat layer, the above-described coating solution is preferably coated to a wet coating film thickness of from 6 to 30 μm on the substrate film directly or through other layer. From the standpoint of preventing drying unevenness, the wet coating film thickness is more preferably from 3 to 20 μm. Also, at the time of forming the low refractive index layer, the coating composition is preferably coated to a wet coating film thickness of 1 to 10 μm, more preferably from 2 to 5 μm, on the hard coat layer directly or through other layer.

[Drying]

The hard coat layer and the low refractive index layer coated on the transparent support film (hereinafter sometimes reffered to as "substrate film") directly or through other layer are then transported by a web to a heated zone for drying the solvent. At this time, the temperature of the drying zone is preferably from 25 to 140° C. Also, it is preferred that the first half of the drying zone is at a relatively low temperature and the latter half is at a relatively high temperature. However, the temperature is preferably lower than the temperature at which components (except for solvent) contained in the coating composition of each layer start volatilizing. For example, in some commercially available photoradical generators which are used in combination with the ultraviolet-curable resin, around several tens % thereof is volatilized within several minutes in warm air at 120° C. Also, in some monofunctional or bifunctional acrylate monomers, volatilization proceeds in warm air at 100° C. In such a case, as described above, the drying zone temperature is preferably lower than the temperature at which components (except for solvent) contained in the coating composition of each layer start volatilizing.

For preventing drying unevenness, the drying air after coating the coating composition of each layer on the substrate film is preferably blown to flow at a velocity of 0.1 to 2 m/sec on the coating film surface as long as the solid content concentration of the coating composition is from 1 to 50 mass %.

Also, in the drying zone after coating the coating composition of each layer on the substrate film, the difference of the temperature between the substrate film and the transportation roller coming into contact with the surface opposite the coating surface of the substrate film is preferably set to fall within the range from 0 to 20° C., because drying unevenness due to uneven heat conduction on the transportation roller can be prevented.

[Curing]

The web after the zone of drying the solvent is passed through a zone for curing each coating film by ionizing radiation and/or heat, thereby curing the coating film. The ionizing radiation for use in the present invention is, for example, an ultraviolet ray, an electron beam or a γ-ray, and such radiation can be used without limitation as long as the compound can be activated and thereby crosslinked and cured, but an ultraviolet ray and an electron beam are preferred. Particularly, an ultraviolet ray is preferred in that handling is simple and high energy is easily obtained. As for the light source of an ultraviolet ray for photopolymerizing an ultraviolet reactive compound, any light source capable of emitting an ultraviolet ray can be used. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. In addition, an ArF excimer laser, a KrF excimer laser, an excimer lamp and synchrotron radiation may also be used. The irradiation conditions vary depending on the lamp used, but the irradiation dose is preferably 10 mJ/cm$^2$ or more, more preferably from 50 to 10,000 mJ/cm$^2$, still more preferably from 50 to 2,000 mJ/cm$^2$. At this time, the irradiation dose distribution in the width direction of the web is preferably a distribution of 50 to 100%, more preferably a distribution of 80 to 100%, including both ends with respect to the maximum dose in the center.

The ultraviolet ray may be irradiated every time of providing one layer for a plurality of layers (medium refractive index layer, high refractive index layer and low refractive index layer) constituting the antireflection layer or may be irradiated after stacking these layers. A combination of such irradiation operations may also be employed. In view of productivity, an ultraviolet ray is preferably irradiated after stacking multiple layers.

Also, in the case where the curing ratio (100—residual functional group content) of the hard coat layer is a certain value less than 100%, when the low refractive index layer of the present invention is provided thereon and cured by ionizing radiation and/or heat, the curing ratio of the lower hard coat layer preferably becomes higher than that before providing the low refractive index layer, because adhesion between the hard coat layer and the low refractive index layer is improved.

An electron beam can also be similarly used. Examples of the electron beam include an electron beam having an energy of 50 to 1,000 keV, preferably from 100 to 300 keV, which is emitted from various electron beam accelerators such as Cockroft-Walton type, van de Graaff type, resonance transformation type, insulating core transformer type, linear type, dynamitron type and high frequency type.

In the case of forming each layer through a crosslinking or polymerization reaction by the ionizing radiation, the crosslinking or polymerization reaction is preferably performed in an atmosphere having an oxygen concentration of 10 vol % or less. By forming the layer in an atmosphere having an oxygen concentration of 10 vol % or less, a layer excellent in the physical strength and chemical resistance can be formed.

The layer formation through a crosslinking or polymerization reaction of an ionizing radiation-curable compound is preferably performed in an atmosphere having an oxygen concentration of 6 vol % or less, more preferably 4 vol % or less, still more preferably 2 vol % or less, and most preferably 1 vol % or less.

The oxygen concentration is preferably adjusted to 10 vol % or less by displacing the atmosphere (nitrogen concentration: about 79 vol %, oxygen concentration: about 21 vol %) with another gas, more preferably with nitrogen (nitrogen purging).

(Polarizing Plate)

The polarizing plate of the present invention comprises a polarizing film and two protective films disposed on both sides of the polarizing film.

The antireflection film of the present invention can be used for a protective film on one side. As for the other protective film, a normal cellulose acetate film may be used, but a cellulose acetate film produced by the above-described solution film-forming method and stretched in the widthwise direction in the rolled film state at a draw ratio of 10 to 100% is preferably used.

Furthermore, in the polarizing plate of the present invention, the other protective film with respect to the antireflection film is preferably an optical compensation film having an optically anisotropic layer comprising a liquid crystalline compound.

The polarizing film includes an iodine-based polarizing film, a dye-based polarizing film using a dichroic dye, and a polyene-based polarizing film. The iodine-based polarizing film and the dye-based polarizing film are generally produced by using a polyvinyl alcohol-based film.

The slow axis of the transparent support or cellulose acetate film of the antireflection film and the transmission axis of the polarizing film are arranged to run substantially in parallel.

The moisture permeability of the protective film is important for the productivity of the polarizing plate. The polarizing film and the protective film are laminated with an aqueous adhesive, and the solvent of this adhesive diffuses in the protective film and is thereby dried. As the moisture permeability of the protective film is higher, the drying rate and in turn the productivity are more elevated, but if the moisture permeability is excessively high, free water enters the polarizing film depending on the environment (under high humidity) where the liquid crystal display device is used, and the polarizing ability decreases.

The moisture permeability of the protective film is determined, for example, by the thickness of transparent support or polymer film (and polymerizable liquid crystal compound), the free volume or the hydrophilicity/hydrophobicity.

In the case where the antireflection film of the present invention is used as a protective film of the polarizing plate, the moisture permeability is preferably from 100 to 1,000 g/m²·24 hrs, more preferably from 300 to 700 g/m²·24 hrs.

In the case of film formation, the thickness of the transparent support can be adjusted by the lip flow rate and line speed or by the stretching and compression. The moisture permeability varies depending on the main raw material used and therefore, can be adjusted to a more preferred range by controlling the thickness.

In the case of film formation, the free volume of the transparent support can be adjusted by the drying temperature and time.

Also in this case, the moisture permeability varies depending on the main raw material used and therefore, the moisture permeability can be adjusted to a more preferred range by controlling the free volume.

The hydrophilicity/hydrophobicity of the transparent support can be adjusted by using an additive. The moisture permeability is elevated by the addition of a hydrophilic additive in the above-described free volume, and conversely, the moisture permeability can be lowered by the addition of a hydrophobic additive.

A polarizing plate having an optically compensating ability can be produced with high productivity at a low cost by independently controlling the moisture permeability.

(Optical Compensation Film)

In the polarizing plate of the present invention, one protective film out of the protective films disposed on both surfaces of a polarizer is preferably the antireflection film of the present invention, and the other protective film is preferably an optical compensation film having an optically anisotropic layer.

The liquid crystal compound used in the optically anisotropic layer of the optical compensation film may be a rod-like liquid crystal or a discotic liquid crystal and includes a high molecular liquid crystal, a low molecular liquid crystal and a compound of not exhibiting liquid crystallinity as a result of crosslinking of a low molecular liquid crystal. The liquid crystalline compound is most preferably a discotic liquid crystal.

Preferred examples of the rod-like liquid crystal include those described in JP-A-2000-304932.

Examples of the discotic liquid crystal include a benzene derivative described in C. Destrade, et al., *Mol. Cryst.*, Vol. 71, page 111 (1981); a truxene derivative described in C. Destrade, et al., *Mol. Cryst.*, Vol. 122, page 141 (1985) and *Physics Lett. A*, Vol. 78, page 82 (1990); a cyclohexane derivative described in B. Kohne, et al., *Angew. Chem.*, Vol. 96, page 70 (1984); and an azacrown-based or phenlylacetylene-based macrocycle described in J. M. Lehn, et al., *J. Chem. Commun.*, page 1794 (1985) and J. Zhang, et al., *J. Am. Chem. Soc.*, Vol. 116, page 2655 (1994).

The discotic liquid crystal generally has a structure such that the above-described compound forms the matrix in the molecular center and is radially substituted by a linear alkyl group, an alkoxy group, a substituted benzoyloxy group or the like, and exhibits liquid crystallinity. However, the discotic liquid crystal is not limited thereto as long as the molecule itself has a negative uniaxial property and can be aligned to a fixed orientation.

Also, in the present invention, the compound having a discotic structural unit contained in the optically anisotropic layer is not required that the compound finally formed in the optically anisotropic layer is a discotic compound, but includes, for example, a compound after the above-described low molecular discotic liquid crystal, which has a group capable of undergoing a reaction by the effect of heat, light or the like, is polymerized or crosslinked through a reaction under the action of heat, light or the like and comes to have a high molecular weight and lose the liquid crystallinity. Preferred examples of the discotic liquid crystal are described in JP-A-8-50206.

The optically anisotropic layer of the optical compensation film is a layer comprising a compound having a discotic structural unit, and it is preferred that the disc plane of the discotic structural unit is inclined with respect to the transparent support plane (that is, the protective film surface) and the angle between the disc plane of the discotic-structural unit and the transparent support plane (that is, the protective film surface) is changed in the depth direction of the optically anisotropic layer.

The angle (angle of inclination) of the plane of the discotic structural unit is generally increased or decreased in the depth direction of the optically anisotropic layer with an increase of the distance from the bottom surface of the optically anisotropic layer. The angle of inclination is preferably increased with an increase of the distance. Examples of the change in the angle of inclination include a change containing continuous increase, continuous decrease, intermittent increase, intermittent decrease, or continuous increase and continuous decrease, and an intermittent change containing increase and decrease. The intermittent change contains a region where the angle of inclination is not changed on the way of the depth direction. The angle of inclination is preferably increased or decreased as a whole despite a region where the angle of inclination is not changed. Furthermore, the angle of inclination is preferably increased as a whole, more preferably continuously changed.

The optically anisotropic layer is generally obtained as follows. A solution prepared by dissolving a discotic compound and other compounds in a solvent is coated on an orientation film, dried, then heated to a discotic nematic phase-forming temperature, and cooled while keeping the oriented state (discotic nematic phase). Alternatively, a solution prepared by dissolving a discotic compound and other compounds (additionally dissolving, for example, a polymerizable monomer and a photopolymerization initiator) in a solvent is coated on an orientation film, dried, heated to a discotic nematic phase-forming temperature, then polymerized (for example, by the irradiation with UV light), and further cooled, whereby the optically anisotropic layer is obtained. The discotic nematic liquid crystal phase-solid phase transition temperature of the discotic liquid crystalline compound for use in the present invention is preferably from 70 to 300° C., more preferably from 70 to 170° C.

The angle of inclination of the discotic unit on the support side can be generally adjusted by selecting the material of the orientation film or selecting the rubbing treatment method. Also, the angle of inclination of the discotic unit on the surface side (air side) can be generally adjusted by selecting the discotic compound or other compounds (for example, a plasticizer, a surfactant, a polymerizable monomer and a polymer) used together with the discotic compound. Furthermore, the degree of change in the angle of inclination can also be adjusted by the above-described selection.

As for the plasticizer, surfactant and polymerizable monomer, any compound may be used as long as it has compatibility with the discotic compound and can give a change in the angle of inclination of the liquid crystalline discotic compound or does not inhibit the orientation. Among these compounds, a polymerizable monomer (for example, a compound having a vinyl group, a vinyloxy group, an acryloyl group or a methacryloyl group) is preferred. This compound is generally used in an amount of 1 to 50 mass % (preferably from 5 to 30 mass %) based on the discotic compound. Preferred examples of the polymerizable monomer include a polyfunctional acrylate. The number of functional groups is preferably trifunctional or more, more preferably tetrafunctional or more. A hexafunctional monomer is most preferred. Preferred examples of the hexafunctional monomer include dipentaerythritol hexaacrylate. A mixture of polyfunctional monomers differing in the number of functional groups may also be used.

As for the polymer, any polymer may be used as long as it has compatibility with the discotic compound and can give a change in the angle of inclination to the liquid crystalline discotic compound. Examples of the polymer include a cellulose ester. Preferred examples of the cellulose ester include cellulose acetate, cellulose acetate propionate, hydroxypropyl cellulose and cellulose acetate butyrate. In order not to inhibit the orientation of the liquid crystalline discotic compound, this polymer is generally used in an amount of 0.1 to 10 mass % (preferably from 0.1 to 8 mass %, more preferably from 0.1 to 5 mass %) based on the discotic compound.

In the present invention, the optically anisotropic layer preferably comprises a discotic liquid crystal formed on an orientation film provided, for example, on a protective film (for example, a cellulose acetate film), in which the orientation film is a rubbed film comprising a crosslinked polymer.

(Orientation Film)

In the present invention, the orientation film provided for adjusting the orientation of the liquid crystalline compound of the optically anisotropic layer is preferably a layer comprising two kinds of crosslinked polymers. Either a polymer which itself is crosslinkable or a polymer which is crosslinked with a crosslinking agent is preferably used for at least one polymer out of those two kinds of polymers. The orientation film can be formed by using a functional group-containing polymer or a polymer having introduced thereinto a functional group, and causing a reaction between polymers, for example, under the action of light, heat or change in pH, or by introducing a bonding group originated in a crosslinking agent between polymers with use of a crosslinking agent which is a highly reactive compound, thereby crosslinking the polymers with each other.

Such crosslinking is usually performed by coating a coating solution containing the above-described polymer or a mixture of the polymer and a crosslinking agent on a transparent support, and then subjecting the coating to heating or the like. However, since it is sufficient if durability can be ensured at the final product stage, a treatment for effecting crosslinking may be performed at any stage after coating the orientation film on the support until the final polarizing plate is obtained. In the case where the optically anisotropic layer formed on the orientation film comprises a discotic compound, considering the orientation property of the discotic compound, it is also preferred to orient the discotic compound and then thoroughly effect the crosslinking. That is, in the case where a coating solution containing a polymer and a crosslinking agent capable of crosslinking the polymer is coated on a support, the coating is dried under heating (where crosslinking is generally effected, but when the heating temperature is low, the crosslinking further proceeds at the heating to the discotic nematic phase-forming temperature) and subjected to a rubbing treatment to form an orientation film, and a coating solution containing a compound having a discotic structural unit is coated on the orientation film, heated to a temperature not less than the discotic nematic phase-forming temperature, and then cooled, whereby the optically anisotropic layer is formed.

With respect to the polymer used for the orientation film in the present invention, a polymer which itself is crosslinkable and a polymer which are crosslinked with a crosslinking agent both can be used. As a matter of course, a polymer having both properties can be used. Examples of the polymer include a polymer such as polymethyl methacrylate, acrylic acid/methacrylic acid copolymer, styrene/maleinimide copolymer, polyvinyl alcohol, modified polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, polycarbonate and gelatin; and a compound such as silane coupling agent. Among these polymers, preferred is a water-soluble polymer such as poly(N-methylolacrylamide), carboxymethyl cellulose, gelatin, polyvinyl alcohol and modified polyvinyl alcohol, more preferred are gelatin, polyvinyl alcohol and a modified polyvinyl alcohol, and still more preferred are polyvinyl alcohol and a modified polyvinyl alcohol.

Out of these polymers, polyvinyl alcohol or a modified polyvinyl alcohol is preferred, and a combination use of two kinds of polyvinyl alcohols or modified polyvinyl alcohols differing in the polymerization degree is most preferred.

The polyvinyl alcohol is, for example, a polyvinyl alcohol having a saponification degree of 70 to 100%. The saponification degree is generally from 80 to 100%, preferably from 85 to 95%, and the polymerization degree is preferably from 100 to 3,000. Examples of the modified polyvinyl alcohol include a modified product of polyvinyl alcohol, such as those modified by copolymerization (the modifying group introduced is, for example, COONa, $Si(OX)_4$, $N(CH_3)_3.Cl$, $C_9H_{19}COO$, $SO_3$, Na or $C_{12}H_{25}$), modified by chain transfer (the modifying group introduced is, for example, COONa, SH or $C_{12}H_{25}$), or modified by block polymerization (the modifying group introduced is, for example, COOH, $CONH_2$, COOR (R: an alkyl group having from 1 to 20 carbon atoms) or $C_6H_5$). Among these, an unmodified or modified polyvinyl alcohol having a saponification degree of 80 to 100% is preferred, and an unmodified or alkylthio-modified polyvinyl alcohol having a saponification degree of 85 to 95% is more preferred.

The synthesis method, the measurement of visible absorption spectrum, the method of determining the degree of introduction, and the like of these modified polymers are described in detail in JP-A-8-338913.

Specific examples of the crosslinking agent used together with the polymer such as polyvinyl alcohol include the followings, and these are preferably used in combination with the above-described water-soluble polymer, particularly a polyvinyl alcohol and a modified polyvinyl alcohol (including those specific modified products). Specific examples of the crosslinking agent include aldehydes (e.g., formaldehyde, glyoxal, glutaraldehyde), an N-methylol compound (e.g., dimethylolurea, methyloldimethyl hydantoin), a dioxane derivative (e.g., 2,3-dihydroxydioxane), a compound which acts resulting from activation of a carboxyl group (e.g., carbenium, 2-naphthalene sulfonate, 1,1-bispyrrolidino-1-chloropyridinium, 1-morpholinocarbonyl-3-(sulfonatoaminomethyl), an active vinyl compound (e.g., 1,3,5-triacryloyl-hexahydro-s-triazine, bis(vinylsulfone)methane, N,N'-methylenebis-[β-(vinylsulfonyl)propionamide]), an active halogen compound (e.g., 2,4-dichloro-6-hydroxy-s-triazine), isoxazoles, and dialdehyde starch. These crosslinking agents can be used individually or in combination. In view of productivity, use of aldehydes having high reaction activity is preferred, and glutaraldehyde is more preferred.

The crosslinking agent is not particularly limited and as for the amount added, the moisture resistance tends to be more improved when added in a larger amount. However, if the crosslinking agent is added in an amount of 50 mass % or more based on the polymer, the orientation ability as the orientation film decreases. Therefore, the amount added of the crosslinking agent is preferably from 0.1 to 20 mass %, more preferably from 0.5 to 15 mass %. In this case, the orientation film may contain an unreacted crosslinking agent to some extent even after the completion of crosslinking reaction, and the amount of the crosslinking agent in the orientation film is preferably 1.0 mass % or less, more preferably 0.5 mass % or less. If the amount of the crosslinking agent contained in the orientation film exceeds 1.0 mass %, satisfactory durability cannot be obtained. More specifically, when the orientation film is used in a liquid crystal display device and used over a long period of time or left standing in a high-temperature high-humidity atmosphere, reticulation may be generated.

The orientation film of the present invention can be formed by coating a coating solution containing the above-described polymer and crosslinking agent which are the orientation film-forming materials, on a transparent support and subjecting the coating to drying under heat (crosslinking) and then rubbing treatment. As described above, the crosslinking reaction may be performed at an arbitrary timing after the coating on a transparent support. In the case of using the water-soluble polymer (e.g., polyvinyl alcohol) as the orientation film-forming material, the coating solution is preferably a solution in a mixed solvent of water and an organic solvent such as methanol having a defoaming action. The ratio of water/methanol is, in terms of the mass ratio, generally from 0/100 to 99/1, preferably from 0/100 to 91/9. With this ratio, the generation of foams is suppressed, and defects of the orientation film and in turn the layer surface of the optically anisotropic layer are remarkably reduced. Examples of the coating method include a spin coating method, a dip coating method, a curtain coating method, an extrusion coating method, a bar coating method and an E-type coating method. An E-type coating method is preferred. Also, the film thickness is preferably from 0.1 to 10 μm.

The drying under heat may be performed at 20 to 110° C. In order to form sufficient crosslinking, the drying temperature is preferably from 60 to 100° C., more preferably from 80 to 100° C. The drying time may be from 1 minute to 36 hours, but is preferably from 5 to 30 minutes. The pH is preferably set to a value optimal for the crosslinking agent used. In the case of using glutaraldehyde as the crosslinking agent, the pH is preferably from 4.5 to 5.5. more preferably 5.

The orientation film is provided on a transparent support directly or through an undercoat layer capable of ensuring close adhesion of the transparent support to the orientation film. The undercoat layer is not particularly limited as long as the combination of a transparent support and an orientation film can be assured of enhanced adhesion therebetween.

The orientation film can be obtained by crosslinking the polymer layer as described above and rubbing the surface. The orientation film functions to define the orientation direction of the liquid crystalline discotic compound provided thereon.

As for the rubbing treatment, a treatment method widely employed as a treatment process for the liquid crystal orientation of LCD can be utilized. That is, a method of rubbing the surface of the orientation film in a fixed direction by using paper, gauze, felt, rubber, nylon, polyester fiber or the like, thereby obtaining orientation, may be used. In general, the treatment is performed by rubbing the surface several times with, for example, a cloth having averagely implanted thereon fibers uniform in the length and thickness.

(Transparent Support on which Optically Anisotropic Layer is Provided)

The transparent support on which the optically anisotropic layer is provided is preferably a cellulose acetate film and may be optically uniaxial or biaxial.

The transparent support on which the optically anisotropic layer is provided plays an optically important role by itself and therefore, the transparent support is preferably adjusted to have Re(590) of 0 to 200 nm and Rth(λ) of 70 to 400 nm.

In the case of using two sheets of optically anisotropic cellulose acetate film in a liquid crystal display device, the Rth(590) of the film is preferably from 70 to 250 nm.

In the case of using one sheet of optically anisotropic cellulose acetate film in a liquid crystal display device, the Rth(590) of the film is preferably from 150 to 400 nm.

In the present invention, Re(λ) and Rth(λ) represent an in-plane retardation and a retardation in the thickness direction at a wavelength λ, respectively. The Re(λ) is measured by injecting light at a wavelength of λ nm in the normal line direction of the film in KOBRA 21ADH (manufactured by Oji Scientific Instruments). The Rth(λ) is calculated by KOBRA 21ADH based on the retardation values measured in three directions, that is, Re(λ), a retardation value obtained by injecting light at a wavelength of λ nm from the direction inclined at +40° with respect to the film normal line by using an in-plane slow axis (detected by KOBRA 21ADH) as the inclination axis (rotation axis), and a retardation value obtained by injecting light at a wavelength of λ nm from the direction inclined at −40° with respect to the film normal line by using the in-plane slow axis as the inclination axis (rotation axis). Here, as for the assumed value of the average refractive index, the value described in *Polymer Handbook*, JOHN WILEY & SONS, INC., and catalog of various optical films can be used. When the average refractive index value is unknown, this can be measured by an Abbe refractometer. The average refractive index values of main optical films are as follows: cellulose acylate (1.48), cycloolefin polymer (1.52), polycarbonate (1.59), polymethyl methacrylate (1.49) and polystyrene (1.59). By inputting the assumed value of the average refractive index and the film thickness, nx, ny and nz are calculated by KOBRA 21ADH.

(Liquid Crystal Display)

The antireflection film or polarizing plate of the present invention can be advantageously used in an image display device such as liquid crystal display device, and is preferably used as the outermost layer of the display.

The liquid crystal display device comprises a liquid crystal cell and two sheets of polarizing plates disposed on both sides thereof, and the liquid crystal cell carries a liquid crystal between two sheets of electrode substrates. Furthermore, one sheet of optically anisotropic layer is disposed between the liquid crystal cell and one polarizing plate, or two sheets of optically anisotropic layer are sometimes disposed in both spaces between the liquid crystal cell and respective polarizing plates.

The liquid crystal cell is preferably a TN mode, a VA mode, an OCB mode, an IPS mode or an ECB mode.

In the TN-mode liquid crystal cell, rod-like liquid crystalline molecules are oriented substantially in the horizontal alignment at the time of not applying a voltage and furthermore, twisted at an angle of 60 to 120°.

The TN-mode liquid crystal cell is most frequently utilized in a color TFT liquid crystal display device and described in a large number of publications.

In the VA-mode liquid crystal cell, rod-like liquid crystalline molecules are oriented substantially in the vertical alignment at the time of not applying a voltage.

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) a (MVA-mode) liquid crystal cell where the VA mode is modified to a multi-domain system for enlarging the viewing angle (described in SID97, Digest of Tech. Papers (preprints), 28, 845 (1997)); (3) a (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

The OCB-mode liquid crystal cell is a liquid crystal cell of bend orientation mode where rod-like liquid crystalline molecules are oriented substantially in the reverse direction (symmetrically) between the upper portion and the lower portion, and this is described in U.S. Pat. Nos. 4,583,825 and 5,410,422. Since rod-like liquid crystalline molecules are symmetrically oriented between the upper portion and the lower portion of the liquid crystal cell, the liquid crystal cell of bend orientation mode has a self-optically compensating ability. For this reason, this liquid crystal mode is called an OCB (optically compensatory bend) liquid crystal mode. A liquid crystal display device of bend orientation mode is advantageous in that the response speed is fast.

The IPS-mode liquid crystal cell employs a system of switching the nematic liquid crystal by applying a transverse electric field thereto, and this is described in detail in Proc. IDRC (Asia Display '95), pp. 577-580 and ibid., pp. 707-710.

In the ECB-mode liquid crystal cell, rod-like liquid crystalline molecules are oriented substantially in the horizontal alignment at the time of not applying a voltage. The ECB mode is one of liquid crystal display modes having a simplest structure and is described in, for example, JP-A-5-203946.

EXAMPLES

The present invention is described in greater detail below by referring to Examples, but the present invention is limited thereto.

In the present invention, the "parts" denotes "parts by mass".

(Synthesis of Fluorine-Containing Olefin-Based Polymer A)

A stainless steel-made autoclave equipped with a magnetic stirrer having an internal volume of 1.5 liter was thoroughly replaced by a nitrogen gas and thereinto, 600 g of ethyl acetate, 91.5 g of perfluoro(propyl vinyl ether) (FPVE), 57.9 g of ethyl vinyl ether (EVE), 30.3 g of 2-hydroxy ethyl vinyl ether (HEVE), 60.0 g of nonionic reactive emulsifier "ADEKA REASOAP NE-30" (produced by Asahi Denka Kogyo Co., Ltd.), 5.0 g of azo group-containing polydimethylsiloxane "VPS-1001" (produced by Wako Pure Chemicals Industries, Ltd.), and 1.5 g of dilauroyl peroxide (LPO) were charged. After cooling to −50° C. with dry ice-methanol, oxygen in the system was removed again by a nitrogen gas. Subsequently, 144.4 g of hexafluoropropylene (HFP) was charged, and elevation of the temperature was started. The pressure when the temperature in the autoclave reached 60° C. was 4.7 kgf/cm$^2$. Thereafter, the reaction was continued for 25 hours at 60° C. with stirring and when the pressure was decreased to 2.5 kgf/cm$^2$, the reaction was stopped by cooling the autoclave with water. After reaching room temperature, the unreacted monomer was removed and the autoclave was opened to obtain a polymer solution. The obtained polymer solution was charged into methanol to precipitate the polymer, and the precipitate was washed with methanol and vacuum-dried at 50° C. to obtain 306 g of Fluorine-Containing Olefin-Based Polymer A. The fluorine content of Fluorine-Containing Olefin Polymer A was 50 mass %.

(Synthesis of Fluorine-Containing Olefin-Based Polymer B)

Fluorine-Containing Olefin-Based Polymer A (20 g) obtained above was dissolved in 100 ml of N,N-dimethylacetoamide, and 4.0 g of methacrylic acid chloride was added dropwise thereto under ice cooling, followed by stirring at room temperature for 10 hours. After adding ethyl acetate to the reaction solution and washing the mixture with water, the organic layer was extracted and concentrated, and the obtained polymer was re-precipitated with methanol and then vacuum-dried to obtain 19 g of Fluorine-Containing Olefin-Based Polymer B having introduced thereto a photocurable functional group. The fluorine content of Fluorine-Containing Olefin-Based Polymer B was 44 mass %.

(Synthesis of Fluorine-Containing Olefin-Based Polymer C)

Fluorine-Containing Olefin-Based Polymer C was synthesized in the same manner as Fluorine-Containing Olefin-Based Polymer A except that the amounts charged of each monomer and polymerization initiator were changed to 32.3 g of perfluoro(propyl vinyl ether) (FPVE), 61.3 g of ethyl vinyl ether (EVE), 42.4 g of 2-hydroxy ethyl vinyl ether (HEVE), 1.5 g of dilauroyl peroxide (LPO) and 196.8 g of hexafluoropropylene (HFP), and nonionic reactive emulsifier "ADEKA REASOAP NE-30" (produced by Asahi Denka Kogyo Co., Ltd.) and azo group-containing polydimethylsiloxane "VPS-1001" (produced by Wako Pure Chemicals Industries, Ltd.) were not used. The fluorine content of Fluorine-Containing Olefin Polymer C was 52 mass %.

(Preparation of Liquid Dispersion of Titanium Dioxide Fine Particle)

The titanium dioxide fine particle used was a titanium dioxide fine particle containing cobalt and being surface-treated with aluminum hydroxide and zirconium hydroxide (MPT-129C, produced by Ishihara Sangyo Kaisha, Ltd.).

After adding 38.6 g of a dispersant shown below and 704.3 g of cyclohexanone to 257.1 g of this particle, the resulting mixture was dispersed by a Dyno mill to prepare a titanium dioxide liquid dispersion having a mass average diameter of 70 nm.

Dispersant:

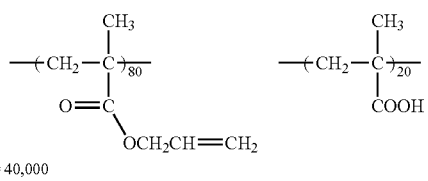

Mw = 40,000

(Preparation of Sol Solution a)

In a reactor equipped with a stirrer and a reflux condenser, 120 parts by mass of methyl ethyl ketone, 100 parts by mass of acryloyloxypropyltrimethoxysilane (KBM-5103 (trade name), produced by Shin-Etsu Chemical Co., Ltd.) and 3 parts by mass of diisopropoxyaluminum ethyl acetoacetate were added and mixed, and 30 parts of ion exchanged water was added thereto. After allowing the reaction to proceed at 60° C. for 4 hours, the reaction solution was cooled to room temperature to obtain Sol Solution a. The mass average molecular weight was 1,800 and in the components having a molecular weight larger than the oligomer component, the components having a molecular weight of 1,000 to 20,000 occupied 100%. From the analysis by gas chromatography, it was confirmed that the raw material acryloyloxypropyltrimethoxysilane was not remaining at all.

(Preparation of Liquid Dispersion of Hollow Silica Fine Particle)

30 Parts of acryloyloxypropyltrimethoxysilane (KBM-5103, produced by Shin-Etsu Chemical Co., Ltd.) and 1.5 parts of diisopropoxyaluminum ethyl acetate were added to 500 parts of a hollow silica fine particle sol (isopropyl alcohol silica sol, CS60-IPA, produced by Catalysts & Chemicals Ind. Co., Ltd., average particle diameter: 60 nm, shell thickness: 10 nm, silica concentration: 20%, refractive index of silica particle: 1.31) and mixed, and 9 parts of ion exchanged water was added thereto. After allowing the reaction to proceed at 60° C. for 8 hours, the reaction solution was cooled to room temperature, and 1.8 parts of acetylacetone was added to obtain a liquid dispersion of hollow silica fine particle. The solid content concentration of the obtained liquid dispersion of hollow silica fine particle was 18 mass %, and the refractive index after drying the solvent was 1.31.

(Preparation of Coating Solution A for Hard Coat Layer)

The following composition was charged into a mixing tank and stirred to prepare Coating Solution A for Hard Coat Layer.

(Composition of Coating Solution A for Hard Coat Layer)

| | |
|---|---|
| KAYARAD DPCA-20 (UV-curable resin, produced by Nippon Kayaku Co., Ltd.) | 27.5 parts by mass |
| MEK-ST (silica fine particle dispersion, produced by Nissan Chemicals Industries, Ltd.) | 50.0 parts by mass |
| KBM-5103 (silane coupling agent, produced by Shin-Etsu Chemical Co., Ltd.) | 5.0 parts by mass |
| Irgacure 184 (photopolymerization initiator, produced by Ciba Specialty Chemicals) | 2.5 parts by mass |
| Methyl ethyl ketone (MEK) | 10.0 parts by mass |
| Cyclohexanone | 5.0 parts by mass |

(Preparation of Coating Solution B for Hard Coat Layer)

The following composition was charged into a mixing tank and stirred to prepare Coating Solution B for Hard Coat Layer.

(Composition of Coating Solution B for Hard Coat Layer)

| | |
|---|---|
| KAYARAD DPCA-20 (UV-curable resin, produced by Nippon Kayaku Co., Ltd.) | 27.5 parts by mass |
| MEK-ST (silica fine particle dispersion, produced by Nissan Chemicals Industries, Ltd.) | 50.0 parts by mass |
| KBM-5103 (silane coupling agent, produced by Shin-Etsu Chemical Co., Ltd.) | 5.0 parts by mass |
| Irgacure 184 (photopolymerization initiator, produced by Ciba Specialty Chemicals) | 2.5 parts by mass |
| SX-130H (crosslinked polystyrene particle of 1.3 μm, produced by The Soken Chemical & Engineering Co., Ltd.) | 2.0 parts by mass |
| Methyl ethyl ketone (MEK) | 10.0 parts by mass |
| Cyclohexanone | 5.0 parts by mass |

(Preparation of Coating Solution C for Hard Coat Layer)

The following composition was charged into a mixing tank and stirred to prepare Coating Solution C for Hard Coat Layer.

(Composition of Coating Solution C for Hard Coat Layer)

| | |
|---|---|
| Desolite Z-7404 (zirconia fine particle-containing hard coat composition solution, solid content concentration: 60 mass %, zirconia fine particle content: 70 mass % based on solid content, average particle diameter: about 20 nm, solvent composition: MIBK:MEK = 9:1, produced by JSR Corporation) | 100 parts by mass |
| KAYARAD DPHA (UV-curable resin, produced by Nippon Kayaku Co., Ltd.) | 31 parts by mass |
| KBM-5103 (silane coupling agent, produced by Shin-Etsu Chemical Co., Ltd.) | 10 parts by mass |
| KE-P150 (silica particle of 1.5 μm, produced by Nippon Shokubai Co., Ltd.) | 8.9 parts by mass |
| MXS-300 (crosslinked PMMA particle of 3.0 μm, produced by The Soken Chemical & Engineering Co., Ltd.) | 3.4 parts by mass |
| Methyl ethyl ketone (MEK) | 29 parts by mass |
| Methyl isobutyl ketone (MIBK) | 13 parts by mass |

In the above, the "silica particle of 1.5 μm" means a silica particle having an average particle diameter of 1.5 μm, and the "crosslinked PMMA particle of 3.0 μm" means a crosslinked polymethyl methacrylate particle having an average particle diameter of 3.0 μm. These particles are a light-transparent particle.

(Preparation of Coating Solution D for Hard Coat Layer)

The following composition was charged into a mixing tank and stirred to prepare Coating Solution D for Hard Coat Layer.

(Composition of Coating Solution D for Hard Coat Layer)

| | |
|---|---|
| KAYARAD PET-30 (UV-curable resin, produced by Nippon Kayaku Co., Ltd.) | 50 parts by mass |
| Irgacure 184 (photopolymerization initiator, produced by Ciba Specialty Chemicals) | 2.5 parts by mass |
| KBM-5103 (silane coupling agent, produced by Shin-Etsu Chemical Co., Ltd.) | 6.2 parts by mass |

-continued

| | |
|---|---|
| Crosslinked poly(acryl-styrene) particle having an average particle diameter of 3.5 μm (produced by The Soken Chemical & Engineering Co., Ltd., refractive index: 1.55) | 2 parts by mass |
| Crosslinked polystyrene particle having an average particle diameter of 3.5 μm (produced by The Soken Chemical & Engineering Co., Ltd., refractive index: 1.60) | 3 parts by mass |
| Fluorine-based surface modifier (FP-149) | 0.05 parts by mass |
| Toluene | 50 parts by mass |
| Cyclohexanone | 6.6 parts by mass |

(Preparation of Coating Solution E for Hard Coat Layer)

The following composition was charged into a mixing tank and stirred to prepare Coating Solution E for Hard Coat Layer.

(Composition of Coating Solution E for Hard Coat Layer)

| | |
|---|---|
| KAYARAD DPHA (UV-curable resin, produced by Nippon Kayaku Co., Ltd.) | 25.4 parts by mass |
| Irgacure 184 (photopolymerization initiator, produced by Ciba Specialty Chemicals) | 1.3 parts by mass |
| KBM-5103 (silane coupling agent, produced by Shin-Etsu Chemical Co., Ltd.) | 5.2 parts by mass |
| CAB-531-1 (cellulose acetate butyrate having a molecular weight of 40,000, produced by Eastman Chemical Co.) | 0.50 parts by mass |
| Crosslinked poly(acryl-styrene) particle having an average particle diameter of 3.5 μm (produced by The Soken Chemical & Engineering Co., Ltd., copolymerization compositional ratio = 50/50, refractive index: 1.536) | 6.3 parts by mass |
| Fluorine-based surface modifier described in the specification (FP-149) | 0.04 parts by mass |
| Methyl isobutyl ketone | 61 parts by mass |

(Composition of Coating Solution for Medium Refractive Index Layer)

| | |
|---|---|
| Liquid dispersion of titanium dioxide fine particle | 100 parts by mass |
| KAYARAD DPHA (UV-curable resin, produced by Nippon Kayaku Co., Ltd.) | 66 parts by mass |
| Irgacure 907 (photopolymerization initiator, produced by Ciba Specialty Chemicals) | 3.5 parts by mass |
| KAYACURE DETX-S (photosensitizer, produced by Nippon Kayaku Co., Ltd.) | 1.2 parts by mass |
| Methyl ethyl ketone (MEK) | 543 parts by mass |
| Cyclohexanone | 2103 parts by mass |

(Preparation of Coating Solution for High Refractive Index Layer)

The following composition was charged into a mixing tank and after stirring, filtered through a polypropylene-made filter having a pore size of 0.4 μm to prepare a coating solution for high refractive index layer.

(Composition of Coating Solution for High Refractive Index Layer)

| | |
|---|---|
| Liquid dispersion of titanium dioxide fine particle | 100 parts by mass |
| KAYARAD DPHA (UV-curable resin, produced by Nippon Kayaku Co., Ltd.) | 8.2 parts by mass |
| Irgacure 907 (photopolymerization initiator, produced by Ciba Specialty Chemicals) | 0.68 parts by mass |
| KAYACURE DETX-S (photosensitizer, produced by Nippon Kayaku Co., Ltd.) | 0.22 parts by mass |
| Methyl ethyl ketone (MEK) | 78 parts by mass |
| Cyclohexanone | 243 parts by mass |

(Preparation of Coating Solution A for Low Refractive Index Layer)

The following composition was charged into a mixing tank and after stirring, filtered through a polypropylene-made filter having a pore size of 1 μm to prepare Coating Solution A for Low Refractive Index Layer.

(Composition of Coating Solution A for Low Refractive Index Layer)

| | |
|---|---|
| Fluorine-Containing Olefin-Based Polymer B | 1.3 parts by mass |
| Liquid dispersion of hollow silica fine particle | 7.1 parts by mass |
| Sol Solution a | 0.7 parts by mass |
| Photopolymerization Initiator a | 0.07 parts by mass |
| Methyl ethyl ketone (MEK) | 90.8 parts by mass |

(Photopolymerization Initiator a)

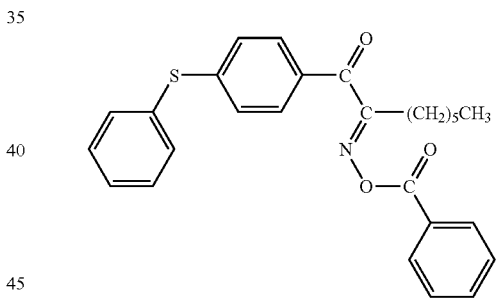

(Preparation of Coating Solution B for Low Refractive Index Layer)

The following composition was charged into a mixing tank and after stirring, filtered through a polypropylene-made filter having a pore size of 1 Am to prepare Coating Solution B for Low Refractive Index Layer.

(Composition of Coating Solution B for Low Refractive Index Layer)

| | |
|---|---|
| Fluorine-Containing Olefin-Based Polymer B | 1.3 parts by mass |
| Liquid dispersion of hollow silica fine particle | 5.3 parts by mass |
| Silica fine particle dispersion (MEK-ST differing in the particle diameter (average particle diameter: 45 nm, produced by Nissan Chemicals Industries, Ltd.) | 1.1 parts by mass |
| Sol Solution a | 0.7 parts by mass |
| Photopolymerization Initiator a | 0.07 parts by mass |
| Methyl ethyl ketone (MEK) | 91.5 parts by mass |

(Preparation of Coating Solution C for Low Refractive Index Layer)

The following composition was charged into a mixing tank and after stirring, filtered through a polypropylene-made filter having a pore size of 1 Am to prepare Coating Solution C for Low Refractive Index Layer.

(Composition of Coating Solution C for Low Refractive Index Layer)

| | |
|---|---|
| Fluorine-Containing Olefin-Based Polymer B | 1.1 parts by mass |
| KAYARAD DPHA (UV-curable resin, produced by Nippon Kayaku Co., Ltd.) | 0.2 parts by mass |
| Liquid dispersion of hollow silica fine particle | 7.1 parts by mass |
| Sol Solution a | 0.7 parts by mass |
| Photopolymerization Initiator a | 0.07 parts by mass |
| Methyl ethyl ketone (MEK) | 90.8 parts by mass |

(Preparation of Coating Solution D for Low Refractive Index Layer)

The following composition was charged into a mixing tank and after stirring, filtered through a polypropylene-made filter having a pore size of 1 μm to prepare Coating Solution D for Low Refractive Index Layer.

(Composition of Coating Solution D for Low Refractive Index Layer)

| | |
|---|---|
| Fluorine-Containing Olefin-Based Polymer B | 1.0 part by mass |
| KAYARAD DPHA (UV-curable resin, produced by Nippon Kayaku Co., Ltd.) | 0.2 parts by mass |
| Liquid dispersion of hollow silica fine particle | 7.1 parts by mass |
| Sol Solution a | 0.7 parts by mass |
| RMS-033 (reactive silicone, produced by Gelest) | 0.1 part by mass |
| Photopolymerization Initiator a | 0.07 parts by mass |
| Methyl ethyl ketone (MEK) | 90.8 parts by mass |

(Preparation of Coating Solution E for Low Refractive Index Layer)

The following composition was charged into a mixing tank and after stirring, filtered through a polypropylene-made filter having a pore size of 1 μm to prepare Coating Solution E for Low Refractive Index Layer.

(Composition of Coating Solution E for Low Refractive Index Layer)

| | |
|---|---|
| Fluorine-Containing Olefin-Based Polymer B | 1.3 parts by mass |
| Silica fine particle dispersion (MEK-ST differing in the particle diameter (average particle diameter: 45 nm, produced by Nissan Chemicals Industries, Ltd.) | 4.3 parts by mass |
| Sol Solution a | 0.7 parts by mass |
| Photopolymerization Initiator a | 0.07 parts by mass |
| Methyl ethyl ketone (MEK) | 93.6 parts by mass |

(Preparation of Coating Solution F for Low Refractive Index Layer)

The following composition was charged into a mixing tank and after stirring, filtered through a polypropylene-made filter having a pore size of 1 μm to prepare Coating Solution F for Low Refractive Index Layer.

(Composition of Coating Solution F for Low Refractive Index Layer)

| | |
|---|---|
| Fluorine-Containing Olefin-Based Polymer B | 3.2 parts by mass |
| Photopolymerization Initiator a | 0.2 parts by mass |
| Methyl ethyl ketone (MEK) | 96.6 parts by mass |

(Production of Antireflection Film A-01)

A 80 μm-thick triacetyl cellulose film (TAC-TD80U, produced by Fuji Photo Film Co., Ltd.) in a roll form was unrolled as the support, and Coating Solution A for Hard Coat Layer was coated thereon by the die coating method using an apparatus having a constitution described below under the following conditions and dried at 90° C. for 60 seconds. The coating layer obtained was cured under irradiation of ultraviolet rays at an irradiation dose of 50 mJ/cm$^2$ by using an air-cooled metal halide lamp of 160 W/cm (manufactured by I-Graphics K.K.) in nitrogen purging to form Hard Coat Layer 1 having a thickness of 6 μm. The resulting film was taken up.

The refractive index of the binder constituting Hard Coat Layer 1 was 1.52.

Basic Conditions:

In the slot die 13 used, the upstream lip land length $I_{UP}$ was 0.5 mm, the downstream lip land length $I_{LO}$ was 50 μm, the opening length of the slot 16 in the web running direction was 150 μm, and the length of the slot 16 was 50 mm. The gap between the upstream lip land 18a and the web W was made 50 μm longer than the gap between the downstream lip land 18b and the web W (hereinafter referred to as an "overbite length of 50 μm"), and the gap $G_L$ between the downstream lip land 18b and the web W was set to 50 μm. Also, the gap $G_S$ between the side plate 40b of the low-pressure chamber 40 and the web W and the gap $G_B$ between the back plate 40a and the web W both were set to 200 μm.

The coating was performed according to the liquid properties of each coating solution under the conditions such that hard coat layer: a coating speed of 40 m/min and a wet coated amount of 21 ml/m$^2$ for Coating Solutions A and B for Hard Coat Layer; a coating speed of 20 m/min and a wet coated amount of 9 ml/m$^2$ for Coating Solution C for Hard Coat Layer; a coating speed of 30 m/min and a wet coated amount of 17.5 ml/m$^2$ for Coating Solutions D and E for Hard Coat Layer; medium refractive index layer: a coating speed of 25 m/min and a wet coated amount of 3.5 ml/m$^2$; high refractive index layer: a coating speed of 25 m/min and a wet coated amount of 3.5 ml/m$^2$; and low refractive index layer: a coating speed of 40 m/min and a wet coated amount of 5.0 ml/m$^2$. Incidentally, the coating width was 1,300 mm and the effective width was 1,280 mm.

The support having provided thereon Hard Coat Layer 1 was again unrolled, and Coating Solution A for Low Refractive Index Layer was coated thereon under the above-described basic conditions and after drying at 90° C. for 60 seconds, irradiated with ultraviolet rays at an irradiation dose of 500 mJ/cm$^2$ by using an air-cooled metal halide lamp of 240 W/cm (manufactured by I-Graphics K.K.) in an atmosphere adjusted to an oxygen concentration of 0.1% by nitrogen purging, whereby Low Refractive Index Layer 1 having a thickness of 100 nm was formed. The resulting film was taken up. In this way, Antireflection Film A-01 was produced.

The refractive index of Low Refractive Index Layer 1 was 1.35.

(Production of Antireflection Films A-02, A-03 and A-04)

Antireflection Films A-02, A-03 and A-04 were produced in the same manner as Antireflection Film A-01 except for forming Low Refractive Index Layers 2, 3 and 4 on Hard Coat Layer 1 by using Coating Solutions B, C and D for Low Refractive Index Layer, respectively.

The refractive indexes of Low Refractive Index Layers 2, 3 and 4 were 1.36, 1.37 and 1.37, respectively.

(Production of Antireflection Films A-05 and A-06)

Antireflection Films A-05 and A-06 were produced in the same manner as Antireflection Film A-01 except for forming Low Refractive Index Layers 5 and 6 on Hard Coat Layer 1 by using Coating Solutions E and F for Low Refractive Index Layer, respectively.

The refractive indexes of Low Refractive Index Layers 5 and 6 were 1.43 and 1.42, respectively. These were antireflection films of Comparative Examples, where a hollow silica fine particle was not contained in the low refractive index layer.

(Production of Antireflection Films A-07 and A-08)

Antireflection Films A-07 and A-08 were produced in the same manner as Antireflection Film A-01 except for forming Low Refractive Index Layers 7 and 8 on Hard Coat Layer 1 by changing Fluorine-Containing Olefin-Based Polymer B of Coating Solution A for Low Refractive Index Layer to Fluorine-Containing Olefin-Based Polymer A and Fluorine-Containing Olefin-Based Polymer C, respectively.

The refractive indexes of Low Refractive Index Layers 7 and 8 both were 1.35. These were antireflection films of Comparative Examples, where in Antireflection Film A-07, an ethylenically unsaturated group was not contained in the fluorine-containing olefin-based polymer of the low refractive index layer, and in Antireflection Film A-08, an ethylenically unsaturated group and a polysiloxane segment were not contained in the fluorine-containing olefin-based polymer of the low refractive index layer.

(Production of Antireflection Film A-09)

A support having provided thereon Hard Coat Layer 1 was unrolled, and the coating solution for medium refractive index layer was coated thereon under the above-described basic conditions and after drying at 90° C. for 60 seconds, irradiated with ultraviolet rays at an irradiation dose of 500 mJ/cm$^2$ by using an air-cooled metal halide lamp of 240 W/cm (manufactured by I-Graphics K.K.) in an atmosphere adjusted to an oxygen concentration of 0.1% by nitrogen purging, whereby Low Refractive Index Layer 1 having a thickness of 67 nm was formed. The resulting film was taken up.

The refractive index of Medium Refractive Index Layer 1 was 1.65.

The coating solution for high refractive index layer was coated on the medium refractive index layer under the above-described basic conditions and after drying at 90° C. for 60 seconds, irradiated with ultraviolet rays at an irradiation dose of 500 mJ/cm$^2$ by using an air-cooled metal halide lamp of 240 W/cm (manufactured by I-Graphics K.K.) in an atmosphere adjusted to an oxygen concentration of 0.1% by nitrogen purging, whereby a medium refractive index layer having a thickness of 107 nm was formed. The resulting film was taken up.

The refractive index of Medium Refractive Index Layer 1 was 1.93.

Coating Solution D of Low Refractive Index Layer was coated on the high refractive index layer under the above-described basic conditions and after drying at 90° C. for 60 seconds, irradiated with ultraviolet rays at an irradiation dose of 500 mJ/cm$^2$ by using an air-cooled metal halide lamp of 240 W/cm (manufactured by I-Graphics K.K.) in an atmosphere adjusted to an oxygen concentration of 0.1% by nitrogen purging, whereby a low refractive index layer having a thickness of 100 nm was formed. The resulting film was taken up. In this way, an antireflection layer 9 comprising three layers was formed on the hard coat layer and Antireflection Film A-09 was produced.

(Production of Antireflection Film A-10)

A 80 μm-thick triacetyl cellulose film (TAC-TD80U, produced by Fuji Photo Film Co., Ltd.) in a roll form was unrolled as the support, and Coating Solution B for Hard Coat Layer was coated on the support under the above-described basic conditions and after drying at 90° C. for 60 seconds, the coating layer obtained was cured under irradiation of ultraviolet rays at an irradiation dose of 50 MJ/cm$^2$ by using an air-cooled metal halide lamp of 160 W/cm (manufactured by I-Graphics K.K.) in nitrogen purging to form Hard Coat Layer 2 having a thickness of 6 μm. The resulting film was taken up.

The refractive indexes of the binder and crosslinked polystyrene particle of 1.3 μm constituting Hard Coat Layer 2 were 1.52 and 1.60, respectively.

The support having provided thereon Hard Coat Layer 2 was again unrolled, and Coating Solution D for Low Refractive Index Layer was coated thereon under the above-described basic conditions and after drying at 90° C. for 60 seconds, irradiated with ultraviolet rays at an irradiation dose of 500 mJ/cm$^2$ by using an air-cooled metal halide lamp of 240 W/cm (manufactured by I-Graphics K.K.) in an atmosphere adjusted to an oxygen concentration of 0.1% by nitrogen purging, whereby Low Refractive Index Layer 4 having a thickness of 100 nm was formed. The resulting film was taken up. In this way, Antireflection Film A-10 was produced.

(Production of Antireflection Films A-11 and A-12)

Antireflection Films A-11 and A-12 were produced in the same manner as Antireflection Film A-10 except for forming Hard Coat Layers 3 and 4 by changing the amount added of SX-130H (polystyrene particle of 1.3 μm) in Coating Solution B for Hard Coat Layer to 4.0 parts by mass and 6.0 parts by mass, respectively.

(Production of Antireflection Films A-13 and A-14)

Antireflection Films A-13 and A-14 were produced in the same manner as Antireflection Film A-10 except for forming Hard Coat Layers 5 and 6 by changing SX-130H (polystyrene particle of 1.3 μm) in Coating Solution B for Hard Coat Layer to SX-350H (polystyrene particle of 3.5 μm, produced by The Soken Chemical & Engineering Co., Ltd.) and changing the amount added thereof to 2.0 parts by mass and 4.0 parts by mass, respectively.

The refractive indexes of the binder and crosslinked polystyrene particle of 3.5 μm constituting Hard Coat Layers 5 and 6 were 1.52 and 1.60, respectively.

(Production of Antireflection Films A-15, A-16 and A-17)

Antireflection Films A-15, A-16 and A-17 were produced in the same manner as Antireflection Film A-10 except for forming Hard Coat Layers 7, 8 and 9 by changing Coating Solution B for Hard Coat Layer to Coating Solution C for Hard Coat Layer, Coating Solution D for Hard Coat Layer and Coating Solution E for Hard Coat Layer, respectively, and coating each solution under the above-described basic conditions.

The refractive indexes of the zirconia fine particle-containing binder, silica particle of 1.5 μm and crosslinked PMMA particle of 3.0 μm constituting Hard Coat Layer 7 were 1.62, 1.44 and 1.49, respectively. The refractive indexes of the binder, crosslinked poly(acryl-styrene) particle of 3.5 μm and crosslinked polystyrene particle of 3.5 μm constituting Hard Coat Layer 8 were 1.53, 1.55 and 1.60, respectively. The refractive indexes of the binder and crosslinked poly(acryl-styrene) particle of 3.5 μm constituting Hard Coat Layer 9 were 1.53 and 1.536, respectively.

Furthermore, with respect to Antireflection Films A01 to A-17, a cellulose acetate film obtained by changing Tinuvin 327 (UV absorbent, produced by Ciba Specialty Chemicals) contained in TD80 to Tinuvin 326 (UV absorbent, produced by Ciba Specialty Chemicals) was used TD80U as the support, thereby producing Antireflection Films B-01 to B-17.

(Saponification Treatment of Antireflection Film)

An aqueous 1.5 mol/liter sodium hydroxide solution was prepared and kept at 55° C. Separately, an aqueous 0.005 mol/liter dilute sulfuric acid solution was prepared and kept at 35° C. The produced antireflection film was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C.

In this way, a saponified antireflection film was produced.

(Production of Polarizing Plates PA-01 to PA-17 with Antireflection Film)

A polarizing film by adsorbing iodine on a stretched polyvinyl alcohol film, and each of the saponified Antireflection Films A-01 to A-17 was laminated on one side of the polarizing film by using a polyvinyl alcohol-based adhesive such that the support side (triacetyl cellulose) of the antireflection film came to the polarizing film side. Also, a viewing angle enlarging film having an optical compensation layer (Wide View Film Super Ace, produced by Fuji Photo Film Co., Ltd.) was laminated on another side of the polarizing film by using a polyvinyl alcohol-based adhesive. In this way, Polarizing Plates PA-01 to PA-17 were produced.

(Evaluation of Antireflection Film and Polarizing Film)

The obtained antireflection films and polarizing plates were subjected to evaluation of the following items. The results obtained are shown in Table 1.

(1) Centerline Average Roughness

The centerline average roughness Ra of the obtained film was measured according to JIS-B0601.

(2) Transmitted Image Clarity (Image Blurring)

The transmitted image clarity of the antireflection film was measured according to JIS K7105 by using a 0.5-mm optical comb of an image clarity meter (Model ICM-2D) manufactured by Suga Test Instruments Co., Ltd.

(3) Internal Haze

The entire haze (H), internal haze (Hi) and surface haze (Hs) of the obtained film were determined by the following measurements.

[1] The entire haze value (H) of the obtained film was measured according to JIS-K7136.

[2] After adding several silicone oil drops to the front surface on the low refractive index layer side and the back surface of the obtained film, the film was sandwiched from the front and the back by two 1 mm-thick glass plates (Microslide Glass No. S9111, produced by Matsunami K.K.) and put into optically complete contact with two glass plates to provide a surface haze-removed state, and the haze was measured. From the haze value obtained, the haze separately measured by interposing only a silicone oil between two glass plates was subtracted, thereby calculating the internal haze (Hi) of the film.

[3] The surface haze (Hs) of the film was calculated by subtracting the internal haze (Hi) calculated in [2] above from the entire haze (H) measured in [1] above.

In the measurement, a haze meter, MODEL 1001DP (manufactured by Nippon Denshoku Industries, Co., Ltd.), was used.

(4) Scattered Light Intensity Ratio by Goniophotometer

Using a goniophotometer, Model GP-5 (manufactured by Murakami Color Research Laboratory), the antireflection film was disposed vertical to the incident light, and a scattered light profile was measured over all orientations. The intensity of scattered light at an outgoing angle of 30° based on the intensity of light at an outgoing angle of 0° was determined.

(5) Integral Reflectance

The antireflection film was loaded on the integrating sphere of Spectrometer V-550 (manufactured by JASCO Corp.), and the integral reflectance was measured in the wavelength region of 380 to 780 nm. The average reflectance of 450 to 650 nm was calculated and used for the evaluation of antireflectivity.

(6) Steel Wool Scratch Resistance

A rubbing test was performed by using a rubbing tester under the following conditions.

Environmental conditions of evaluation: 25° C. and 60% RH

Rubbing Material:

A steel wool (No. 0000, manufactured by Nippon Steel Wool K.K.) was wound around a rubbing tip (1 cm×1 cm) of a tester coming into contact with the sample and fixed by a band to resist movement.

Moving distance (one way): 13 cm

Rubbing speed: 13 cm/sec

Load: 500 g/cm$^2$

Contact area of tip: 1 cm×1 cm

Number of rubbings: 20 reciprocations

An oily black ink was painted on the back side of the rubbed sample, and the abrasion in the rubbed portion was observed with an eye by the reflected light and evaluated according to the following criteria.

A: Scratches were not observed at all even by very careful observation.

B: Weak scratches were observed.

C: Scratches of medium degree were observed.

D: Scratches were observed at the first glance.

(7) Antifouling Property

A circle with a diameter of 1 cm was drawn and filled by Magic Ink No. 700 (black, produced by Teranishi Chemical Industries Ltd.). The sample was first dried for 30 minutes under the conditions of 25° C. and relative humidity of 55% and then left standing for 24 hours under the conditions of 40° C. and relative humidity of 80%. Thereafter, the sample was taken out, left standing for 30 minutes or more under the conditions of 25° C.-55% and then rubbed with BENCOT (produced by Asahi Kasei Corp.). Whether the magic ink could be wiped off or not was evaluated according to the following criteria.

A: The magic ink mark was not observed at all even by very careful observation.

B: The mark was slightly observed.

C: Indelible mark was detected.

D: The mark could not be substantially wiped off.

(8) Antiglare Property

The polarizing plate on the viewing side provided in a liquid crystal display device using a TN-type liquid crystal cell (TH-15TA2, manufactured by Matsushita Electric Industrial Co., Ltd.) was separated and instead, each of Polarizing Plates PA-01 to PA-17 was laminated through an adhesive such that the antireflection layer side came to the viewing side and the transmission axis of the polarizing plate coincided with the polarizing plate originally laminated on the product.

A bare fluorescent lamp (8,000 cd/m$^2$) without louver was projected on the produced liquid crystal display device from an angle of 45°, and the degree of blurring of the reflected image when observed from the direction of −45° was evaluated according to the following criteria.

A: The contour of the fluorescent lamp was not recognized at all.

B: The contour of the fluorescent lamp was slightly blurred.

C: The fluorescent lamp was not substantially blurred.

(9) White Blurring

In a bright room of 1,000 lux, the liquid crystal display device produced above in the evaluation of the antiglare property was turned on for black display and evaluated with an eye from various viewing angles according the following criteria.

A: White blurring was not observed at all.

B: White blurring was not substantially observed.

C: Weak white blurring was observed.

D: Strong white blurring was observed.

(10) Right and Left Tint Change

Using the liquid crystal display device prepared above in the evaluation of the white blurring, the degree of yellow coloration on the white display when the viewing was inclined right or left, was evaluated with an eye according to the following criteria.

A: Yellow coloration was not recognized.

B: Slightly colored yellow.

C: Weakly colored yellow.

D: Strongly colored yellow.

TABLE 1

Table 1

| Antireflection Film | Polarizing Plate | Hard Coat Layer | Low Refractive Index Layer/ Antireflection Layer | Ra (μm) | Transmitted Image Clarity (%) | Internal Haze (%) | Scattered Light Intensity Ratio by Goniophotometer (%) |
|---|---|---|---|---|---|---|---|
| A-01 | PA-01 | 1 | 1 | 0.02 | 98 | 1 | 0.001 |
| A-02 | PA-02 | 1 | 2 | 0.02 | 98 | 1 | 0.001 |
| A-03 | PA-03 | 1 | 3 | 0.02 | 98 | 1 | 0.001 |
| A-04 | PA-04 | 1 | 4 | 0.02 | 98 | 1 | 0.001 |
| A-05 | PA-05 | 1 | 5 | 0.02 | 98 | 1 | 0.001 |
| A-06 | PA-06 | 1 | 6 | 0.02 | 98 | 1 | 0.001 |
| A-07 | PA-07 | 1 | 7 | 0.02 | 98 | 1 | 0.001 |
| A-08 | PA-08 | 1 | 8 | 0.02 | 98 | 1 | 0.001 |
| A-09 | PA-09 | 1 | 9 | 0.02 | 98 | 1 | 0.001 |
| A-10 | PA-10 | 2 | 4 | 0.02 | 96 | 28 | 0.014 |
| A-11 | PA-11 | 3 | 4 | 0.02 | 96 | 45 | 0.028 |
| A-12 | PA-12 | 4 | 4 | 0.02 | 95 | 54 | 0.037 |
| A-13 | PA-13 | 5 | 4 | 0.03 | 93 | 36 | 0.006 |
| A-14 | PA-14 | 6 | 4 | 0.03 | 93 | 60 | 0.012 |
| A-15 | PA-15 | 7 | 4 | 0.04 | 88 | 65 | 0.034 |
| A-16 | PA-16 | 8 | 4 | 0.22 | 25 | 40 | 0.010 |
| A-17 | PA-17 | 9 | 4 | 0.24 | 30 | 10 | 0.002 |

| Antireflection Film | Integral Reflectance (%) | Steel Wool Scratch Resistance | Antifouling Property | Antiglare Property | White Blurring | Right and Left Tint Change | Remarks |
|---|---|---|---|---|---|---|---|
| A-01 | 1.2 | B | B | C | A | D | Invention |
| A-02 | 1.3 | B | B | C | A | D | Invention |
| A-03 | 1.4 | A | B | C | A | D | Invention |
| A-04 | 1.4 | A | A | C | A | D | Invention |
| A-05 | 2.0 | B | C | C | A | D | Comparison |
| A-06 | 1.9 | C | B | C | A | D | Comparison |
| A-07 | 1.3 | D | B | C | A | D | Comparison |
| A-08 | 1.3 | D | D | C | A | D | Comparison |
| A-09 | 0.2 | A | A | C | A | D | Invention |
| A-10 | 1.4 | A | A | C | A | B | Invention |
| A-11 | 1.4 | A | A | C | A | A | Invention |
| A-12 | 1.4 | A | A | C | A | A | Invention |
| A-13 | 1.4 | A | A | C | A | C | Invention |
| A-14 | 1.4 | A | A | C | A | B | Invention |
| A-15 | 1.0 | A | A | C | A | A | Invention |
| A-16 | 1.6 | A | A | A | C | B | Invention |
| A-17 | 1.6 | A | A | A | C | D | Invention |

In the column of Low Refractive Index Layer/Antireflection Layer, "9" means that medium refractive index layer/ high refractive index layer/low refractive index layer (Coating Solution D) were stacked.

The results in Table 1 reveal the followings. By virtue of having a low refractive index layer formed of a coating solution for the formation of a low refractive index layer comprising a hollow silica fine particle and a fluorine-containing olefin-based polymer having a polysiloxane segment in the main chain, having a fluorine content of 30 mass % or more and containing a plurality of ethylenically unsaturated groups, an antireflection film enhanced in the antireflection effect and improved in the scratch resistance and antifouling property at a high level can be obtained.

Furthermore, the viewing angle characteristics are improved by imparting internal scattering property to the hard coat layer, and remarkably excellent antireflectivity is achieved by stacking multiple light interference layers of medium/high/low refractive index layers.

Also for Antireflection Films B-01 to B-17, the same results were obtained.

Furthermore, even when 2-(p-methoxyphenyl)-4,6-bis(trichloromethyl)-s-triazine or 2-[4-(4-hydroxybenzoylamino)phenyl]-4,6-bis(trichloromethyl)-1,3,5-triazine was used in place of Photopolymerization Initiator a of Coating Solutions A to F for Low Refractive Index Layer, the same results were obtained.

The polarizing plate on the viewing side provided in a liquid crystal display device using a VA-mode liquid crystal cell (LC-22GD3, manufactured by Sharp Corp.) or in a liquid crystal display device using an IPS-mode liquid crystal cell (KLV-23HR1, manufactured by Sony Corp.) was separated and instead, a plane polarizing plate (HLCS-5618, manufactured by Sanritz Corp.) was laminated by arranging the transmission axis of the polarizing plate to coincide with the polarizing plate originally laminated on the product. Furthermore, each of Antireflection Films A-01 to A-17 was laminated through an adhesive such that the antireflection layer side came to the viewing side.

Also in the liquid crystal display device using a VA-mode liquid crystal cell and the liquid crystal display device using an IPS-mode liquid crystal cell, similarly to the results in the liquid crystal display device using a TN-mode liquid crystal cell, the effect of the antireflection film of the present invention was confirmed.

According to the coating composition for the formation of a low refractive index layer of the present invention, an antireflection film capable of preventing the projection of outside light and enhancing the visibility of a display such as liquid crystal display device, and improved in scratch resistance and antifouling property can be provided.

Also, the obtained antireflection film can be used as a protective film of a polarizing plate. By using such an antireflection film or a polarizing plate, a liquid crystal display device assured of high visibility and almost free of change in the color hue or the like due to variation in the viewing angle can be provided.

The entire disclosure of each and every foreign patent application from which the benefit of foreign priority has been claimed in the present application is incorporated herein by reference, as if fully set forth.

What is claimed is:

1. A coating composition for the formation of a low refractive index layer, comprising:
   a fluorine-containing olefin-based polymer that has a polysiloxane segment represented by formula 1 in its main chain, has a fluorine content of 30 mass % or more, and contains a plurality of ethylenically unsaturated groups;
   a hollow silica fine particle having an average particle diameter of 5 to 200 nm and a refractive index of 1.17 to 1.40:

Formula 1:

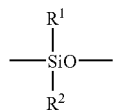

wherein $R^1$ and $R^2$, which may be the same or different, each represents a hydrogen atom, an alkyl group, an alkyl halide group or an aryl group; and a polysiloxane compound having a reactive organic functional group represented by formula 7:

Formula 7:

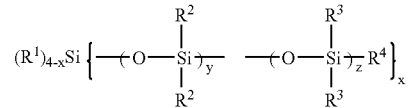

wherein $R^1$ to $R^4$ each represents a substituent having a carbon number of 1 to 20; when each substituent is present in a plural number, these groups may be the same or different; at least one group of $R^1$, $R^3$ and $R^4$ represents a reactive organic functional group; x represents an integer satisfying $1 \leq x \leq 4$; y represents an integer satisfying $10 \leq y \leq 500$; z represents an integer satisfying $0 \leq z \leq 500$; and the compound may be a random copolymer or a block copolymer.

2. The coating composition for the formation of a low refractive index layer as claimed in claim 1, wherein the fluorine-containing olefin-based polymer has a structural unit containing a polysiloxane segment represented by formula 1 originated in (c) an azo group-containing polysiloxane compound.

3. The coating composition for the formation of a low refractive index layer as claimed in claim 1, which further comprises a non-hollow silica fine particle.

4. The coating composition for the formation of a low refractive index layer as claimed in claim 1, which further comprises a polyfunctional (meth)acrylate compound having two or more (meth)acryloyl groups within one molecule.

5. The coating composition for the formation of a low refractive index layer as claimed in claim 1, wherein the hollow silica fine particle is surface-treated with at least one of a hydrolysate of an organosilane represented by formula (1) and a partial condensate thereof:

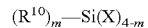     Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

6. The coating composition for the formation of a low refractive index layer as claimed in claim 3, wherein at least one of the hollow silica fine particle and the non-hollow silica fine particle is surface-treated with at least one of a hydrolysate of an organosilane represented by formula (1) and a partial condensate thereof:

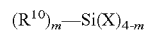     Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

7. An antireflection film comprising:
   a transparent support;
   at least one hard coat layer; and
   a low refractive index layer located as an outermost layer, wherein the low refractive index layer is a layer formed by curing a coating composition for the formation of a low refractive index layer by ionizing radiation,
   wherein the coating composition for the formation of a low refractive index layer comprises:
   a fluorine-containing olefin-based polymer that has a polysiloxane segment represented by formula 1 in its main chain, has a fluorine content of 30 mass % or more, and contains a plurality of ethylenically unsaturated groups; and a hollow silica fine particle having an average particle diameter of 5 to 200 nm and a refractive index of 1.17 to 1.40:

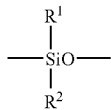

wherein $R^1$ and $R^2$, which may be the same or different, each represents a hydrogen atom, an alkyl group, an alkyl halide group or an aryl group.

8. The antireflection film as claimed in claim 7,
wherein at least one of the hard coat layer and the low refractive index layer comprises:
(a) at least one of: a hydrolysate of an organosilane having a hydroxyl group or hydrolyzable group directly bonded to silicon; and a partial condensate thereof; and
(b) at least one metal chelate compound comprising: (i) a center metal including a metal selected from Zr, Ti and Al; and (ii) ligands including an alcohol represented by formula $R^3OH$, wherein $R^3$ represents an alkyl group having a carbon number of 1 to 10, and a compound represented by formula $R^4COCH_2COR^5$, wherein $R^4$ represents an alkyl group having a carbon number of 1 to 10, and $R^5$ represents an alkyl group having a carbon number of 1 to 10 or an alkoxy group having a carbon number of 1 to 10.

9. The antireflection film as claimed in claim 7,
wherein the antireflection film has a surface roughness Ra (centerline average roughness) of 0.10 μm or less and a transmitted image clarity of 60% or more.

10. The antireflection film as claimed in claim 7,
wherein the hard coat layer has an internal haze of 10% or more.

11. The antireflection film as claimed in claim 7,
wherein an intensity of scattered light at an outgoing angle of 30° in a scattered light profile of the hard coat layer as measured by a goniophotometer is from 0.01 to 0.2% based on an intensity of light at an outgoing angle of 0°.

12. The antireflection film as claimed in claim 7,
wherein at least one high refractive index layer having a refractive index higher than that of the transparent support is provided on the hard coat layer.

13. A polarizing plate comprising:
a polarizing film; and
two protective films on both sides of the polarizing film,
wherein the antireflection film claimed in claim 7 is used for one of the two protective films.

14. The polarizing plate as claimed in claim 13,
wherein the other one, which is not the antireflection film, of the two protective films is an optical compensation film having an optically anisotropic layer, the optically anisotropic layer comprising a compound having a discotic structural unit in which a disc plane of the discotic structural unit is inclined with respect to a surface of the protective film, and an angle made by the disc plane of the discotic structural unit and the surface of the protective film is changing in a depth direction of the optically anisotropic layer.

15. A liquid crystal display device comprising:
a display; and
the antireflection film claimed in claim 7 as an outermost surface layer of the display.

16. A liquid crystal display device comprising:
a display; and
the polarizing plate claimed in claim 13 as an outermost surface layer of the display.

17. An antireflection film comprising:
a transparent support;
at least one hard coat layer; and
a low refractive index layer located as an outermost layer,
wherein the low refractive index layer is a layer formed by curing the coating composition for the formation of a low refractive index layer claimed in claim 1 by ionizing radiation,
wherein at least one of the hard coat layer and the low refractive index layer comprises:
(a) at least one of: a hydrolysate of an organosilane having a hydroxyl group or hydrolyzable group directly bonded to silicon; and a partial condensate thereof; and
(b) at least one metal chelate compound comprising: (i) a center metal including a metal selected from Zr, Ti and Al; and (ii) ligands including an alcohol represented by formula $R^3OH$, wherein $R^3$ represents an alkyl group having a carbon number of 1 to 10, and a compound represented by formula $R^4COCH_2COR^5$, wherein $R^4$ represents an alkyl group having a carbon number of 1 to 10, and $R^5$ represents an alkyl group having a carbon number of 1 to 10 or an alkoxy group having a carbon number of 1 to 10.

* * * * *